US011879808B1

(12) United States Patent
Chapel

(10) Patent No.: US 11,879,808 B1
(45) Date of Patent: Jan. 23, 2024

(54) SYSTEMS AND METHODS FOR STATIONARY ENGINE EMISSIONS TESTING

(71) Applicant: 4Sight Testing, Inc., Abilene, TX (US)

(72) Inventor: James Scott Chapel, Abilene, TX (US)

(73) Assignee: 4Sight Environmental, Inc., Abilene, TX (US)

( * ) Notice: Subject to any disclaimer, the term of this patent is extended or adjusted under 35 U.S.C. 154(b) by 136 days.

(21) Appl. No.: 17/337,311

(22) Filed: Jun. 2, 2021

(51) Int. Cl.
*G01M 15/10* (2006.01)
*G01N 21/3504* (2014.01)
*B60P 1/54* (2006.01)
*G01N 21/35* (2014.01)

(52) U.S. Cl.
CPC ...... *G01M 15/108* (2013.01); *G01N 21/3504* (2013.01); *B60P 1/54* (2013.01); *G01N 2021/3595* (2013.01); *G01N 2201/0231* (2013.01)

(58) Field of Classification Search
CPC ............ G01M 15/108; G01N 21/3504; G01N 2021/3595; G01N 2201/0231; B60P 1/54
See application file for complete search history.

(56) References Cited

U.S. PATENT DOCUMENTS

2017/0122920 A1* 5/2017 Spartz .................... G01N 30/38

* cited by examiner

*Primary Examiner* — David P Porta
*Assistant Examiner* — Meenakshi S Sahu
(74) *Attorney, Agent, or Firm* — Cogent Law Group LLP; Evan R. Smith

(57) ABSTRACT

An improved electronically controlled portable testing system provides one or more self-contained, automated testing skids configured to perform required tests on the exhaust output of a stationary engine. The testing skids are configured for easy transportation on a medium duty truck and in a preferred testing process, are deployed to the engine site (and reloaded on the truck after testing is complete) using a lift attached to the truck. Using these systems and methods, a single technician can concurrently test multiple exhaust stacks on engines separated by any distance, from 100 feet to miles apart. The testing skids provide the technician with wireless remote test control and monitoring. The disclosed systems and methods increase the efficiency, accuracy and repeatability of tests.

20 Claims, 63 Drawing Sheets

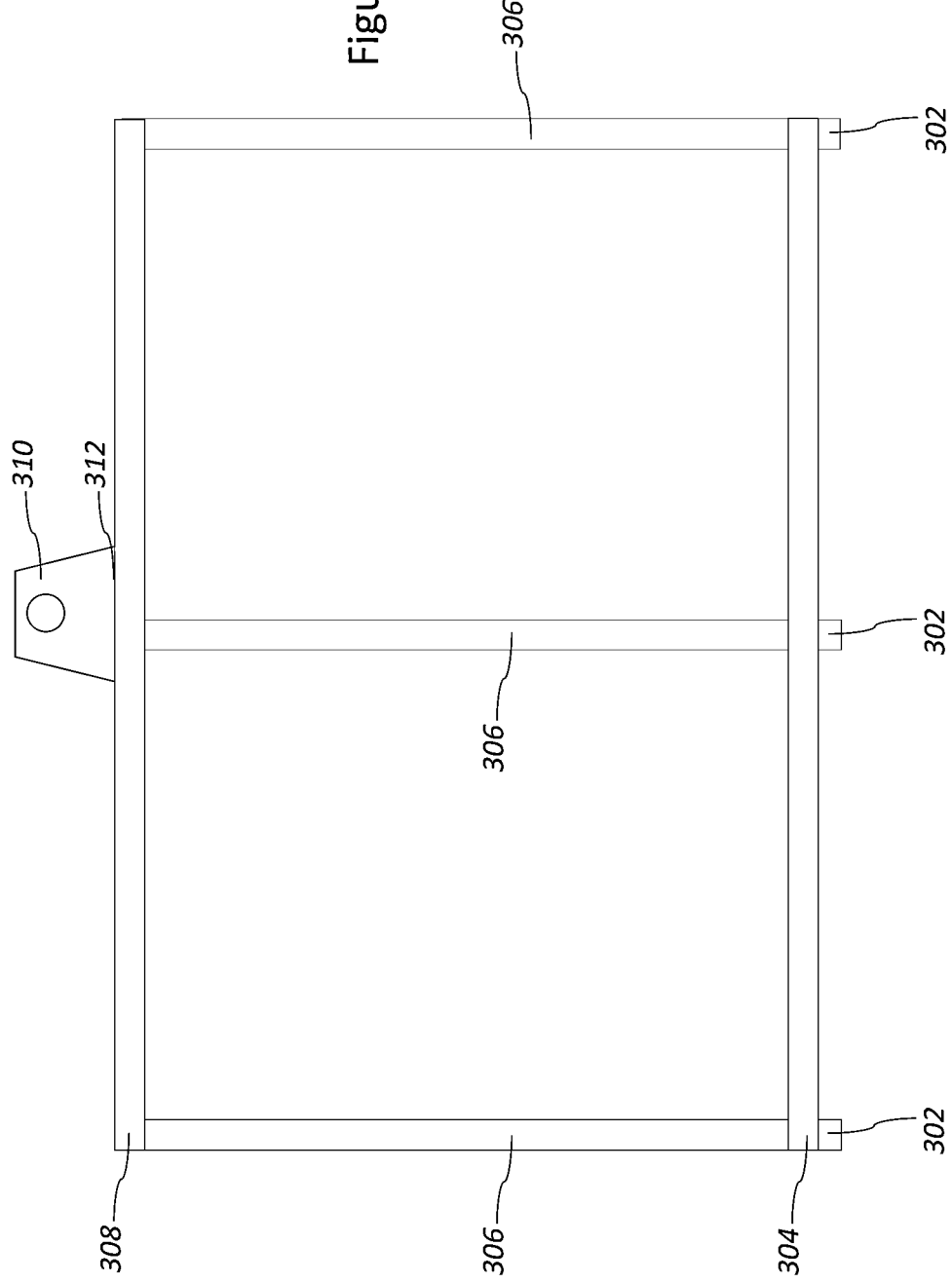

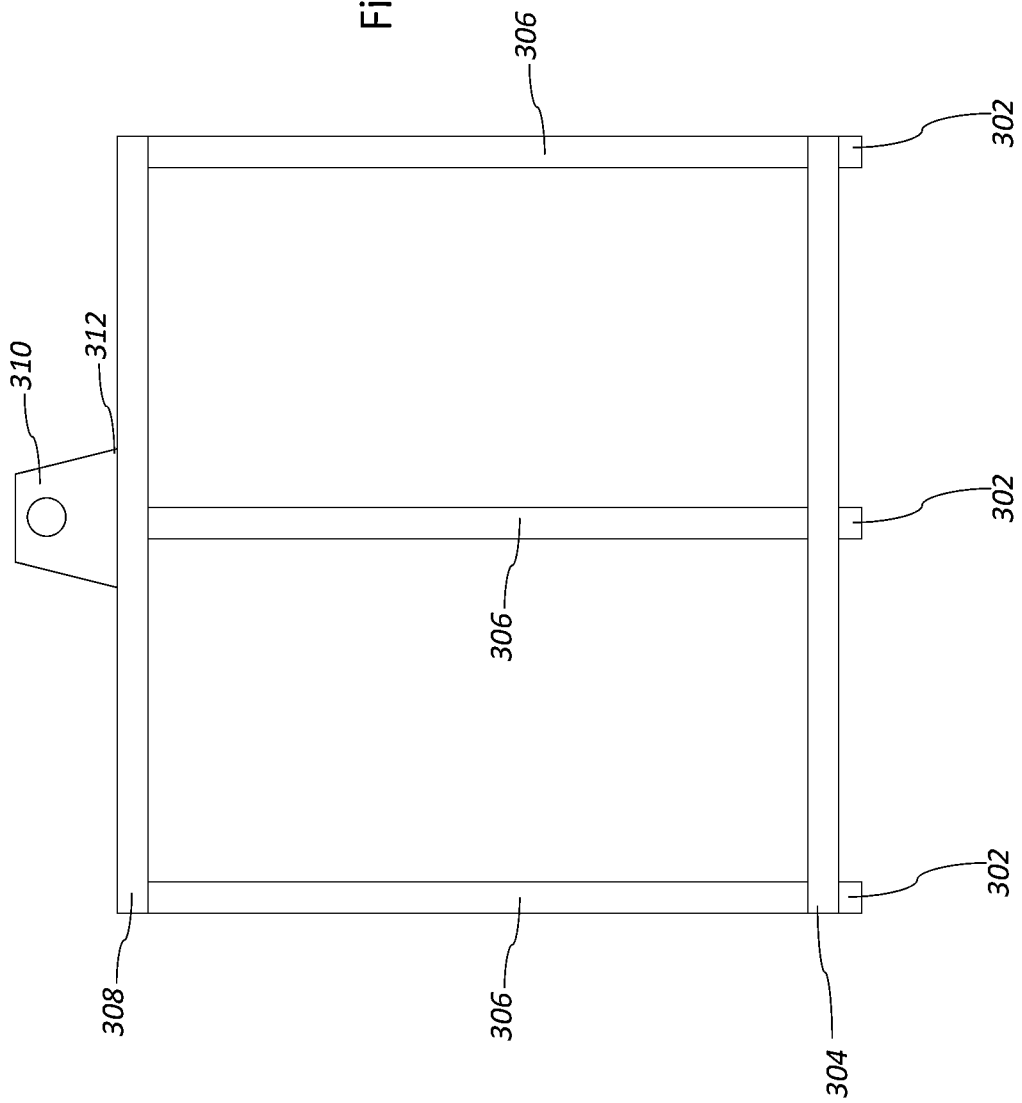

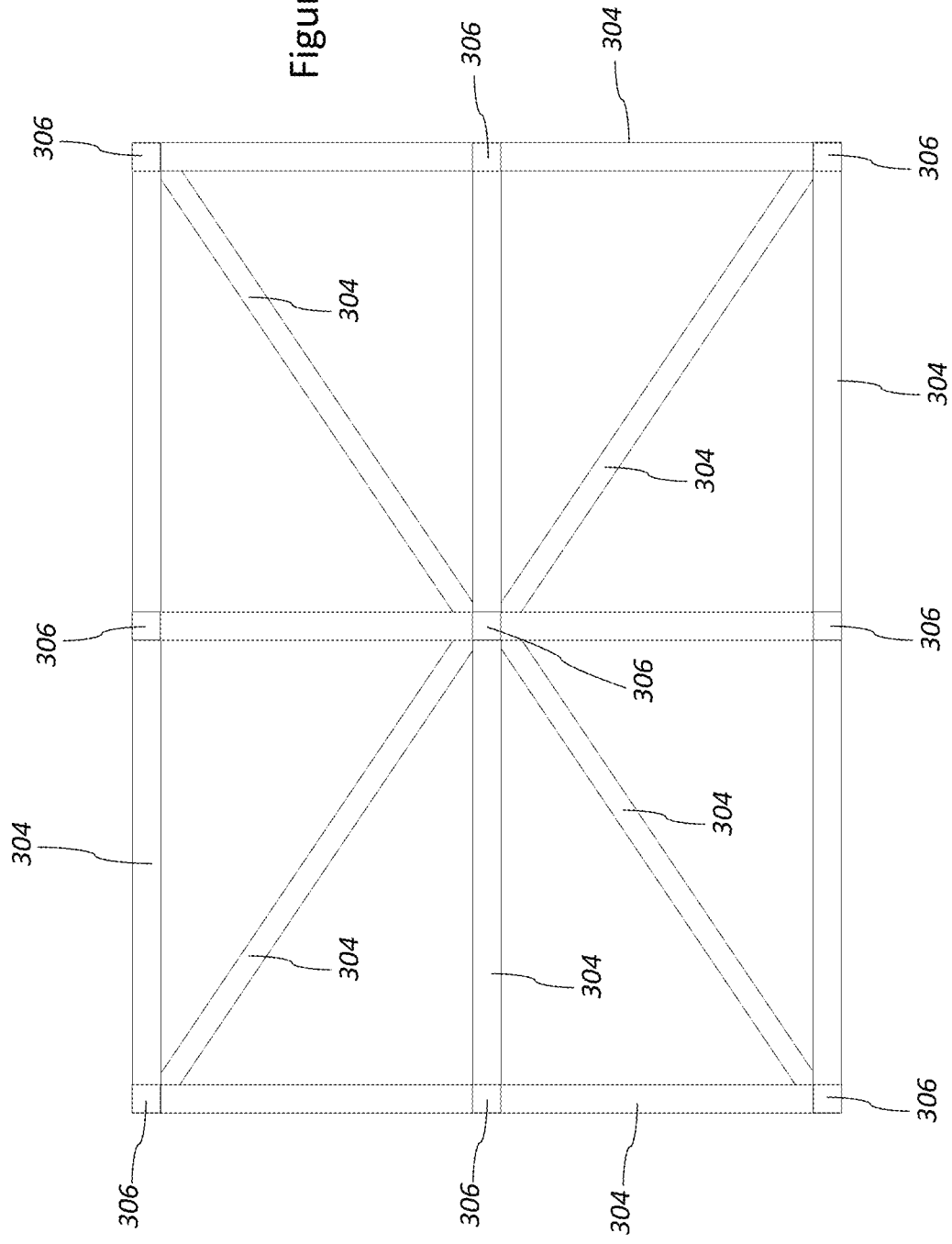

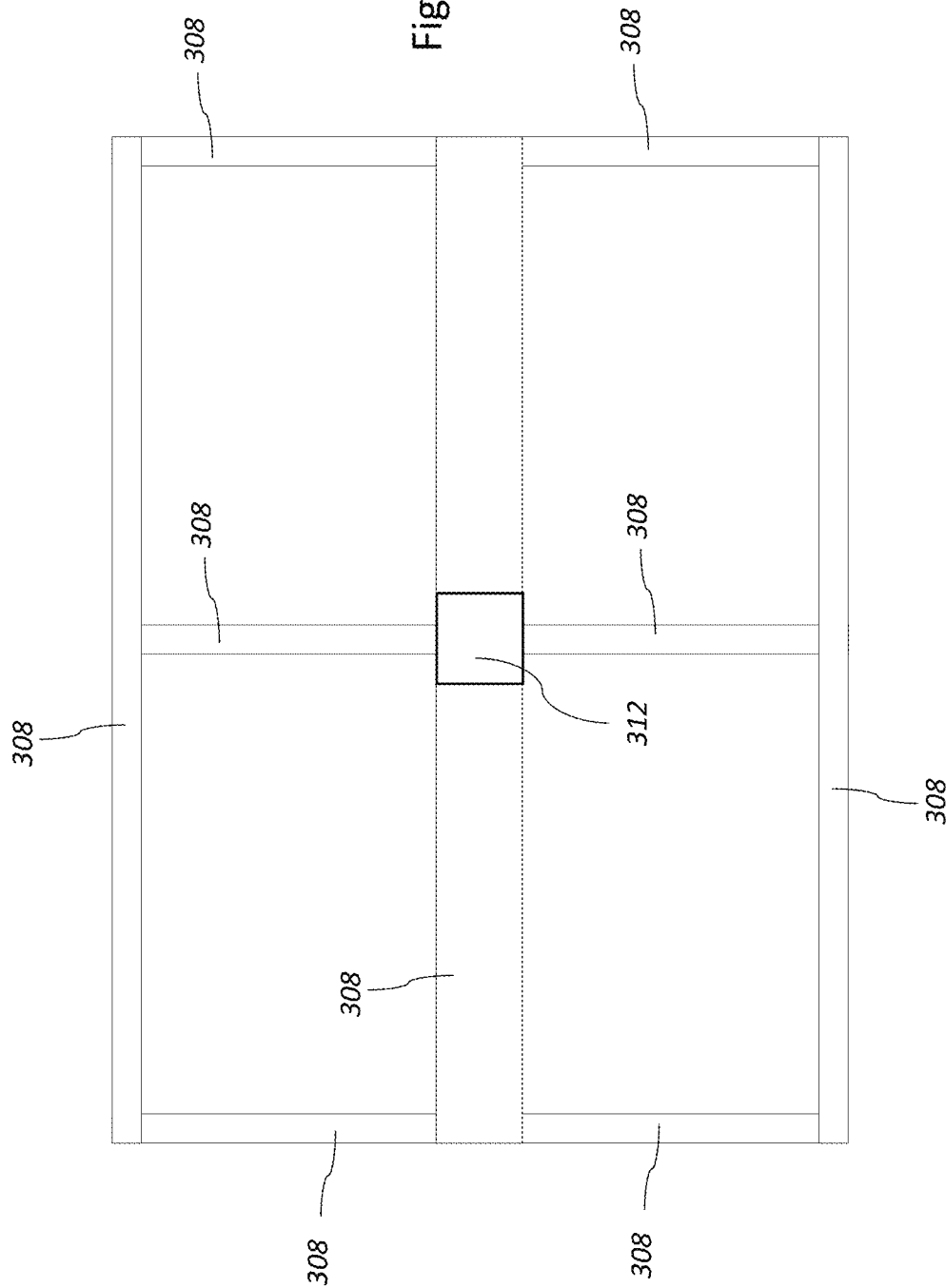

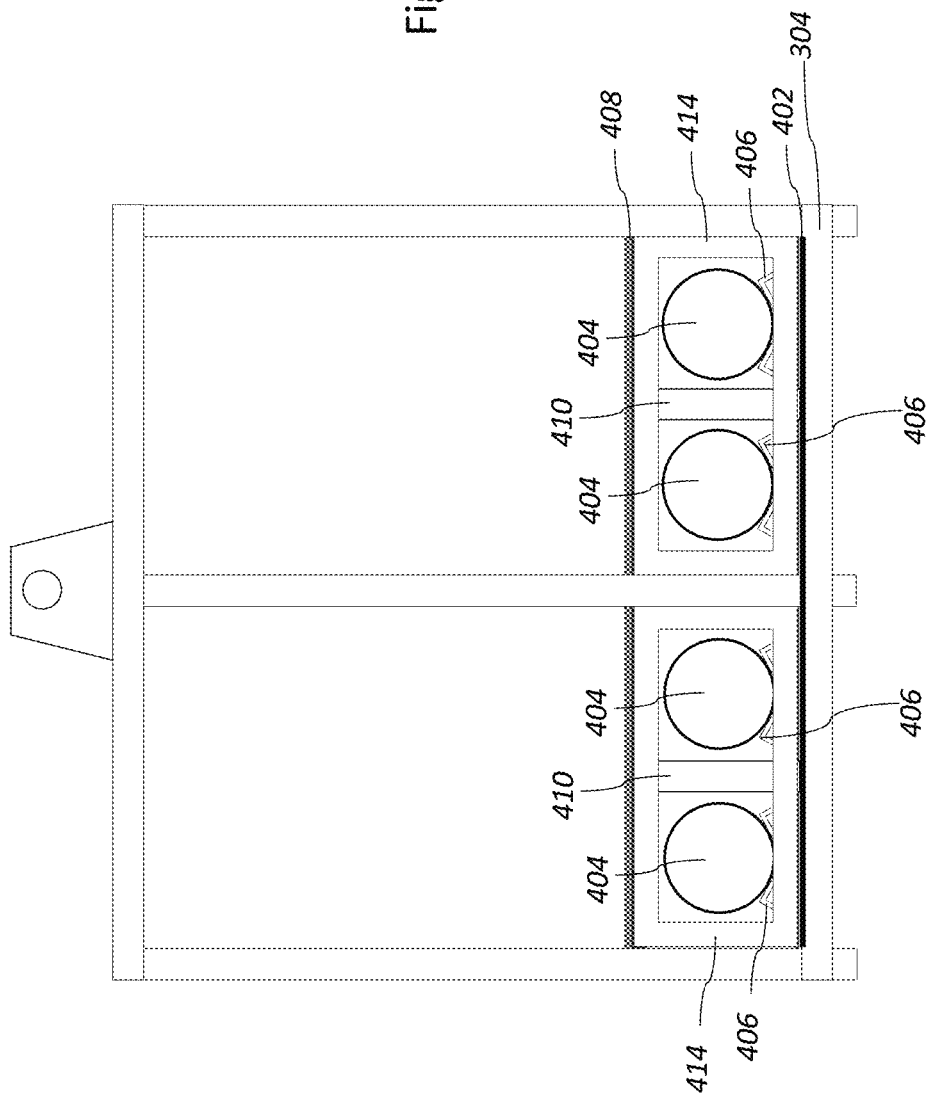

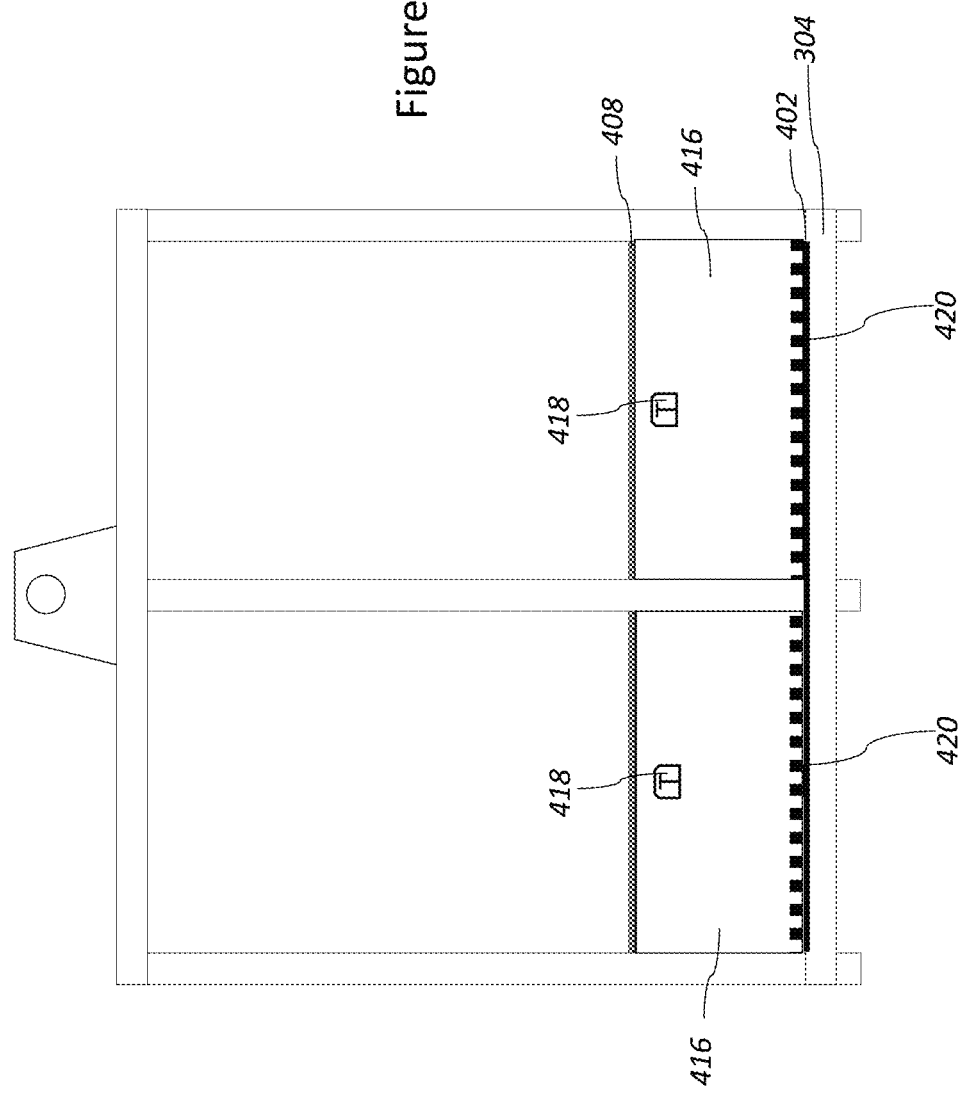

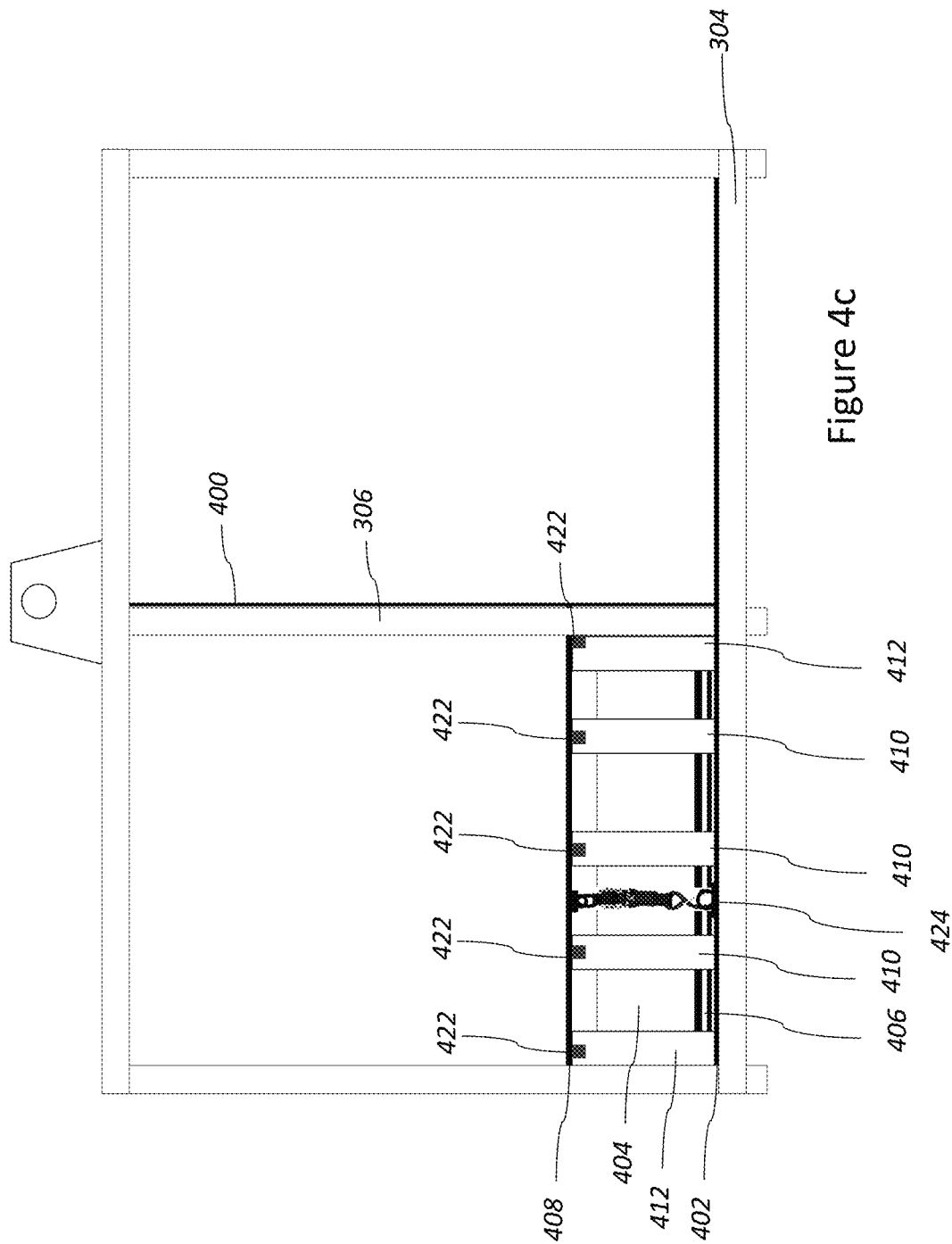

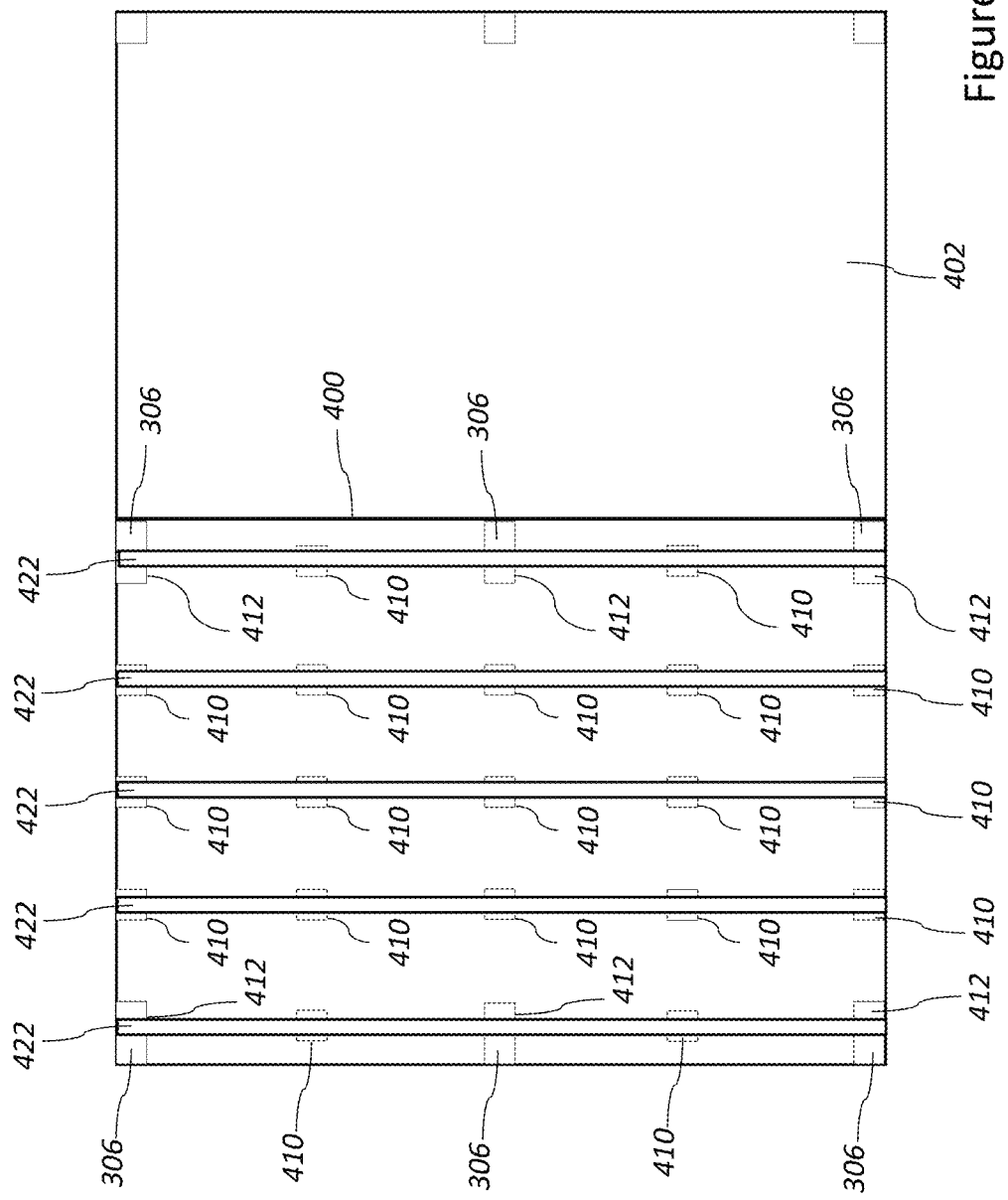

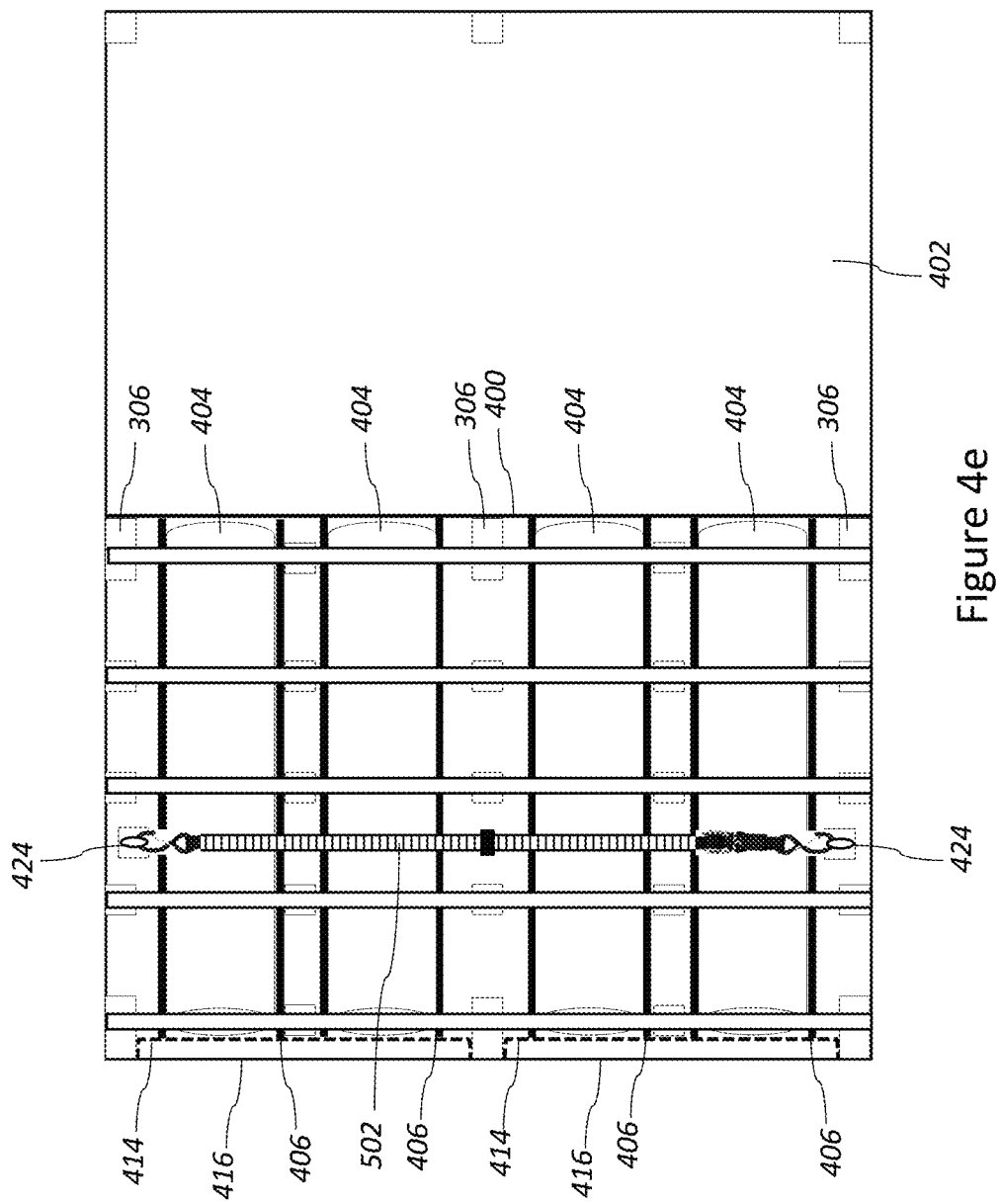

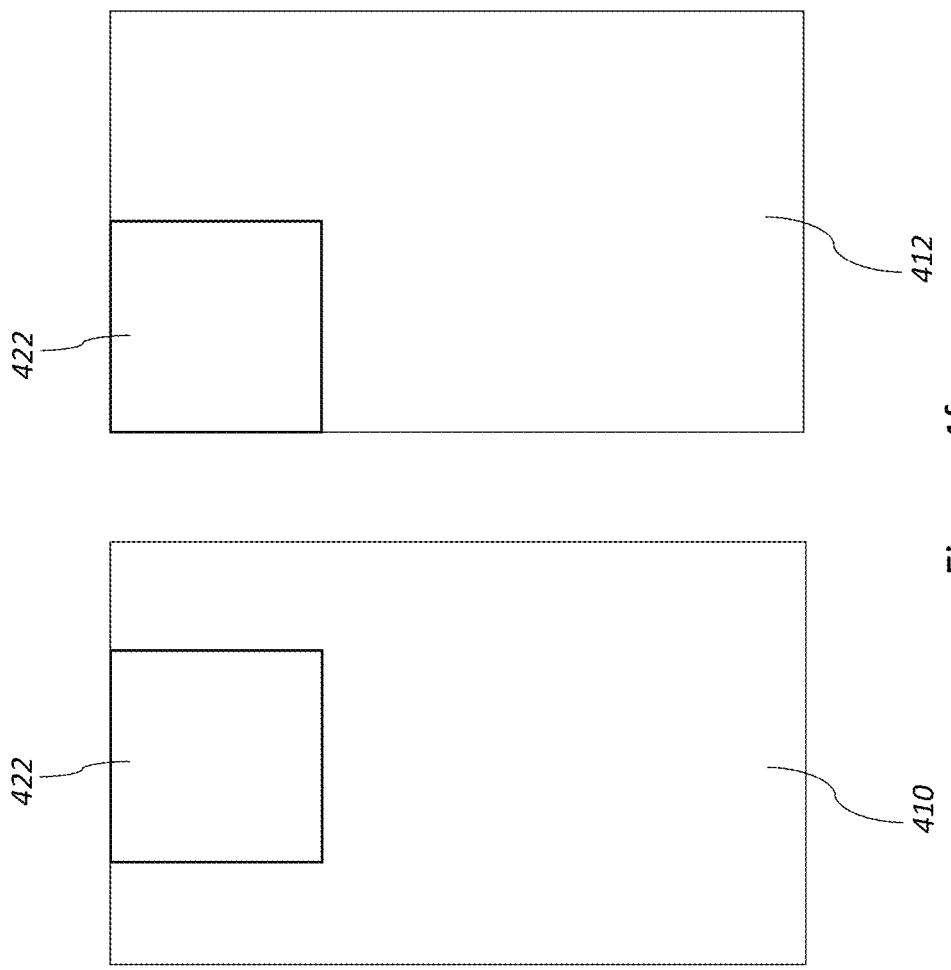

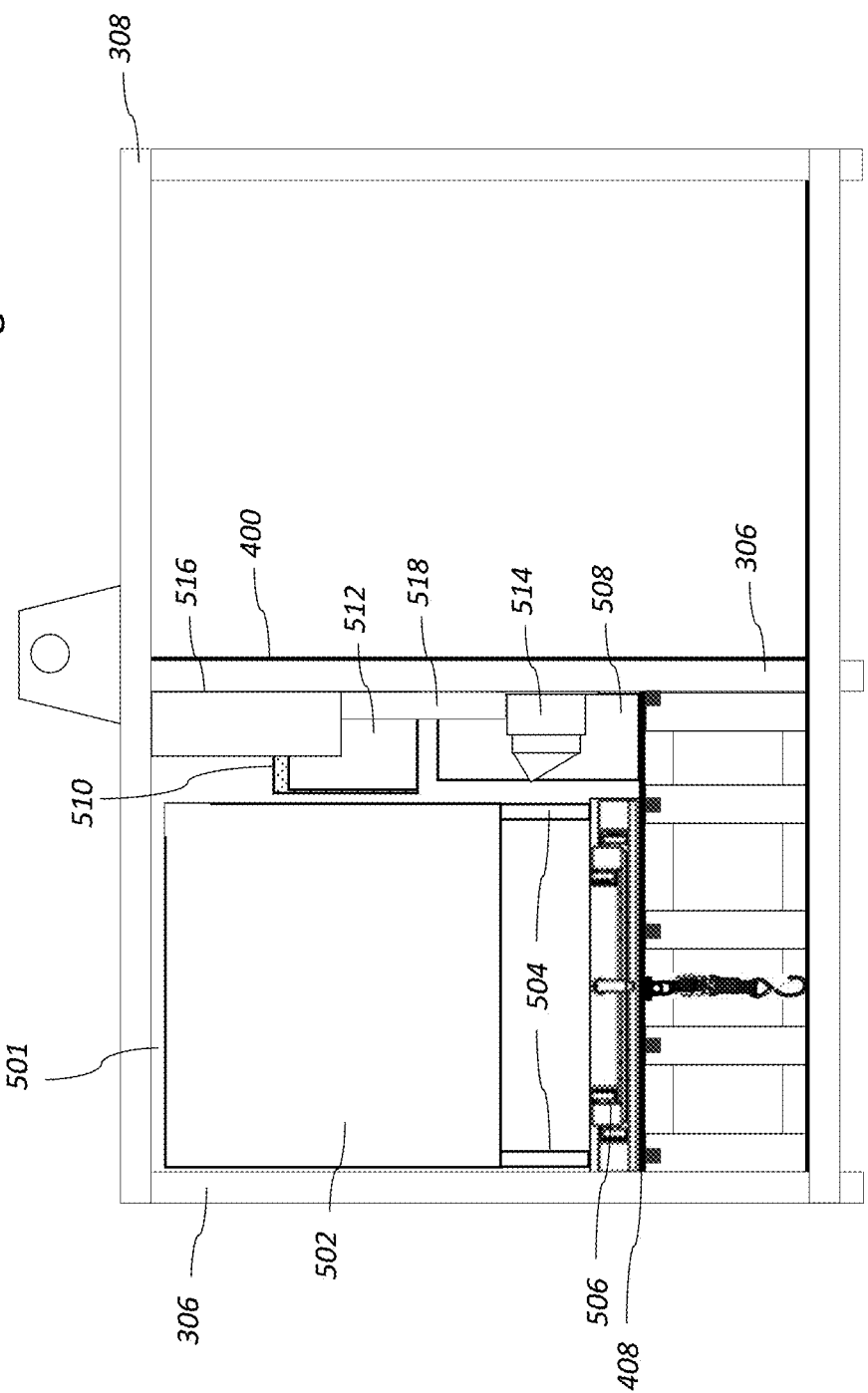

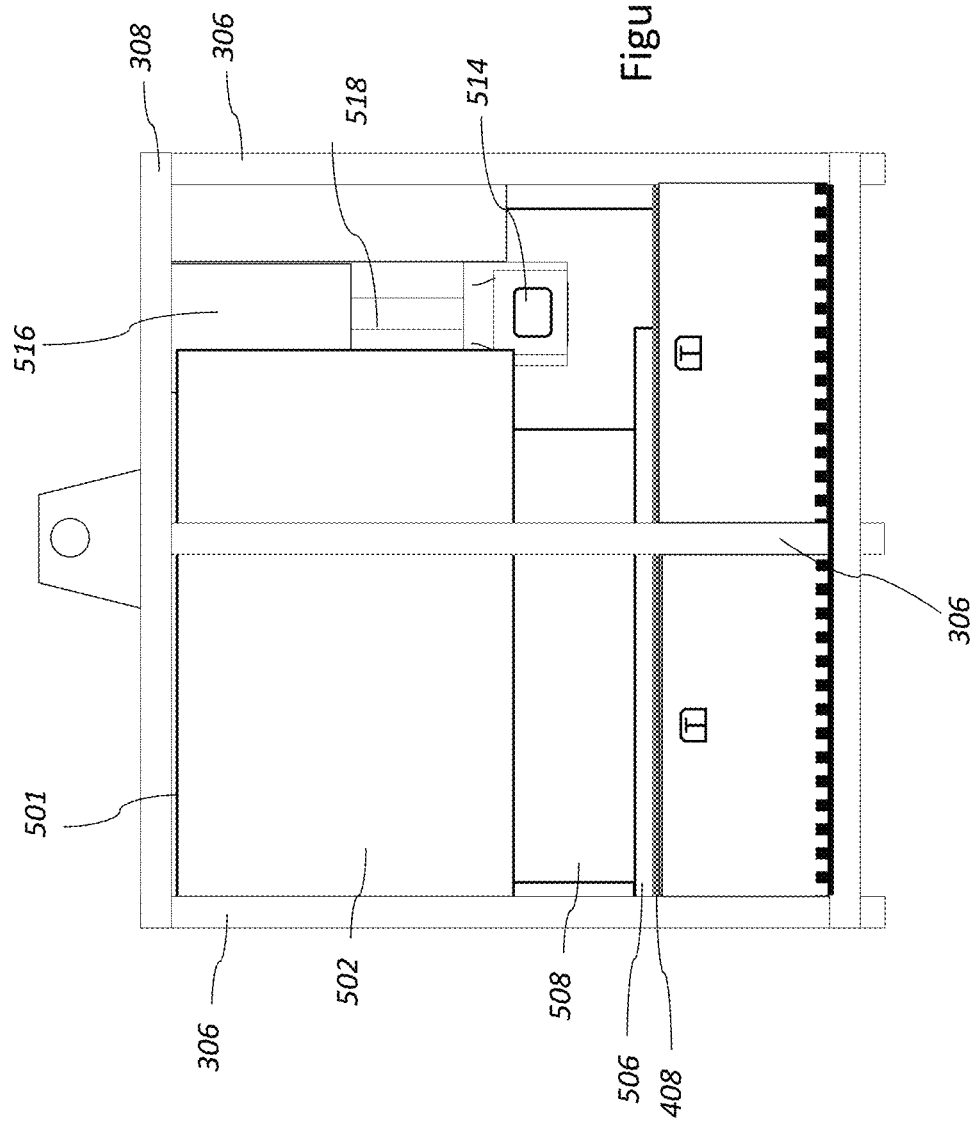

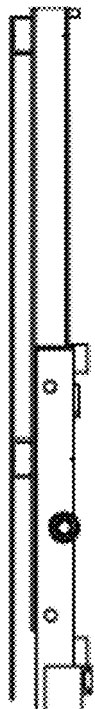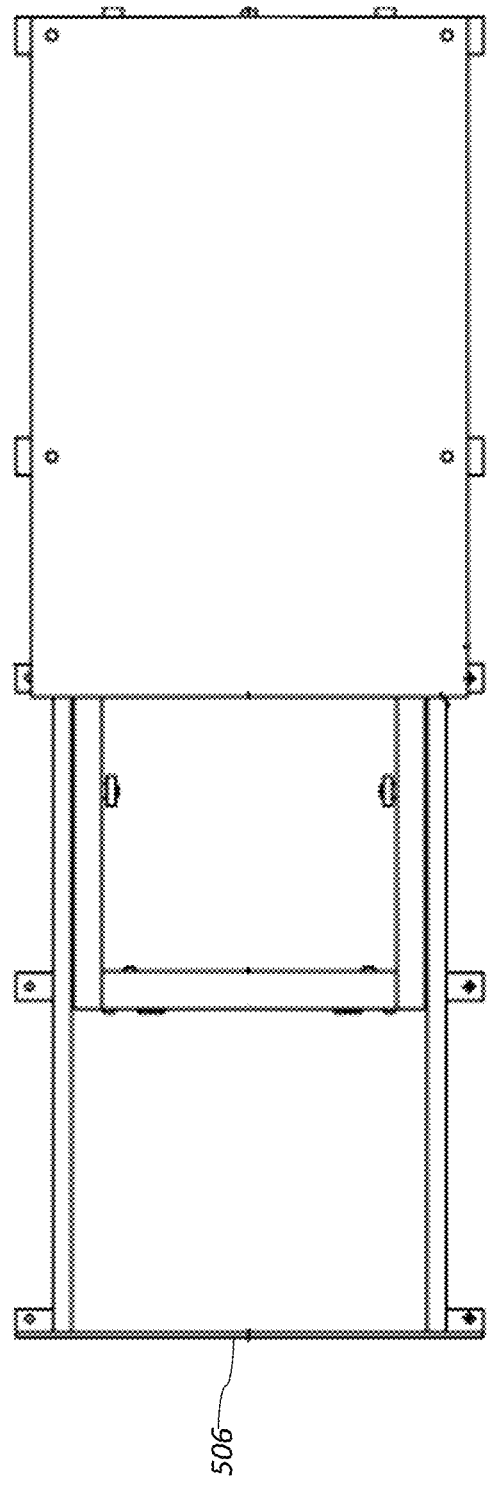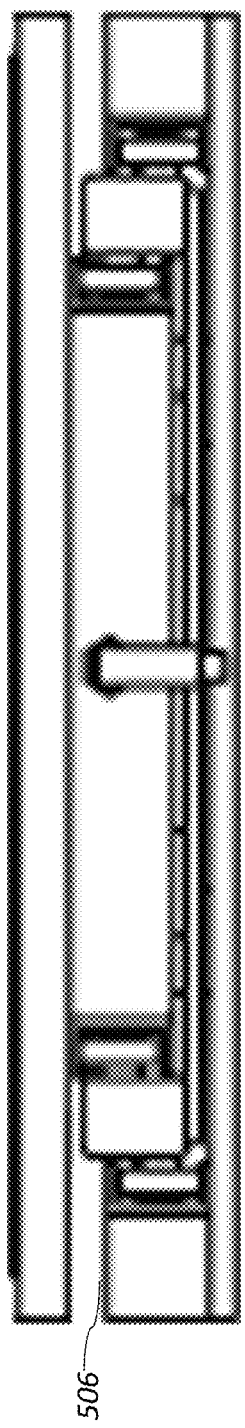

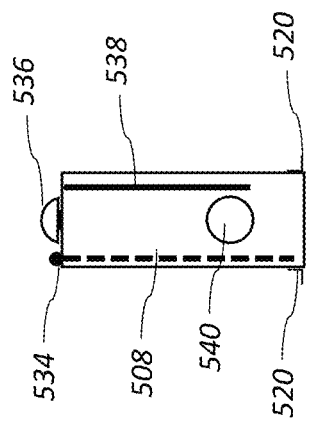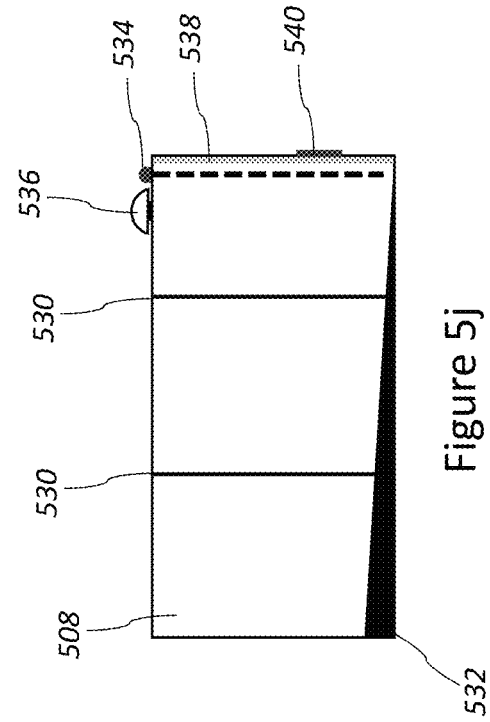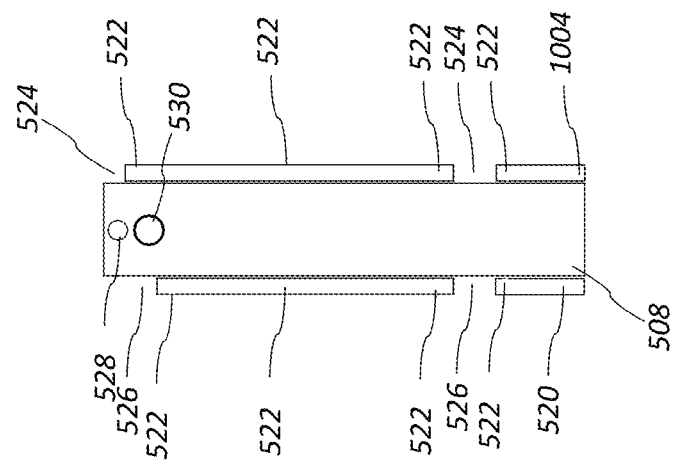

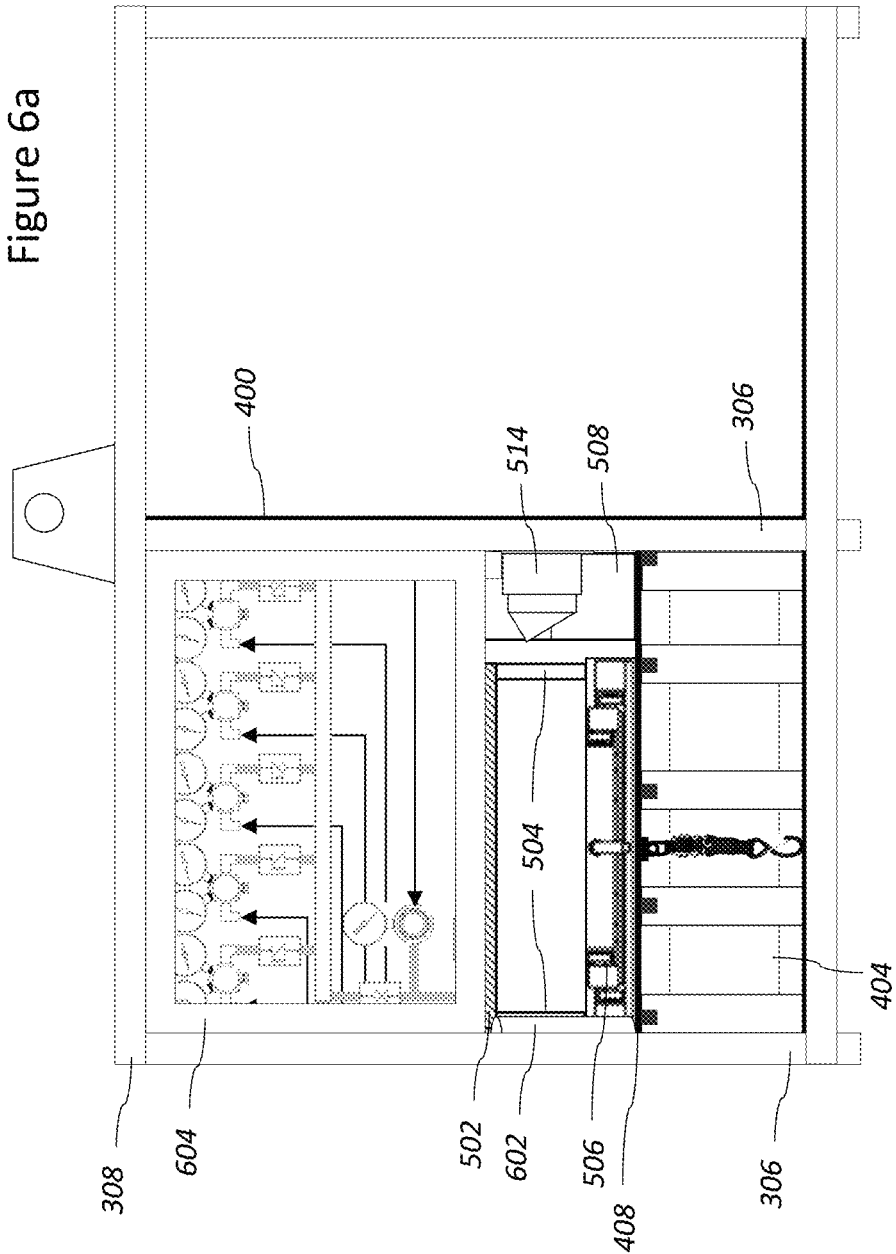

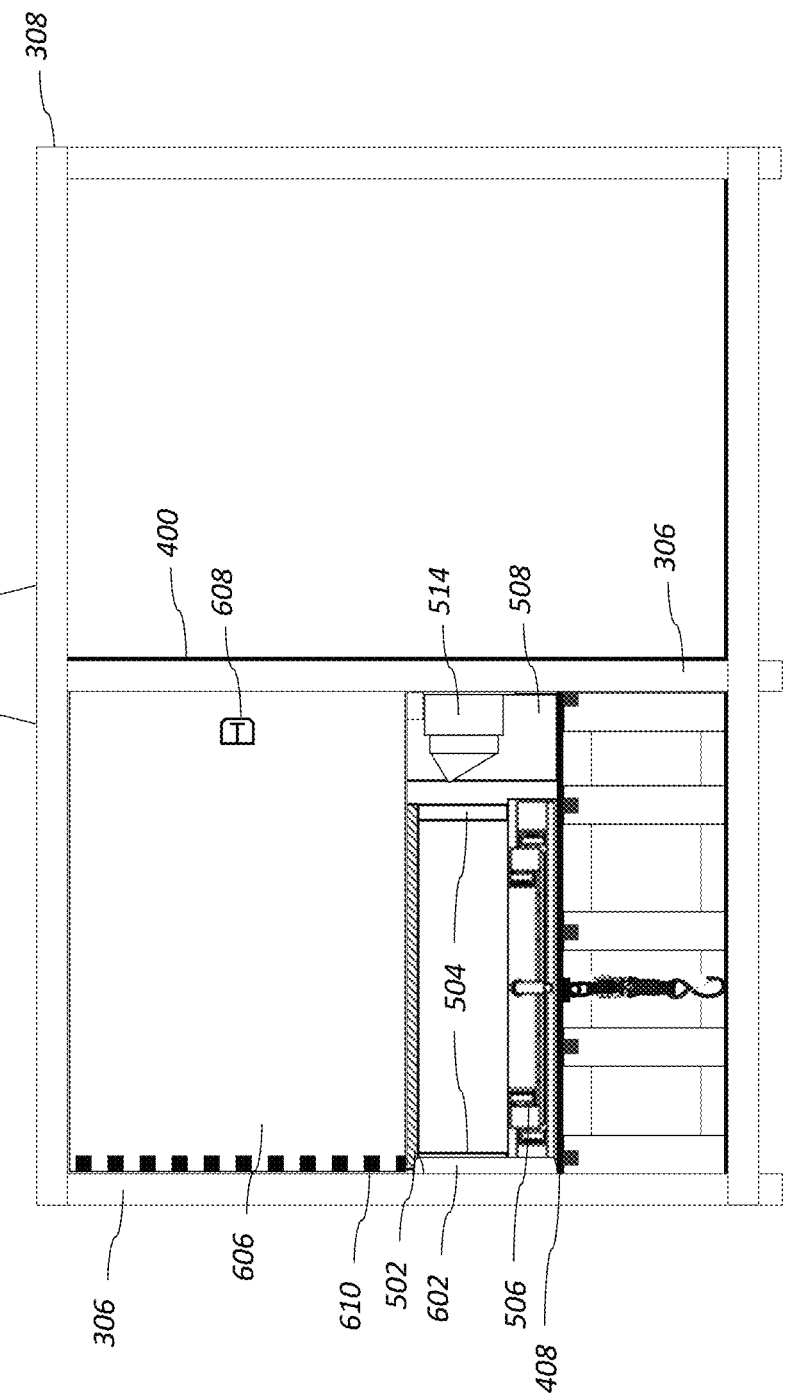

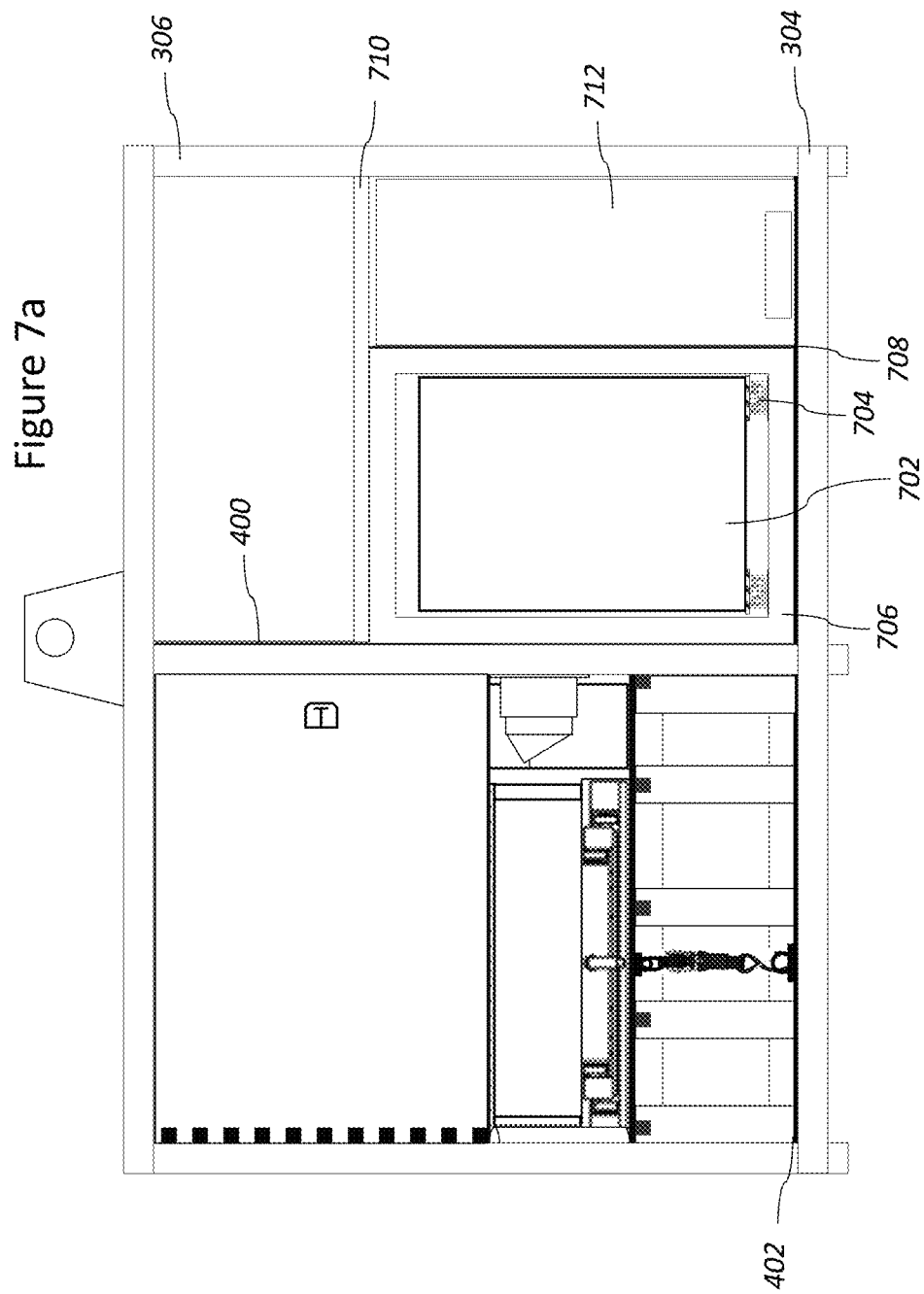

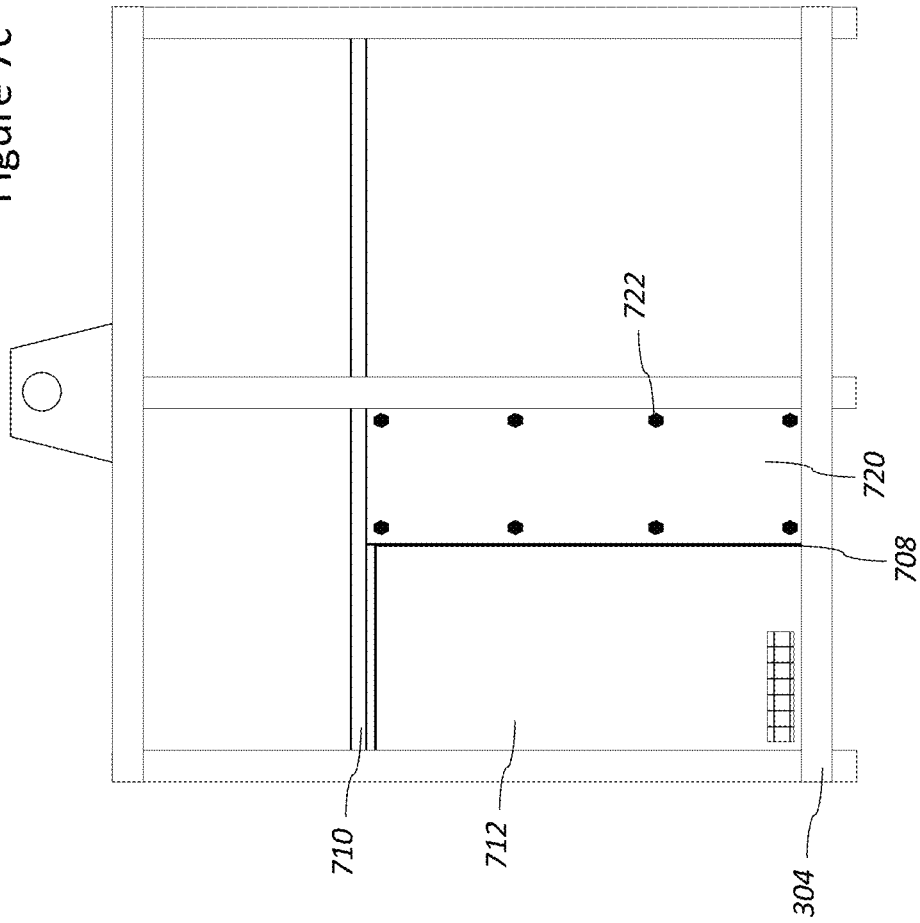

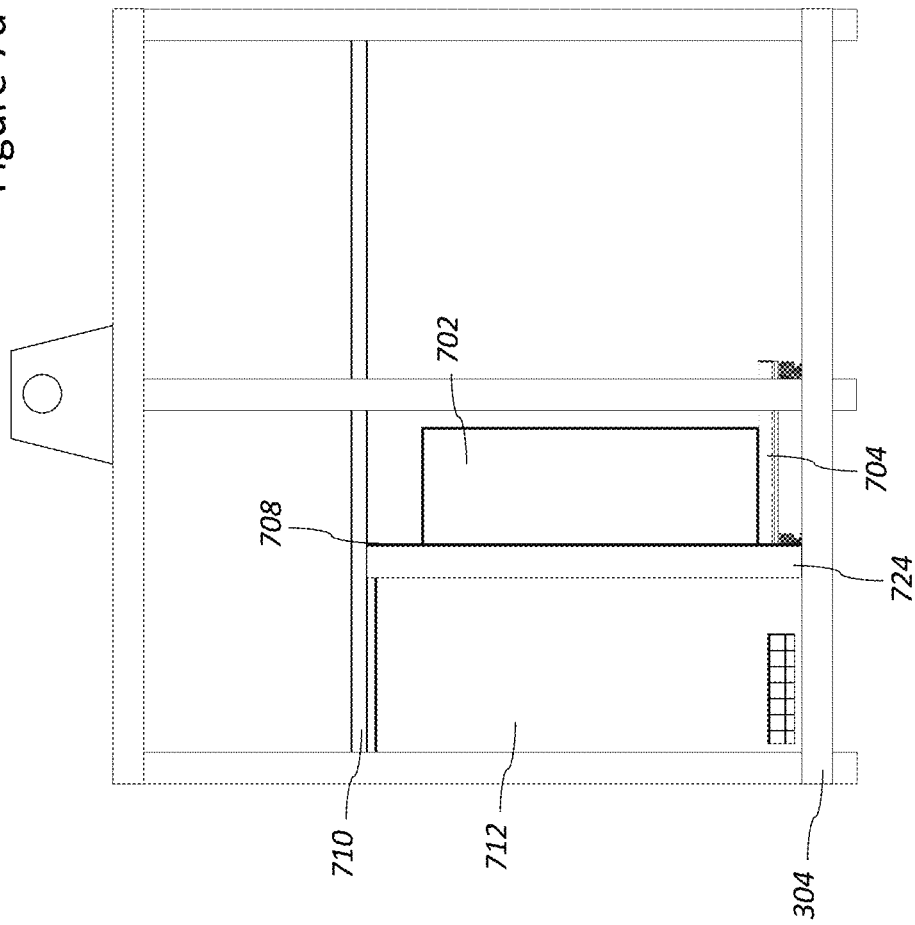

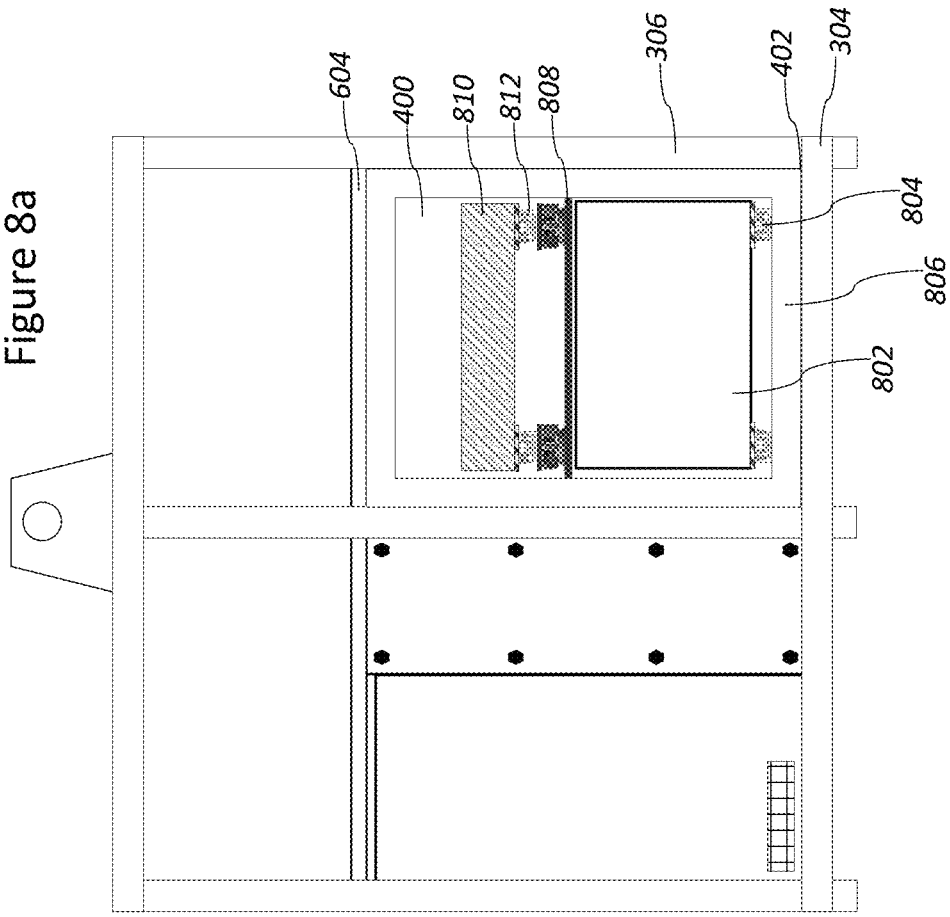

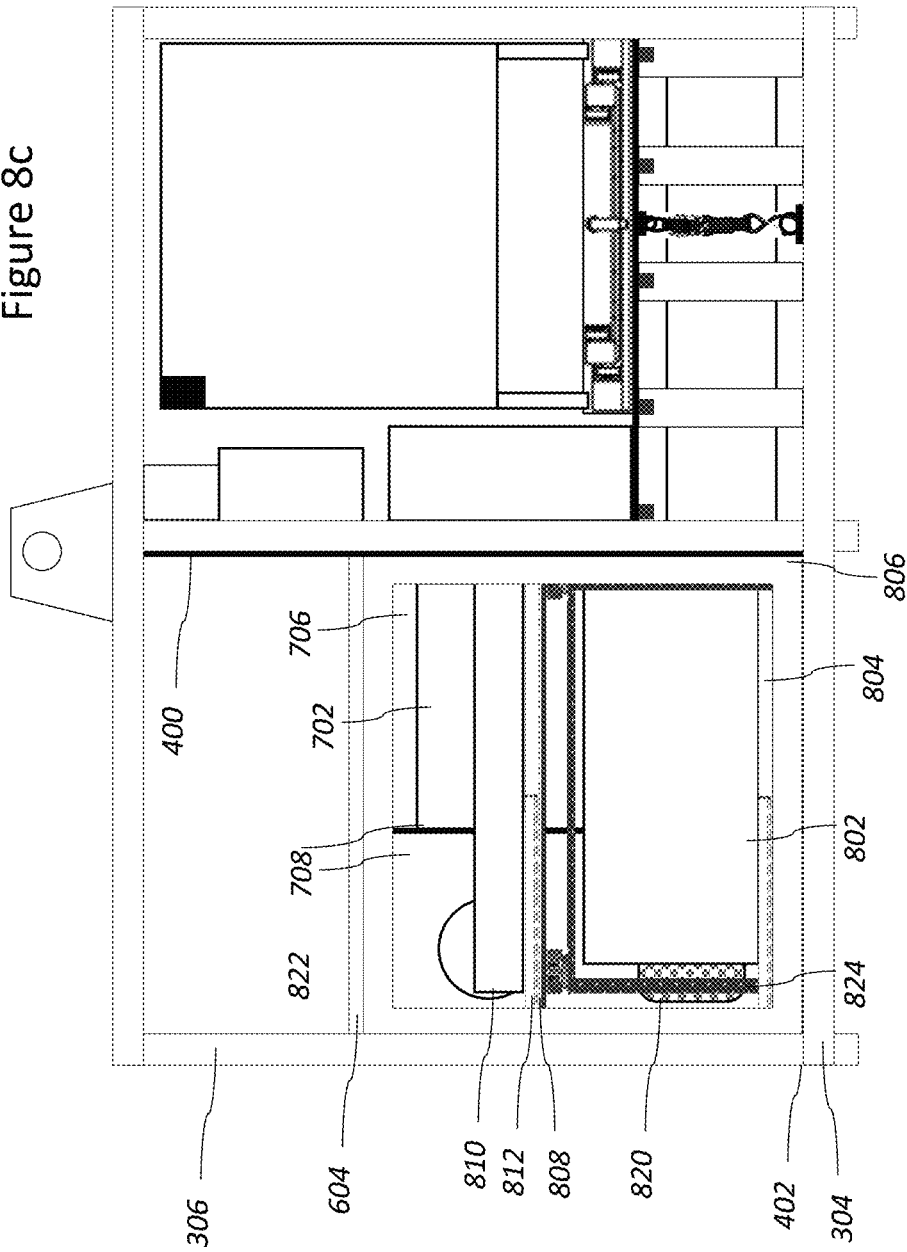

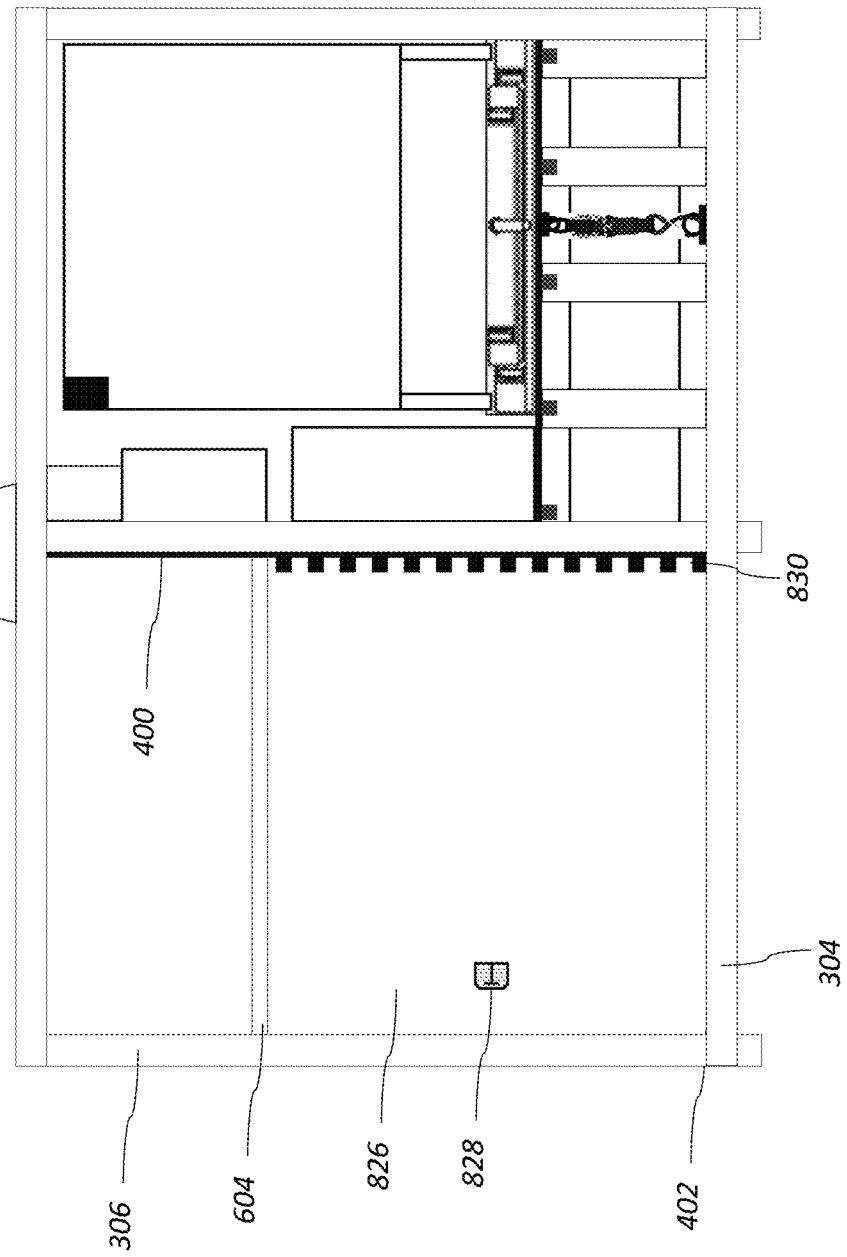

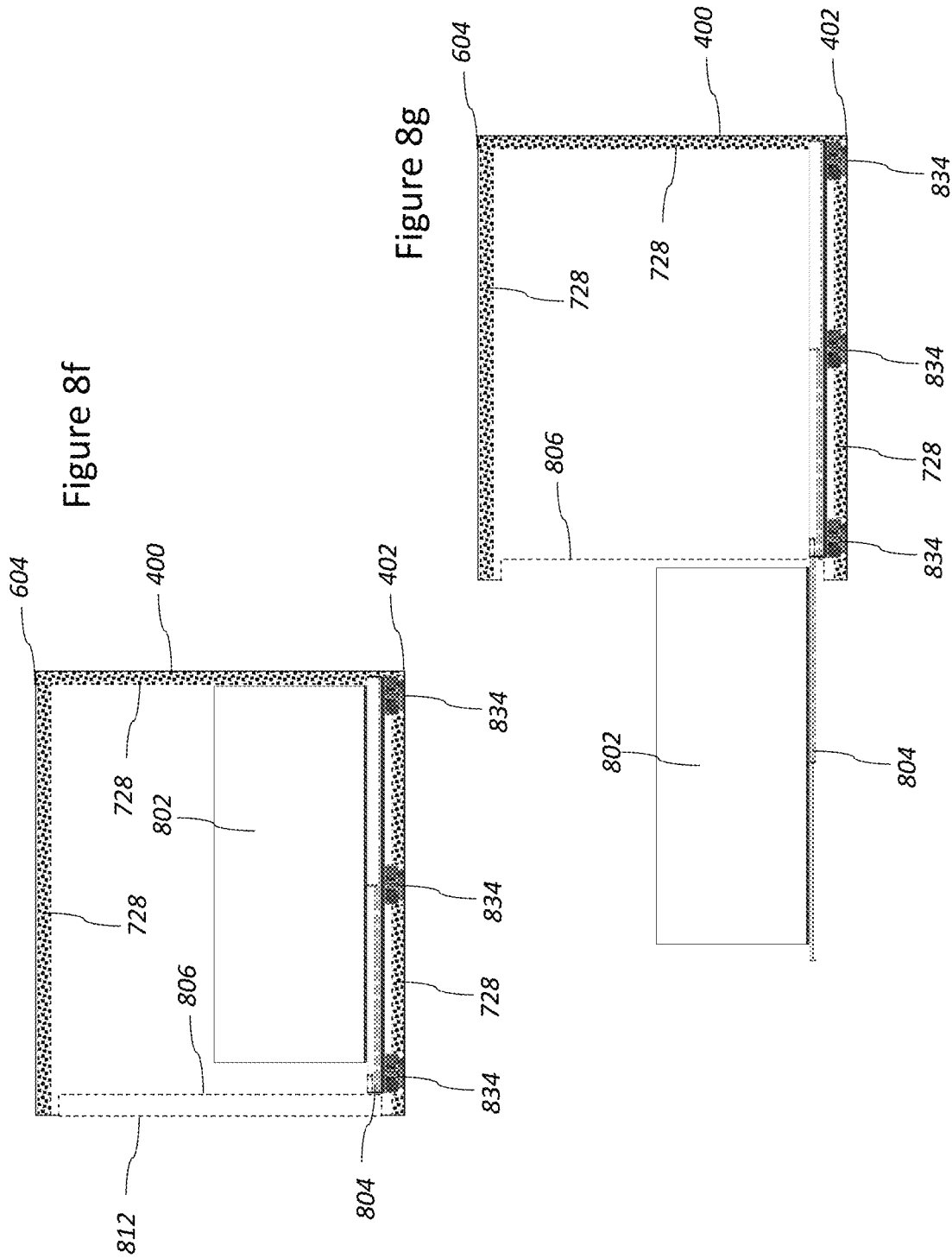

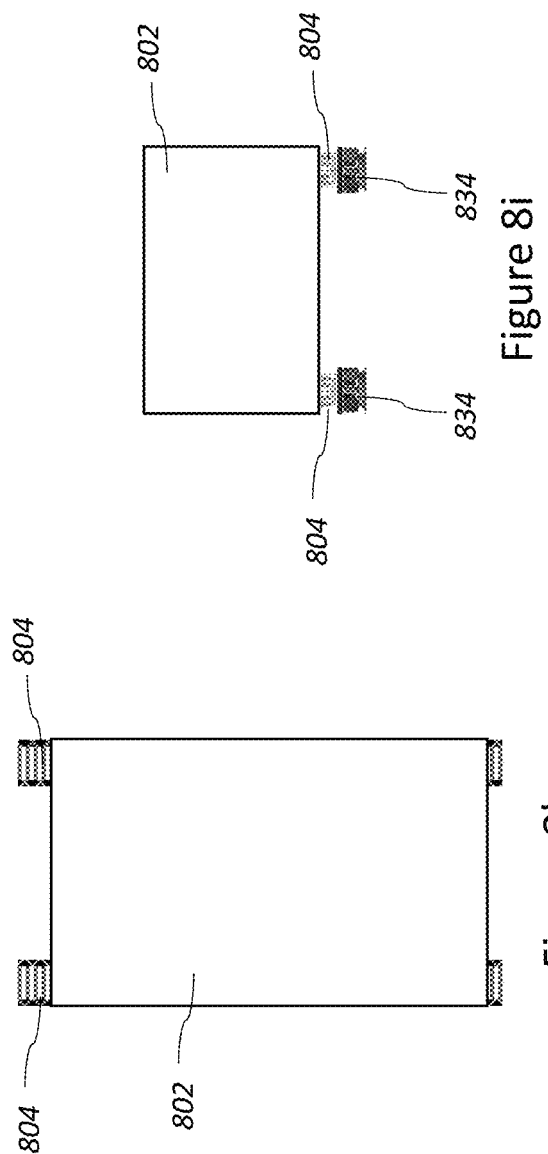

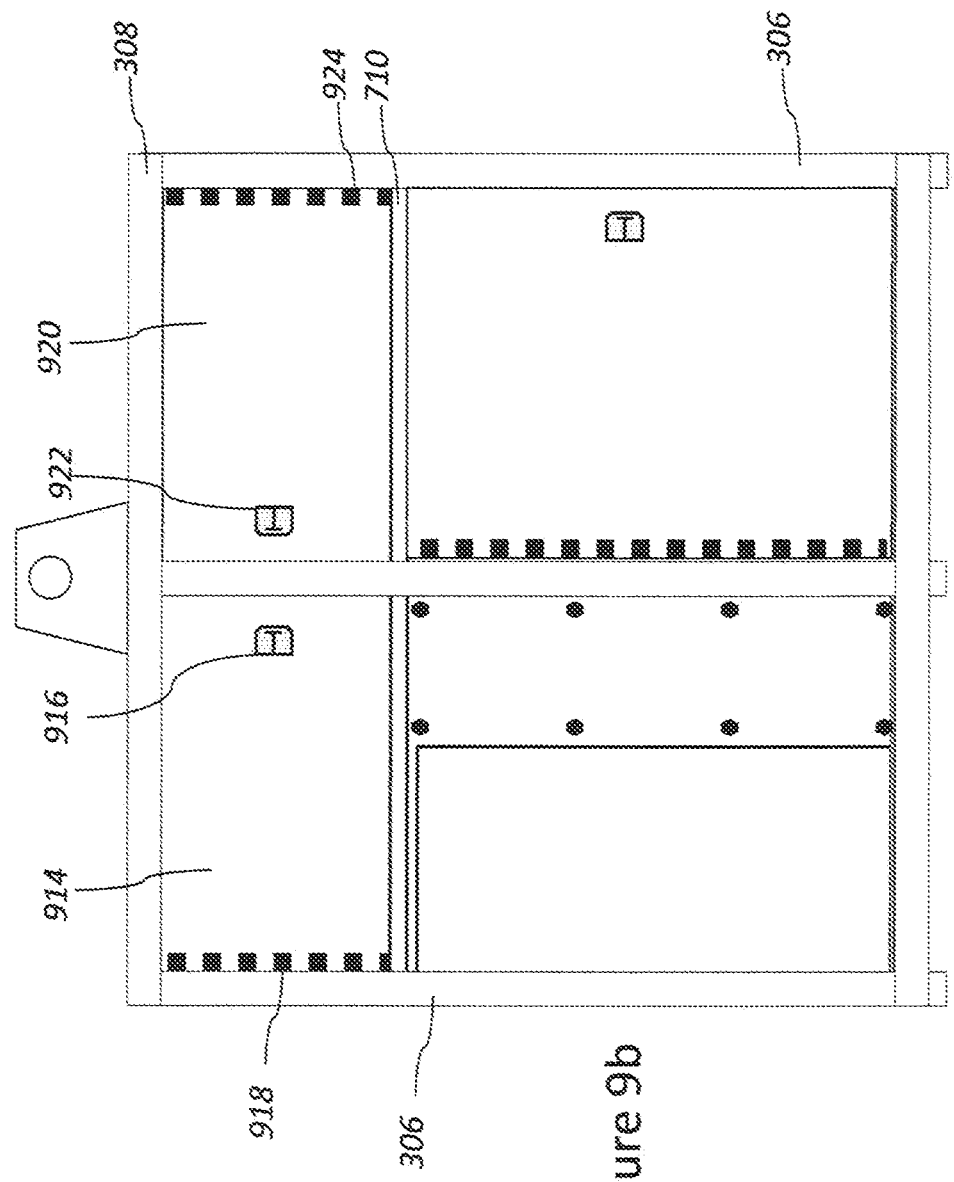

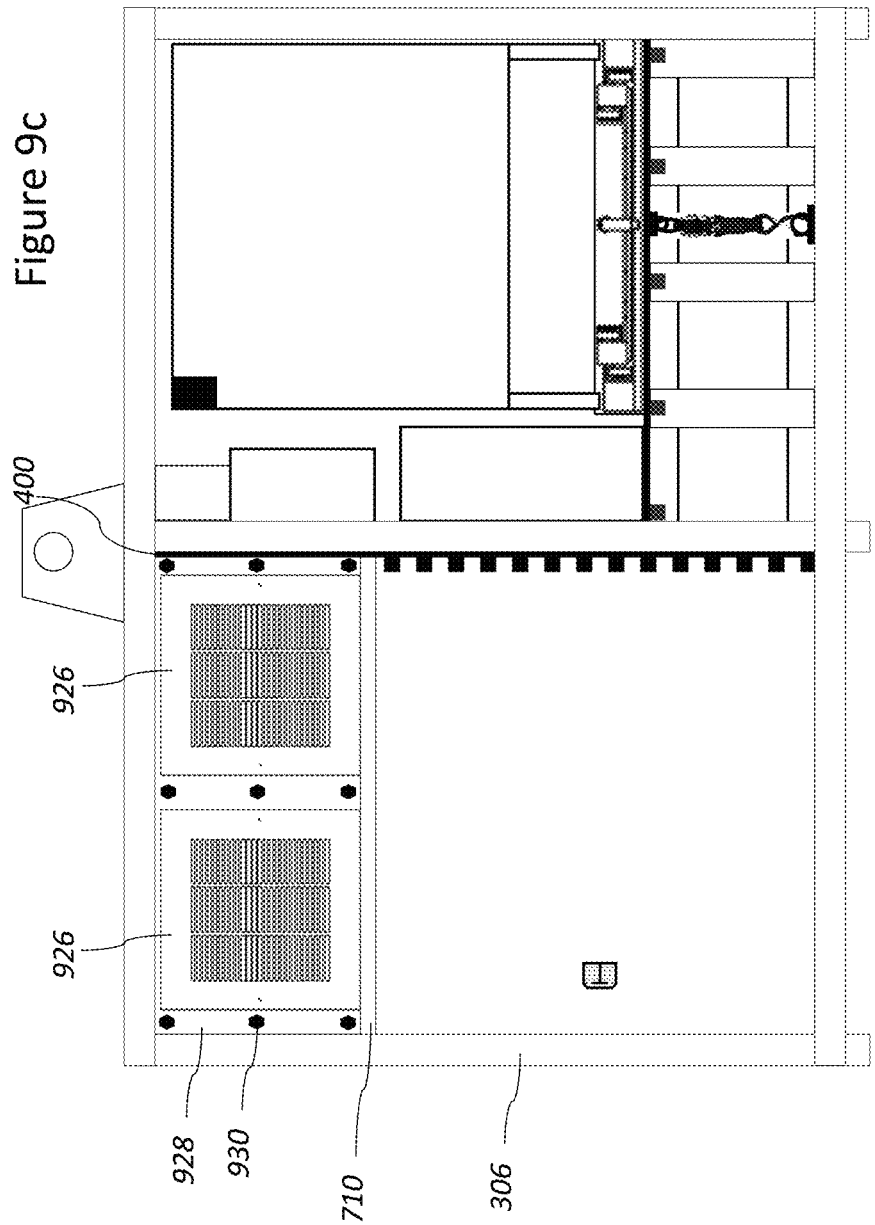

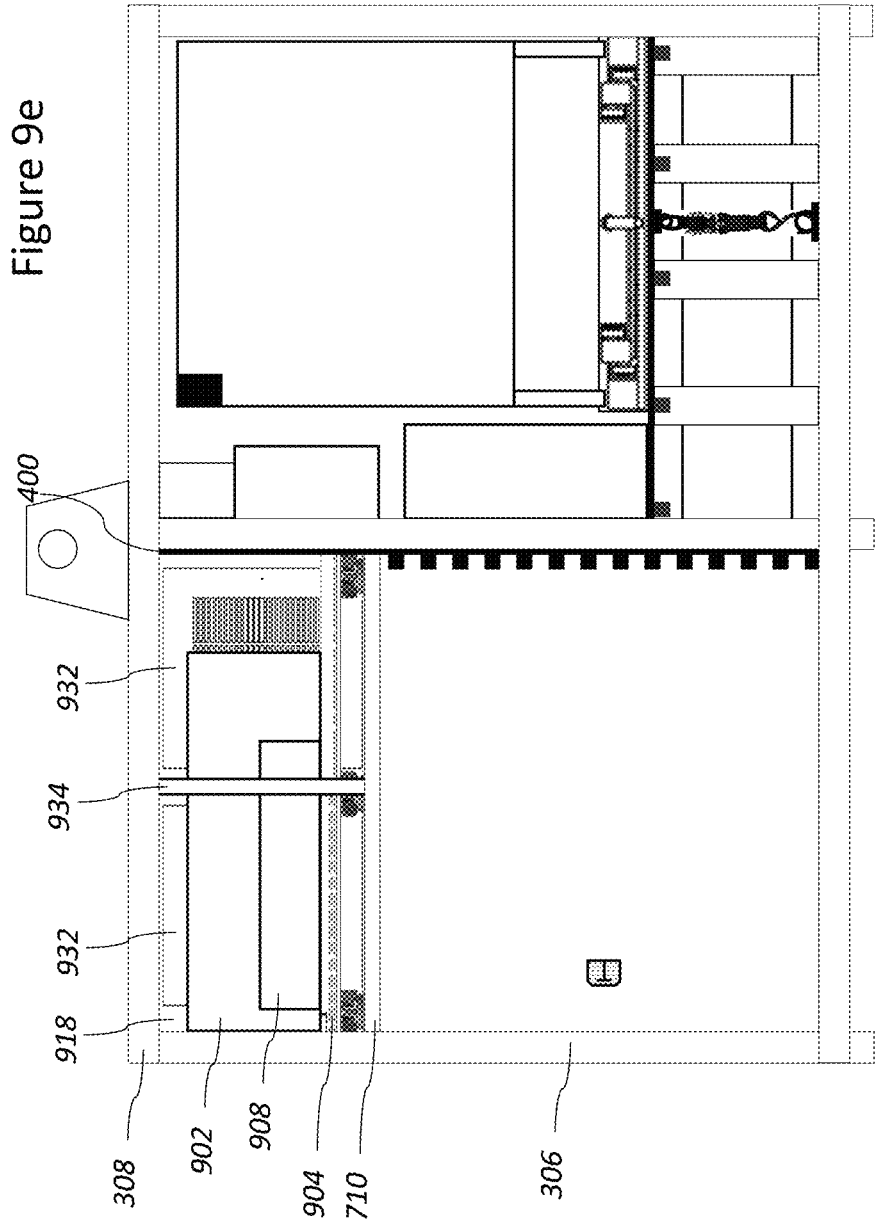

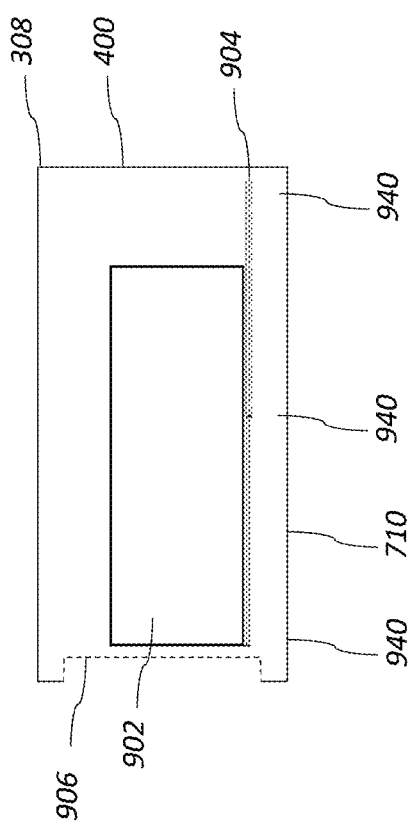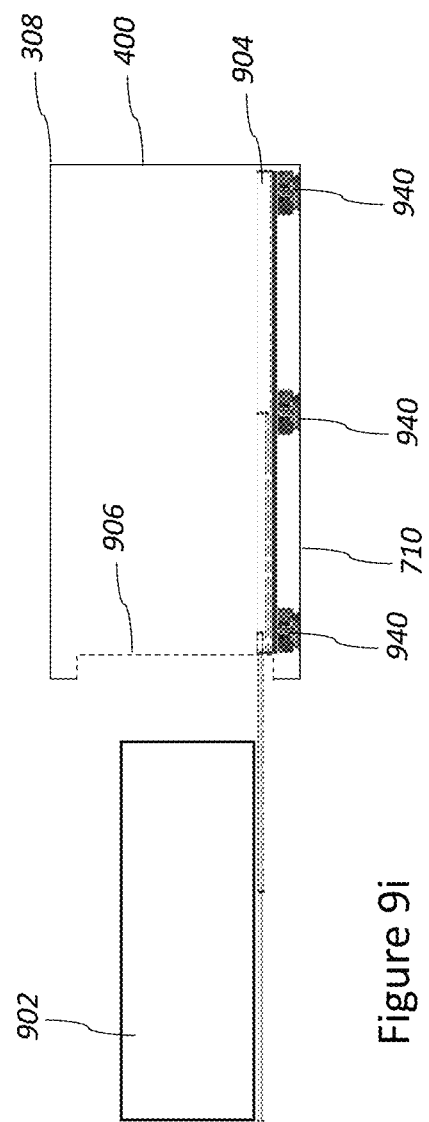

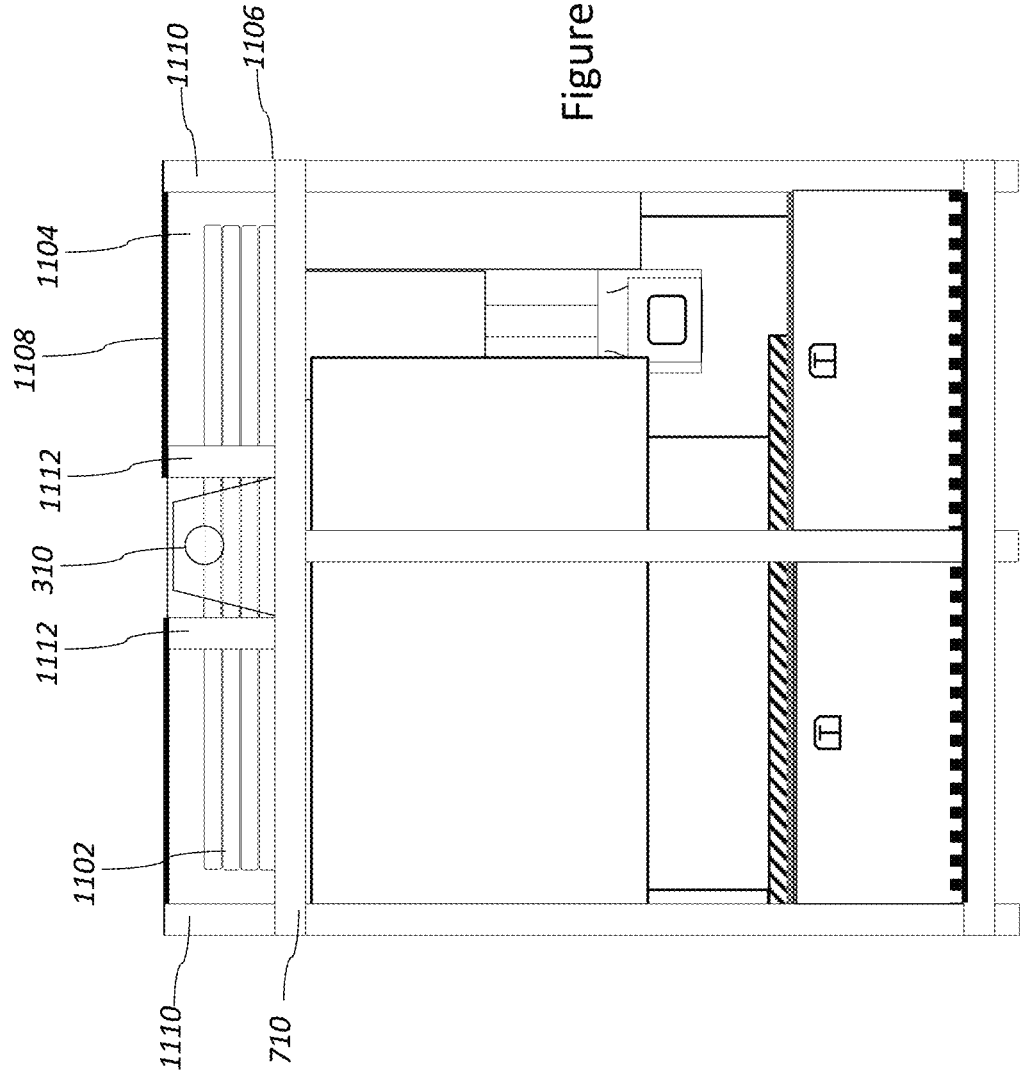

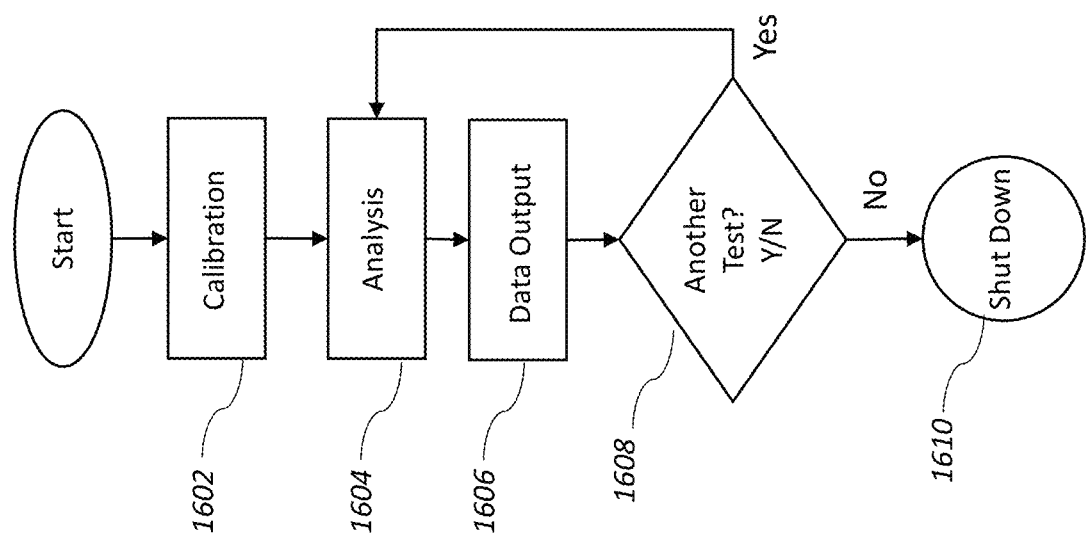

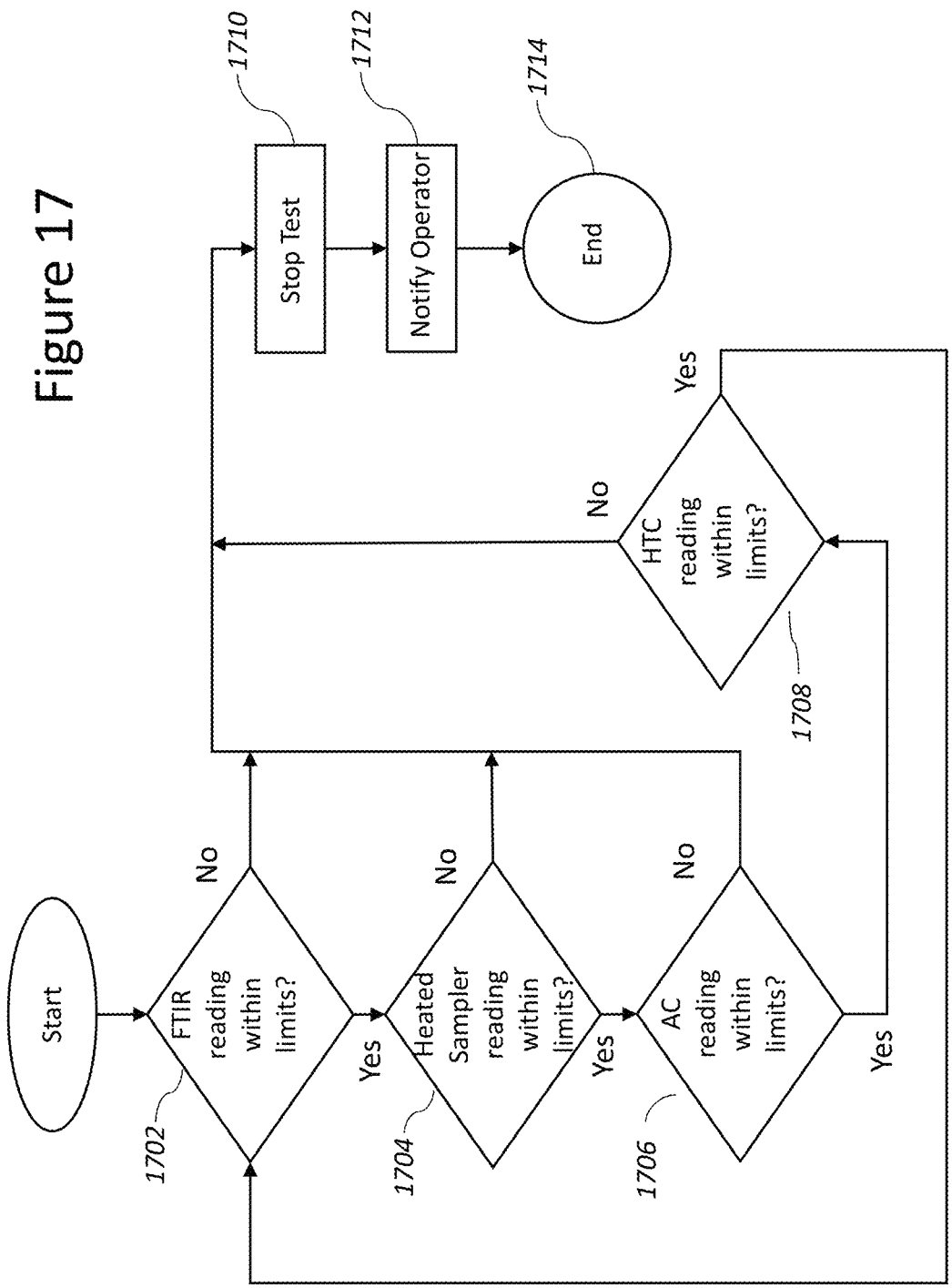

SYSTEMS AND METHODS FOR STATIONARY ENGINE EMISSIONS TESTING

TECHNICAL FIELD

This invention relates to exhaust emissions testing and analysis of stationary engines required by federal, state, tribal land, and other government air quality regulatory agencies. To be more specific, this invention relates to deployable, self-contained stack testing skids.

BACKGROUND ART

Within the natural gas sector of the energy business, upstream and midstream operating companies transport natural gas from wells to end-users through the following natural gas pipelines:

Flow Pipelines-move gas from wells to gathering pipelines.

Gathering Pipelines-combine Flow Pipelines to move gas to processing plants or storage.

Feeder Pipelines-move gas from Gathering Pipelines to processing and storage as well as from processing and storage to Transmission Pipelines.

Transmission Pipelines-move processed gas long distances to distribution stations.

Distribution Mains Pipelines-move gas from high-pressure Transmission Pipelines to low-pressure Service Pipelines.

Distribution Service Pipelines-move gas from Mains Pipelines to end users' metered connections.

For the gas to flow through the pipelines, they are connected through a network of internal combustion engine driven or electrically driven compressors, at Compressor Stations, that pressurize the pipelines.

In the upstream sector, low pressure wells may require a "gas lift" or "well-head compressor" to "pull" the gas out of the formation and into Flow Pipelines.

The midstream sector provides most of the gas transportation and begins the process with "gas gathering" systems where small diameter Gathering Pipelines, within a gas field, are gathered at field compressor stations. At field compressor stations, gas from the various wells is compressed and sent through larger Feeder Pipelines to a gas plant. At the gas plant, the "wet" natural gas is processed to remove valuable natural gas liquids (NGL) and suspended water molecules.

Once processed, the "dry" natural gas is compressed again and sent through Feeder Pipelines to large Transmission Pipelines for transport to distribution points throughout the country. Depending on the length of the Feeder Pipelines, additional compression may be required through the use of booster compressors aka Booster Stations every 50-100 miles.

The United State Environmental Protection Agency (US EPA) through various state Departments of Environmental Quality (DEQ), regulate the exhaust emissions of the compression engines through various analysis and compliance programs. Stack testing companies provide the required emissions analysis to the operating companies.

Presently, the most common types of analyzers capable of providing the required level of emissions analysis include but are not limited to: Fourier-transform infrared (FTIR) spectrometers, flame ionization detectors (FID) in conjunction with electrochemical cells, gas chromatographs (GC), and non-dispersive infrared (NDIR) detectors.

Although of different technologies, each type has common support requirements to include but not limited to: an exhaust gas sample taken at or near the top of the exhaust stack, sample processing at the stack sample location or a heated sample line to keep the sample gas from condensing in the sample line leading from the stack to the analyzer, and specialty gas injected into the exhaust gas sample.

Except for gas chromatography, where a "bag sample" can be taken at the exhaust stack and sent to a lab for analysis, each type requires that sampling and analysis be performed onsite in real-time.

Depending on the test type, stack testing companies use various vehicle-based configurations of analyzer and support equipment to conduct emissions testing such as enclosed utility trailers towed by a truck, pickup trucks with camper shells, or cargo vans.

By way of example, in general a technician will drive a testing vehicle and analyzer system to a test site, coordinate with the operating company's onsite mechanic, calibrate the analyzer, use a manlift to access a sample port near the top of an exhaust stack, connect the sample line to the sample port, and initiate a test. Tests, depending on the type, vary from 15 minutes to 3+ hours.

Currently, analyzers are only capable of conducting one test at a time. In an attempt to support operating company's requirements, several stack testing companies are incorporating two complete analyzers and supporting equipment into one vehicle or trailer-based testing system. This configuration allows one technician to test two exhaust stacks simultaneously as long as the stacks are in close proximity to each other since sample lines running from the stack to the truck are limited to approximately 200 feet.

The inventors have determined that there is a need for improved systems and methods in the field of fixed location engine emissions testing. The inventors have also identified advantages that can be achieved by developing an improved testing setup and delivery mechanism and automating testing processes, including increased efficiency and reduced personnel hours required in conducting such emissions testing.

BRIEF SUMMARY OF THE INVENTION

In an example embodiment, an electronically controlled portable testing system provides one or more self-contained, automated testing skids configured to perform required tests on the exhaust output of a stationary engine. The testing skids are configured for easy transportation on a medium duty truck and in a preferred testing process, are deployed to the engine site (and reloaded on the truck after testing is complete) using a lift attached to the truck.

In an example embodiment, the testing skid has a sturdy frame with lifting points allowing the skid to be loaded and unloaded from a vehicle using a crane or lift. Within the frame are mounted all the necessary components for conducting one or more predetermined tests. For example, the skid may include a generator and generator fuel tank, nitrogen generator, compressed gas cylinders, flow control hardware, HVAC unit for environmental control, networking and other electronic equipment, oxygen, and other sensors, FTIR analyzer, heated sample pump, Heat Trace Controller (HTC), and a storage area for sample lines.

Moreover, in an example embodiment, the frame and components are surrounded by a housing that provide access doors and other access points for servicing the equipment installed in the skid. Equipment requiring frequent service, such as the generator, is mounted in respective compartments in the skid with slide-out carriers that allow installation and maintenance access.

In an example embodiment, a programmable logic controller for controlling and performing test sequences, and a host computer for processing data and formatting test reports, are provided along with operating software in each device that implements the desired test processes.

The disclosed systems and methods provide a variety of significant unobvious advantages. Using these systems and methods, a single technician can concurrently test multiple exhaust stacks on engines separated by any distance, from 100 feet to miles apart. In an embodiment, the testing skids provide the technician with wireless remote control of testing and indicate the status of the system and the test being performed to enable real-time monitoring when the technician is at another location. Thus, the disclosed systems and methods increase the efficiency, accuracy and repeatability of tests.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention. In the drawings, like reference numerals may be used to designate like parts.

FIG. 3a is a front view of an example testing skid structural frame.

FIG. 3b is a side view of the example testing skid structural frame of FIG. 3a.

FIG. 3c is an overhead view of the exemplary testing skid base structural frame of FIGS. 3a and 3b.

FIG. 3d is an overhead view of an example testing skid internal h-lifting frame.

FIG. 4a is a frontal view of an example compressed gas cylinder compartment located in the left side of the testing skid, with access panels open.

FIG. 4b shows the example compressed gas cylinder compartment of FIG. 4a with access panels closed.

FIG. 4c is a side view of the example compressed gas cylinder compartment.

FIG. 4d is an overhead view of an example generator deck support substructure located in the testing skid.

FIG. 4e is an overhead view of the example compressed gas cylinder compartment of FIGS. 4a through 4c, combined with the example generator deck support substructure of FIG. 4d.

FIG. 4f is a front view of a two different generator deck support posts.

FIG. 5a is a front view of an example generator compartment located in the front of the testing skid.

FIG. 5b is a side view of the generator compartment of FIG. 5a.

FIG. 5f is a side view of an example generator slide-out.

FIG. 5g is a top view of the generator slide-out of FIG. 5f.

FIG. 5h is a front view of the generator slide-out of FIGS. 5f and 5g.

FIG. 5i is a top view of an example generator fuel tank.

FIG. 5j is a side view of the generator fuel tank of FIG. 5i.

FIG. 5k is a front view of the generator fuel tank of FIGS. 5i and 5j.

FIG. 6a is a front view of an example flow control equipment compartment located in the testing skid, with the access panel door open.

FIG. 6b is a front view of the flow control equipment compartment of FIG. 6a with the access panel door closed.

FIG. 7a is a front view of an example arrangement of a nitrogen generator, installed in part of an environmentally controlled compartment with the access panel door open to show an on-board HVAC unit that provides climate control to the environmentally controlled compartment.

FIG. 7c is a side view of an on-board HVAC unit with a removable access panel to an environmentally controlled compartment in place.

FIG. 7d is a side view of an on-board HVAC unit of FIG. 7c with the access panel removed.

FIG. 8a is a front view of an example analyzer and associated electronics equipment installed in an example environmentally controlled compartment in one side of a testing skid, with an access panel door in open position.

FIG. 8c is a side view of the example arrangement of FIGS. 8a and 8b showing a side access panel door in open position.

FIG. 8d is a side view of the example arrangement of FIGS. 8a through 8c showing the side access panel door in closed position.

FIG. 8f is a side view of an analyzer installation.

FIG. 8g is a side view of an analyzer in an extended outboard position.

FIG. 8h is an overhead view of an analyzer installation.

FIG. 8*i* is a front view of an exemplary analyzer installation.

FIG. 9*b* is a front view of an example heated sample pump and temperature control module installed in a ventilated compartment with access panel doors closed.

FIG. 9*c* is a side view of an example ventilated compartment exhaust fan installation.

FIG. 9*e* is a side view showing example ventilated compartment inlet air filter screens.

FIG. 9*h* is a side view of a heated sample pump installation.

FIG. 9*i* is a side view of a heated sample pump in the extended outboard position.

FIG. 11*d* is an opposite side view of an example testing skid with a sample line compartment installation above an internal H-shaped lifting frame.

FIG. 16 is a flow chart of an exemplary power-up sequence for the system.

FIG. 17 is a flow chart of an exemplary testing process providing automated shutdown and notification to the operator when monitored parameters are out of limits.

BEST MODE FOR CARRYING OUT THE INVENTION

The present invention will be described in terms of one or more examples, with reference to the accompanying drawings.

The present invention will also be explained in terms of exemplary embodiments. This specification discloses one or more embodiments that incorporate the features of this invention. The disclosure herein will provide examples of embodiments, including examples from which those skilled in the art will appreciate various novel approaches and features developed by the inventors. These various novel approaches and features, as they may appear herein, may be used individually, or in combination with each other as desired.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, persons skilled in the art may implement such feature, structure, or characteristic in connection with other embodiments whether or not explicitly described.

In embodiments of the invention disclosed herein where systems are electronically controlled by a processor, the electronic controls may be implemented in hardware, firmware, software, or any combination thereof. Embodiments of the invention may also be implemented as instructions stored on a machine-readable medium, which may be read and executed by one or more processors, typically distributed in a network. A machine-readable medium may include any mechanism for storing or transmitting information in a form readable by a machine (e.g. a computing device). For example, a machine-readable medium may include read only memory (ROM); random access memory (RAM); hardware memory in handheld computers, tablets, smart phones, and other portable devices; magnetic disk storage media; optical storage media; flash memory devices; electrical, optical, acoustical, or other forms of propagated signals (e.g. carrier waves, infrared signals, digital signals, analog signals, etc.), Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Figure 1A:
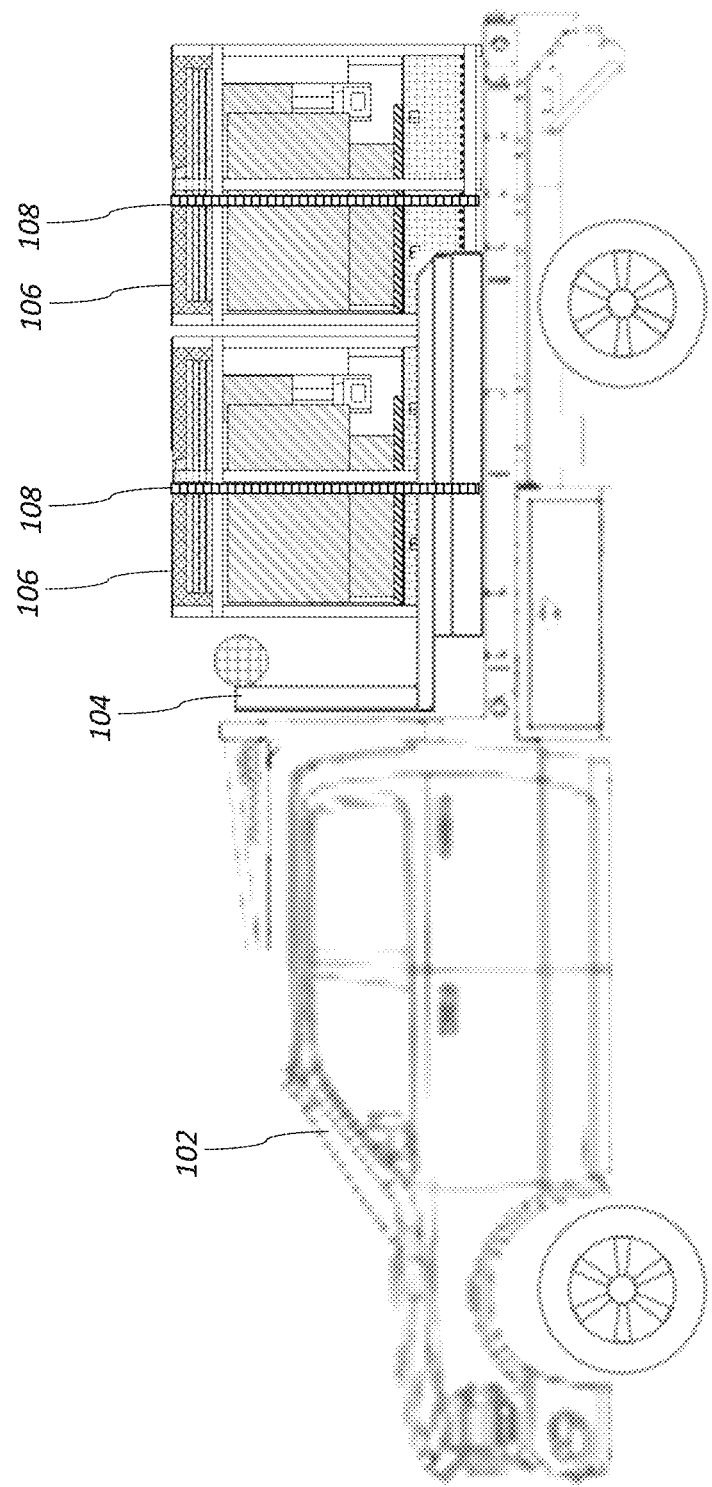
FIG. 1a is a side view of an example vehicle and crane system loaded with two testing skids.
Figure 1B:
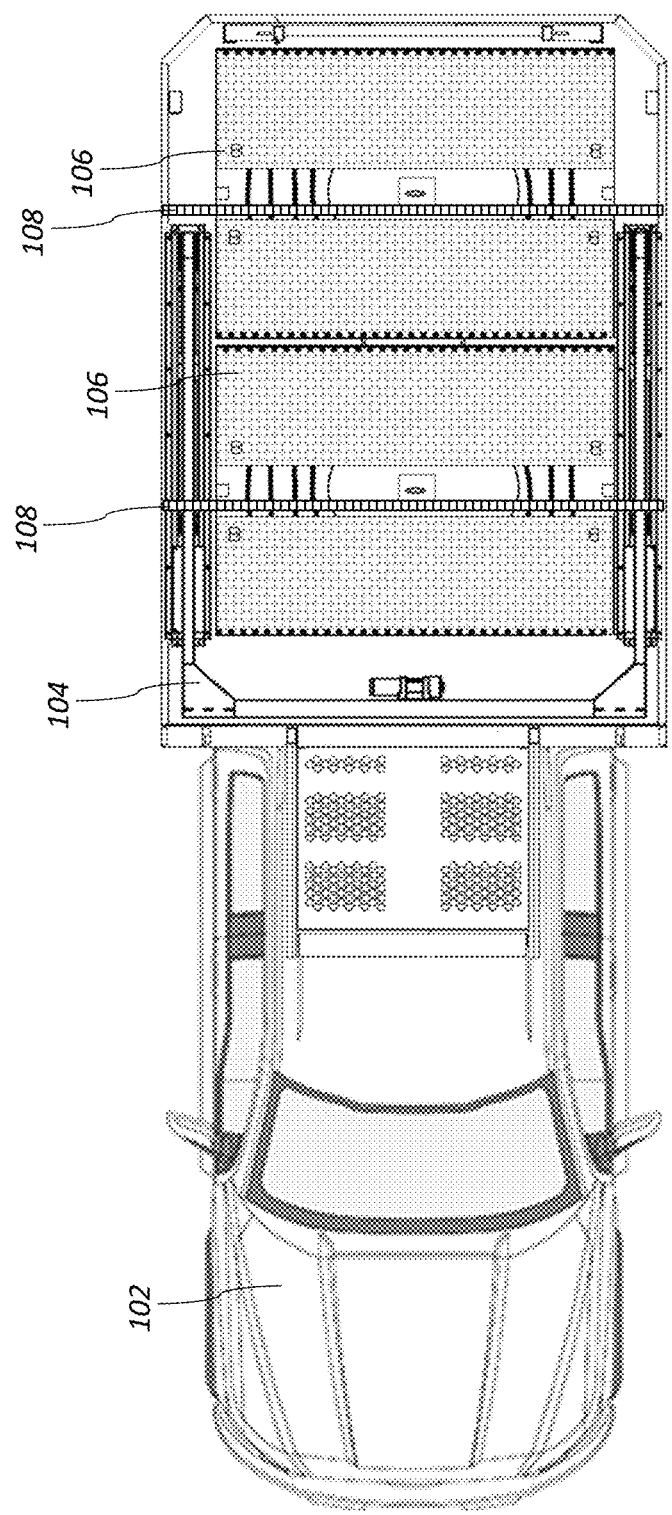
FIG. 1B is an overhead view of an example vehicle and crane system loaded with two testing skids.
Figure 1C:
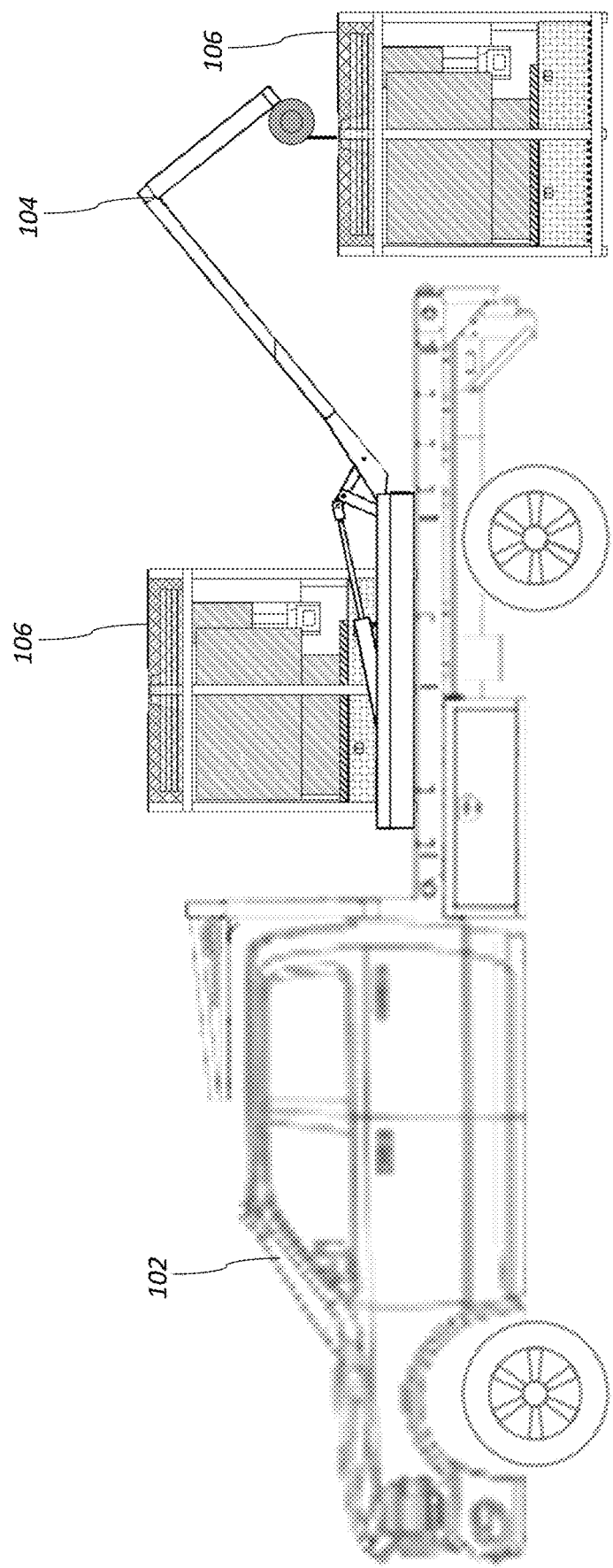
FIG. 1c is a side view of an example vehicle and crane system loaded with one testing skid and deploying a second testing skid.

An example embodiment of the present invention provides an improved electronically controlled portable testing system. Referring now to FIG. 1*a*, an example testing system includes a vehicle 102, crane or lift 104, with one or more testing skids 106 loaded on vehicle 102 and secured using winch straps 108. In a preferred embodiment two testing skids can be carried and delivered to test sites on a medium duty truck. FIG. 1B shows an overhead view of the system of FIG. 1*a*. As shown in FIG. 1*c*, testing skid 106 is preferably deployed from example vehicle 102 to the ground near a test exhaust stack, using lift 104.

Figure 2:
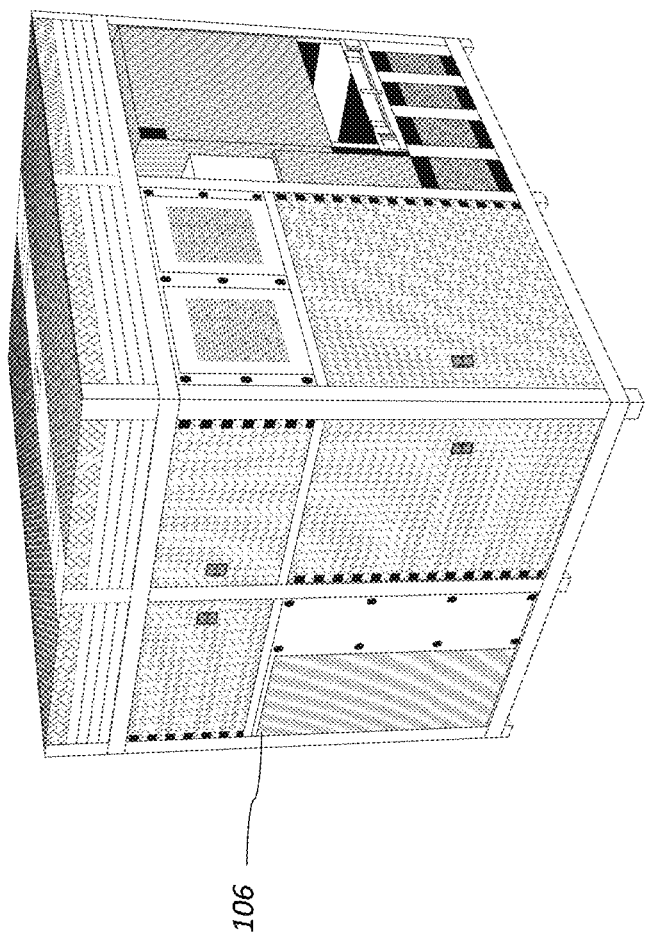
FIG. 2 is a right rear isometric view of an example testing skid.

FIG. 2 is a right rear isometric view of an example embodiment of the testing skid 106 referenced in FIGS. 1*a*-1*c*. Further details of the construction of this preferred embodiment of testing skid 106 are illustrated in FIGS. 3 through 11 and described herein with reference to those drawing figures.

FIG. 3*a* is a front view of testing skid 106. As shown in FIG. 3*a*, feet or landing legs 302 are connected to a base structural frame 304. In the example embodiment, base frame 304 is connected to an internal lifting frame 308 by nine vertical framing posts 306. A lifting bale mounting plate 312 connects the lifting frame to the lifting bale 310. Lifting bale 310 is positioned at the horizontal center of gravity of the skid. FIG. 3b is a side view of testing skid 106 showing the integral frame 304 as described in FIG. 3a. FIG. 3c is an overhead view of base structural frame 304 showing nine vertical posts 306 and cross bracing of 304. FIG. 3d is an overhead view of internal lifting frame 308 showing exemplary structural crossmembers, bracing, and bale mounting plate 312.

FIG. 4a is a left side view of testing skid 106 illustrating a bottom deck plate 402 attached to the top of base structural frame 304. This view presents a side view of a compartment containing specialty compressed gas cylinders 404, required for some types of emissions testing, located on gas cylinder racks 406. The top of the compartment in this embodiment is also the bottom of generator deck plate 408 supported from below by 25 generator deck support posts 410 and 412, which are shown in more detail in FIGS. 4d and 4e. The sides of the compartment, as seen in FIG. 4c, are preferably open while the front of the compartment has two access doors, as seen in FIG. 4b, mounted on compartment door frames 414.

FIG. 4b shows compartment doors 416, with door handles 418, mounted to compartment door frames 414 using accordion hinges 420. Compartment doors 416 open downward, facilitating the loading and unloading of compressed gas cylinders 404. Compartment doors 416 are preferably installed on the valve side of compressed gas cylinders 404 to protect the valves and gas lines from damage.

Figure 4G:
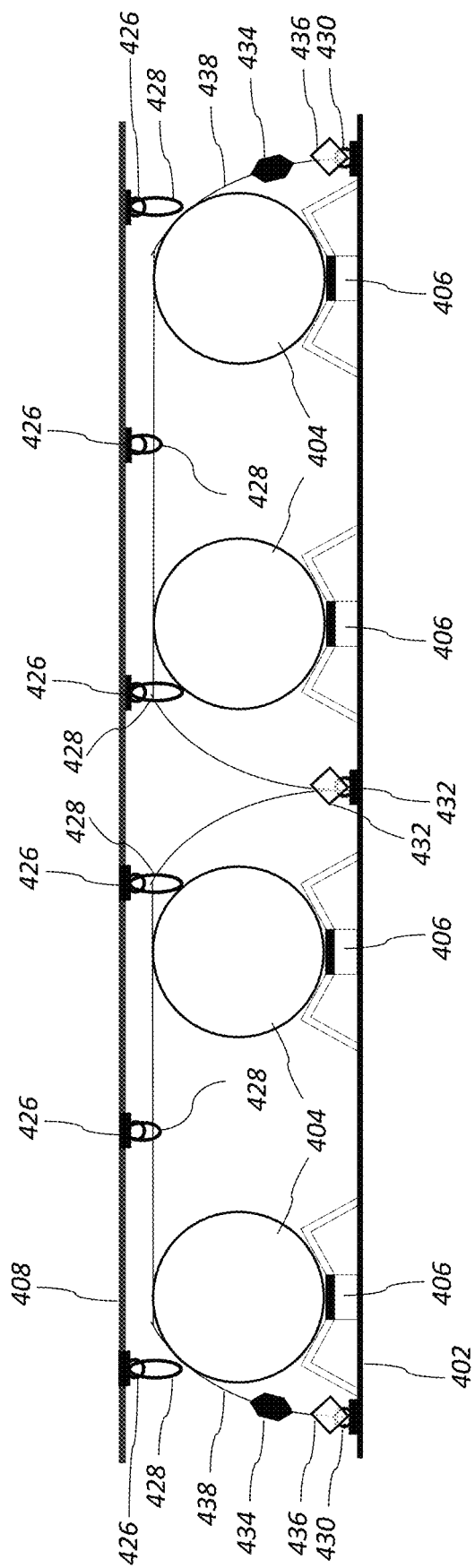
FIG. 4g is a front view of a compressed gas cylinder retaining system.

FIG. 4c is a side view of the same compressed gas cylinder compartment and illustrates generator deck support posts 410 and 412 connected to generator deck support stringers 422 supporting generator deck 408. Additional views of the layout are provided in FIGS. 4d, 4e, and 4f. Attached to the right side of the center vertical framing post 306 is center skid dividing wall 400, which divides testing skid 106 into a left and right side. Compressed gas cylinder hold-down assembly 424 secures compressed gas cylinders 404 in compressed gas cylinder racks 406, shown in more detail in FIG. 4g.

FIG. 4d is an overhead view of the substructure of generator deck 408, particularly showing generator deck supports 410 and 412 connected by generator deck support stringers 422.

FIG. 4e illustrates the same view as FIG. 4d with the addition of compressed gas cylinders 404, gas cylinder racks 406, two compressed gas cylinder hold-down assemblies 424, compartment doors 416, and compartment door frames 414.

FIG. 4f is a side view that illustrates notches formed in both the center 410 and edge 412 generator deck support posts for the generator deck stringers 412, based on their positions as indicated in FIG. 4d.

FIG. 4g is a front view of the compressed gas cylinder compartment and shows gas cylinder hold-down assemblies 424. In the embodiment shown in FIG. 4g, gas cylinder rack 406 is equipped with a cushioning material and runs the length of the gas cylinder compartment and is mounted to bottom deck plate 402. Six eyebolts 426 with attached elastic shock cord 428 are mounted on the underside of generator deck plate 408 between the second and third generator deck support stringers 422 and spaced as illustrated. Two eyebolts 430 are mounted on bottom deck plate 402 on both the left and right outside gas cylinder racks 406 between the second and third generator deck support stringers 422. One eyebolt 432 is mounted on bottom deck plate 402 between the two center gas cylinder racks 406 and between the second and third generator deck support stringers 422 Two 1.5-inch ratchets 434 connect with a retained hook clip 436 to the two outside eyebolts 430. 1.5-inch ratchet straps 438 connect to ratchet strap ratchets 434, route over gas cylinders 404, through ratchet strap retaining shock cords 428, and connect with retained hook clips 436, to eyebolt 432. By routing ratchet strap 438 through ratchet strap retaining shock cords 428, ratchet straps 438 are suspended above gas cylinders 404 when ratchet strap ratchet 434 is released, allowing a technician to easily remove and install gas cylinders 404.

FIG. 5a is a front view of testing skid 106 illustrating the mounting of a generator 502 in a generator compartment 501. Generator 502, preferably sized to provide capacity to provide power to all testing and support equipment in the skid, is mounted on generator mounting legs 504 to allow entry of cool air and exit of hot exhaust air. Generator mounting legs 504 are connected to generator slide mount 506 that enables a technician to slide the generator 502 out to the rear of testing skid 106 for installation and maintenance access to generator 502. Diesel fuel tank 508 preferably provides sufficient diesel fuel for twelve hours of run time, equivalent to two complete extended tests, and is preferably located along the centerline of testing skid 106 to eliminate changes to the center of gravity as diesel fuel is consumed. In the example shown, generator starting battery 510 and Uninterruptable Power Supply (UPS) batteries 512 are located above diesel fuel tank 508. The UPS batteries provide standby power to computer and analyzer equipment in case of generator failure thereby preventing equipment damage as well as preserving current test data. A 100-amp shore power socket 514 transfers power from generator 502 to load control center 516 with heavy gauge cables contained in cable raceway 518.

Figure 5C:
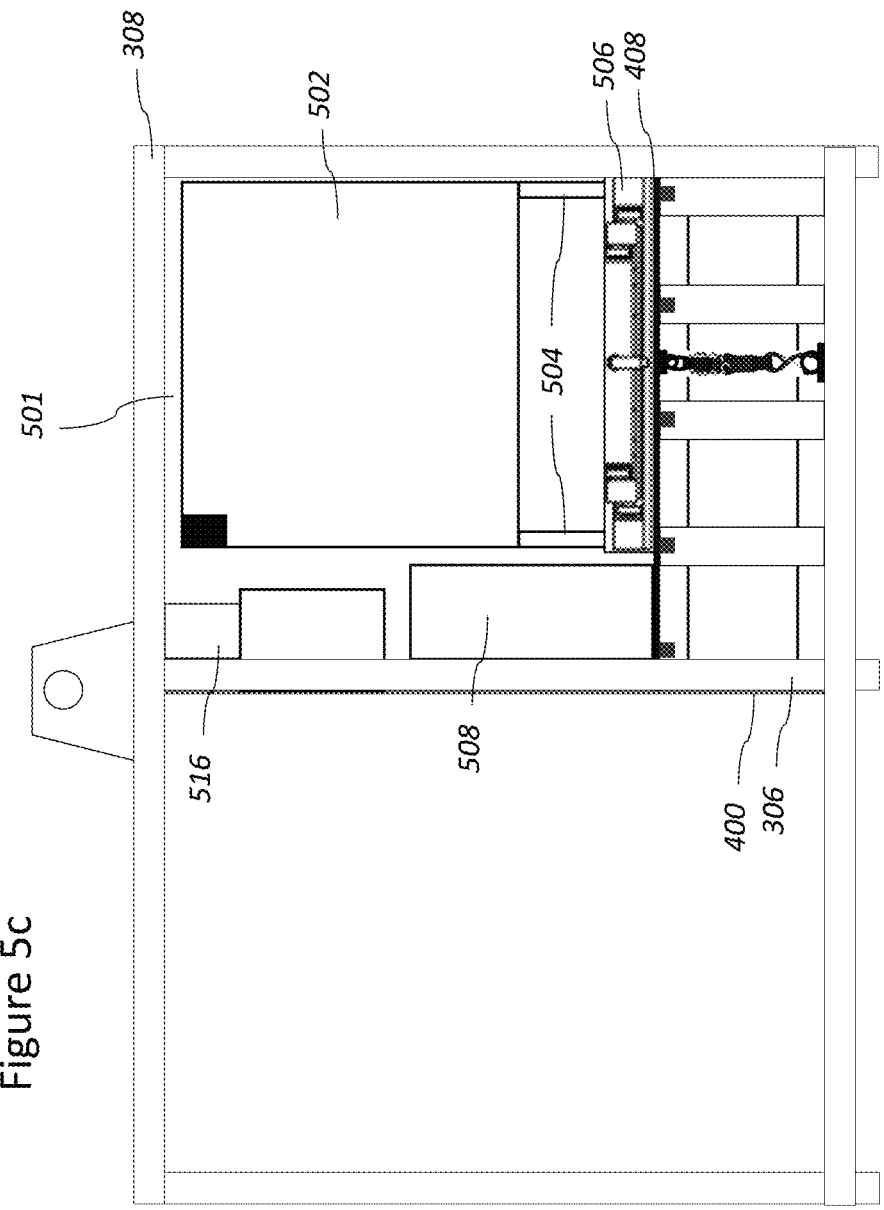
FIG. 5c is a rear view of the generator compartment of FIGS. 5a and 5b.
Figure 5D:
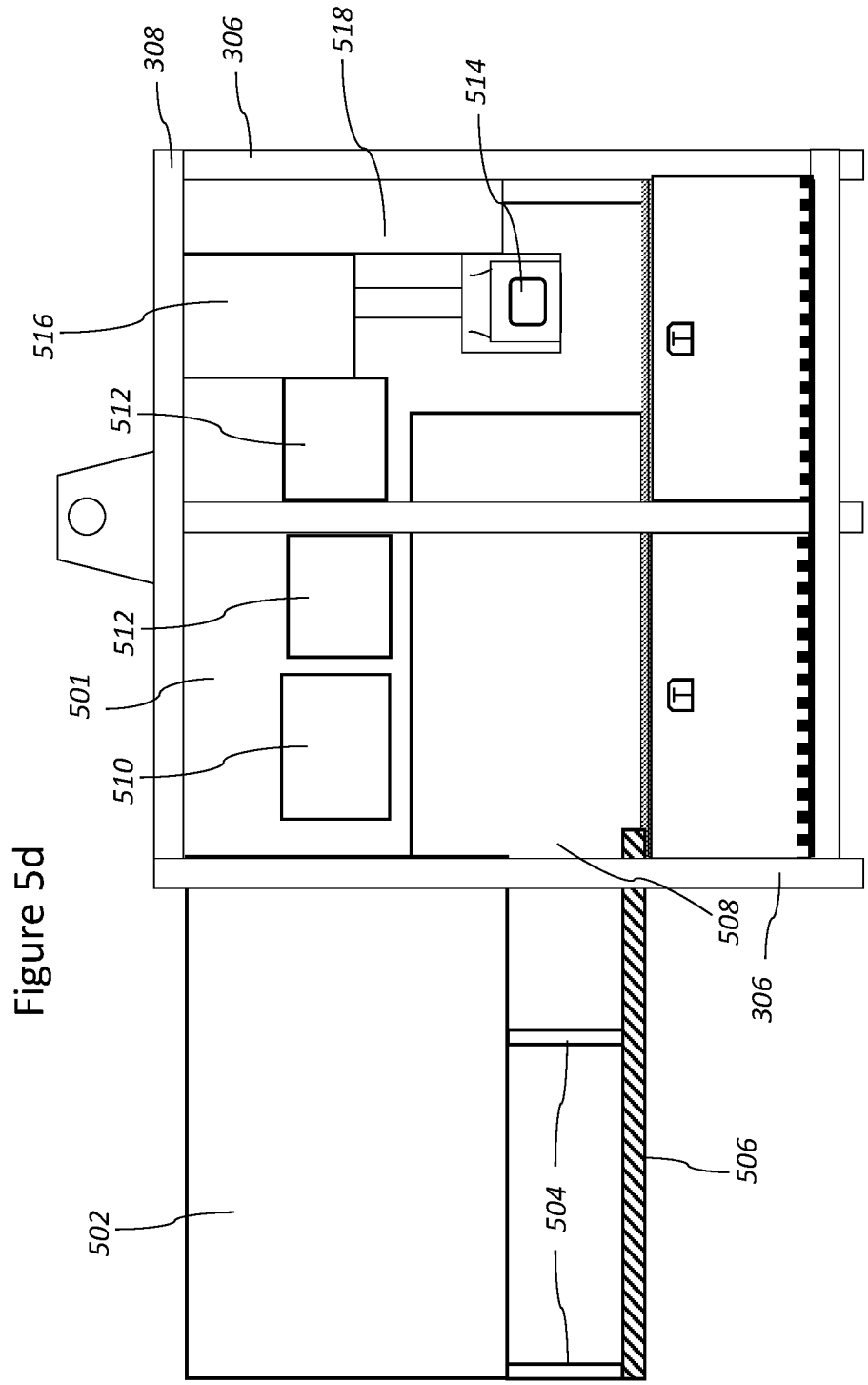
FIG. 5d is an opposite side view of the generator compartment showing the generator in an extended outboard position.
Figure 5E:
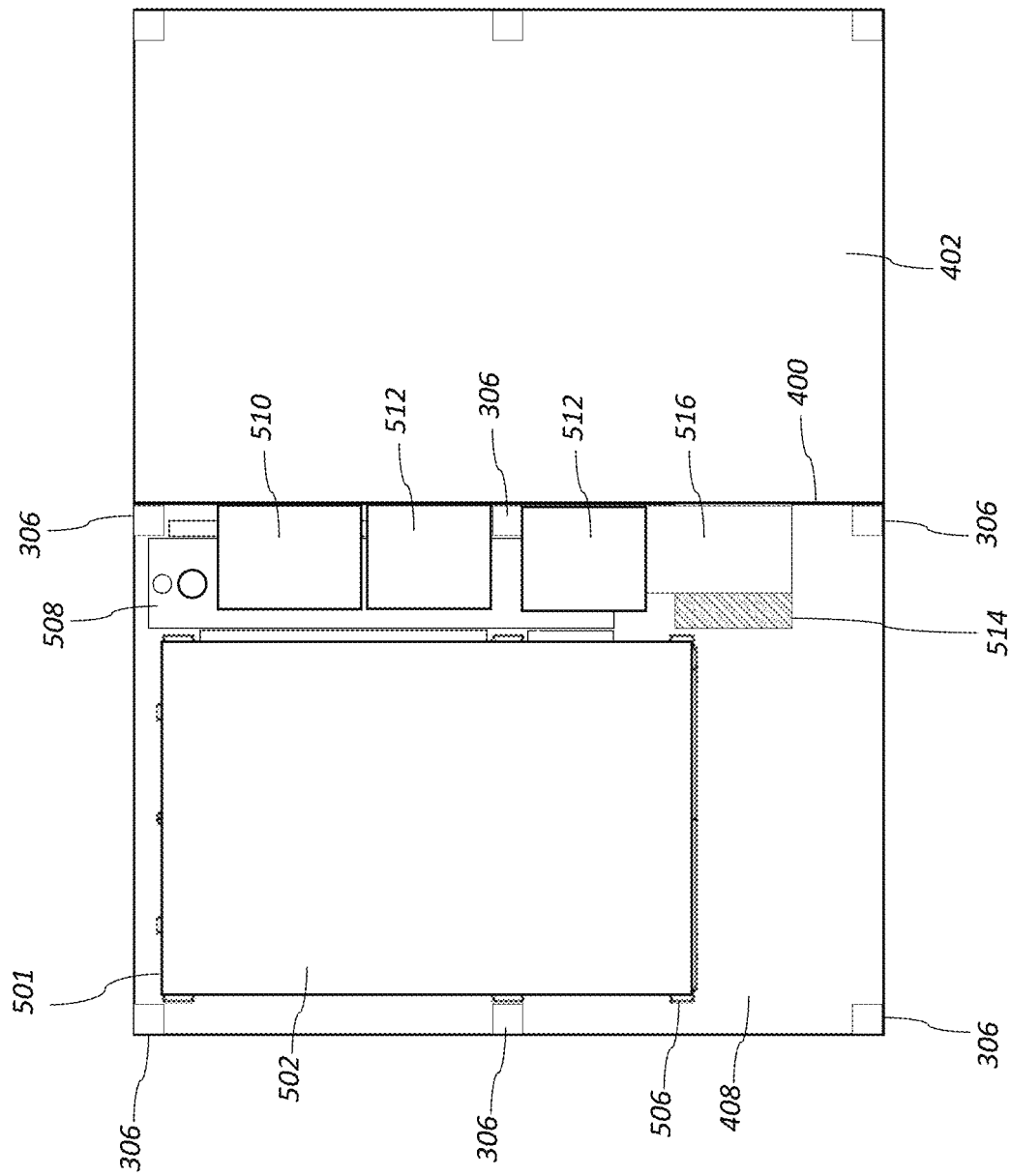
FIG. 5e is a cutaway overhead view of the skid showing the generator compartment from above.

Further layout details of an example embodiment of the testing skid are shown in FIGS. 5b through 5i. FIG. 5b shows a side cutaway view of testing skid 106, also illustrating the generator compartment 501. FIG. 5c is a rear cutaway view of testing skid 106 showing the generator 502 in generator compartment 501. FIG. 5d is a view from the side of the testing skid opposite to that of FIG. 5a, showing generator 502 in the extended open position on generator slide-out 506. FIG. 5e is a cutaway overhead view of testing skid 106 showing generator compartment 501 from above. FIG. 5f is a side view of an example generator slide-out 506. FIG. 5g is a top view of the generator slide-out 506 shown in FIG. 5f. FIG. 5h is a front view of the generator slide-out 506.

FIG. 5i is an overhead view of diesel fuel tank 508, illustrating mounting flanges 520 that hold diesel tank 508 to generator deck 408 using eight bolts 522. Notches 524 permit the mounting flanges 520 to fit around vertical post 306. Notches 526 permit mounting flanges 520 to fit around the mounting points of generator slide-out 508. FIG. 5j is a side view, and FIG. 5h a rear view, of diesel fuel tank 508, illustrating internal baffles 530 that reduce fuel movement during loading, unloading, and transport. Angled deck 532 ensures fuel is always directed to fuel pickup tube 534. Fuel filler port and cap 536 is in the center rear of testing skid 106 facilitating refueling operations. Fuel gauge 538 is on the center rear providing easy access. Cleanout port 540 eases fuel tank maintenance and cleaning.

FIG. 6a is a front view of testing skid 106, illustrating a compartment containing flow control equipment such as compressed gas valves, pressure gauges, and lines. Compartment door 606, with compartment door handle 608, is attached to flow control equipment compartment frame 604 with accordion hinge 610. Compartment door 606 protects flow lines and equipment while providing technician access for operations and maintenance. FIG. 6*b* shows the testing skid 106 with compartment door 606 closed.

Figure 6C:
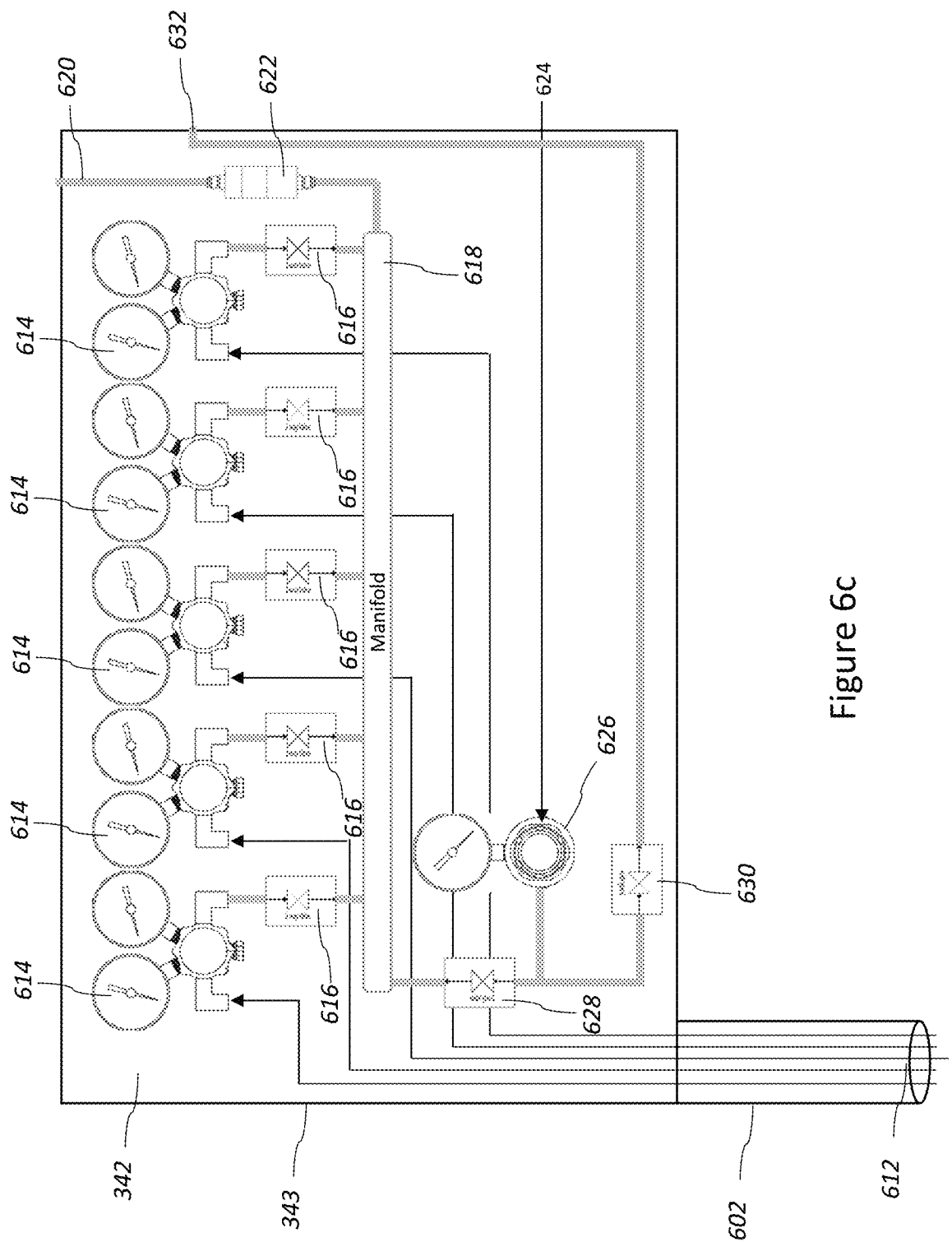
FIG. 6c is a detailed view of an example embodiment of flow control equipment.

The flow control equipment provided in the flow control compartment will now be described in further detail with reference to FIG. 6*c*. This flow control equipment compartment is in front of generator 502 but leaves space below it to ensure proper airflow to and from generator 502. Steel braided gas lines connect from compressed gas cylinders 404 to the flow control equipment compartment through gas line conduit 602, which encloses and protects the lines while also allowing them to be replaced for maintenance purposes. Gas line conduit 602 is preferably connected to 2-stage high purity pressure regulators 614. Automated 2-way solenoid valves 616 control specialty gas flow from regulators 614 into manifold 618. The flow of specialty gas out of manifold 618 and into sample line 620 is controlled by automated mass flow controller 622. Nitrogen is used to calibrate and clean various testing equipment. Nitrogen, from a compressed gas cylinder or nitrogen generator, flows into the flow control equipment compartment through gas line 624 into high purity single stage regulator 626. If the nitrogen is needed to purge or leak-check the sample line system, automated 2-way solenoid valve 628 opens allowing nitrogen to flow into manifold 618 while automated 2-way solenoid valve 630 remains closed. If nitrogen is required to purge or leak-check the analyzer system, automated 2-way solenoid valve 628 closes and automated 2-way solenoid valve 630 opens allowing nitrogen to flow through line 632 to the analyzer system. Automated valves and mass flow controllers are preferably controlled using a programmable logic controller (PLC) or a process automation computer (PAC), shown in FIG. 13 at 1302.

FIG. 7*a* is a front view of testing skid 106, detailing a nitrogen system compartment. In this example configuration, a nitrogen generator 702, mounted on an equipment slide-out 704, is centered in compartment door frame 706. The compartment is bound on the right by compartment wall 708 and above by heated equipment compartment deck 710. The compartment is connected internally with analyzer compartment and electronics compartment the three of which are environmentally controlled with insulation and HVAC unit 712. HVAC unit 712 is of sufficient capacity to maintain required temperature range specified by the equipment in the environmentally controlled compartments and is powered by generator 502 or another suitable power source.

Figure 7B:
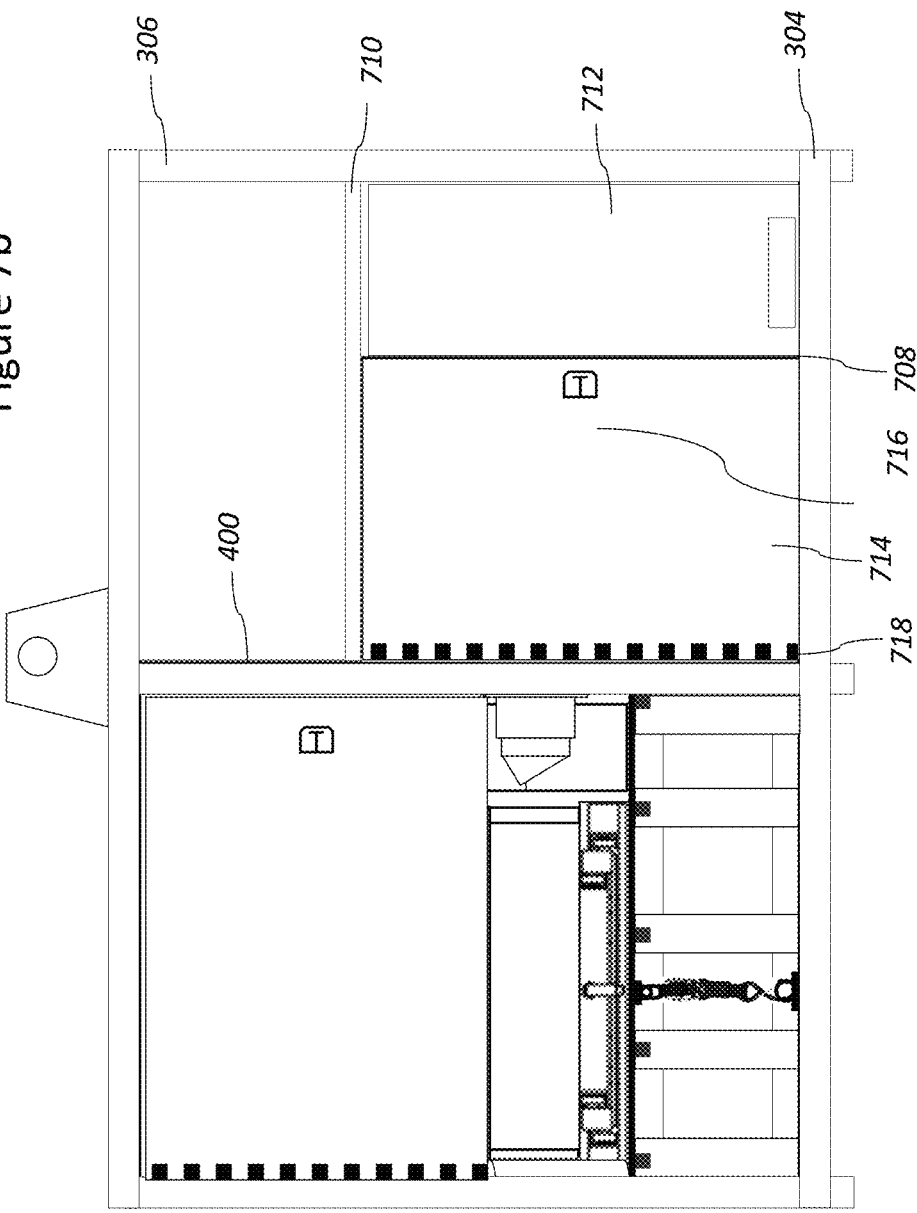
FIG. 7b is a front view of the nitrogen generator compartment of FIG. 7a with the access panel door closed.

FIG. 7*b* shows compartment door 714, which encloses the nitrogen system compartment, in a closed position, compartment door handle 716 is attached to nitrogen generator compartment door frame 716 with accordion hinge 718.

FIG. 7*c* is a right-side view of testing skid 106, showing a side view of HVAC unit 712 and environmental compartment access panel 720. Panel 720 is secured, for example, using eight hex head bolts 722. Access panel 720 provides access to the front of HVAC unit 712 for installation and maintenance.

FIG. 7*d* illustrates, from the same viewpoint as FIG. 7*c*, the appearance when access panel 720 is removed. This view shows example nitrogen generator 702 located in the compartment behind HVAC unit 712. Compartment wall 708 extends at 90 degrees to the nitrogen generator compartment forming a mounting panel for HVAC unit 712 and connecting to HVAC unit 712 mounting post 724.

Figure 7E:
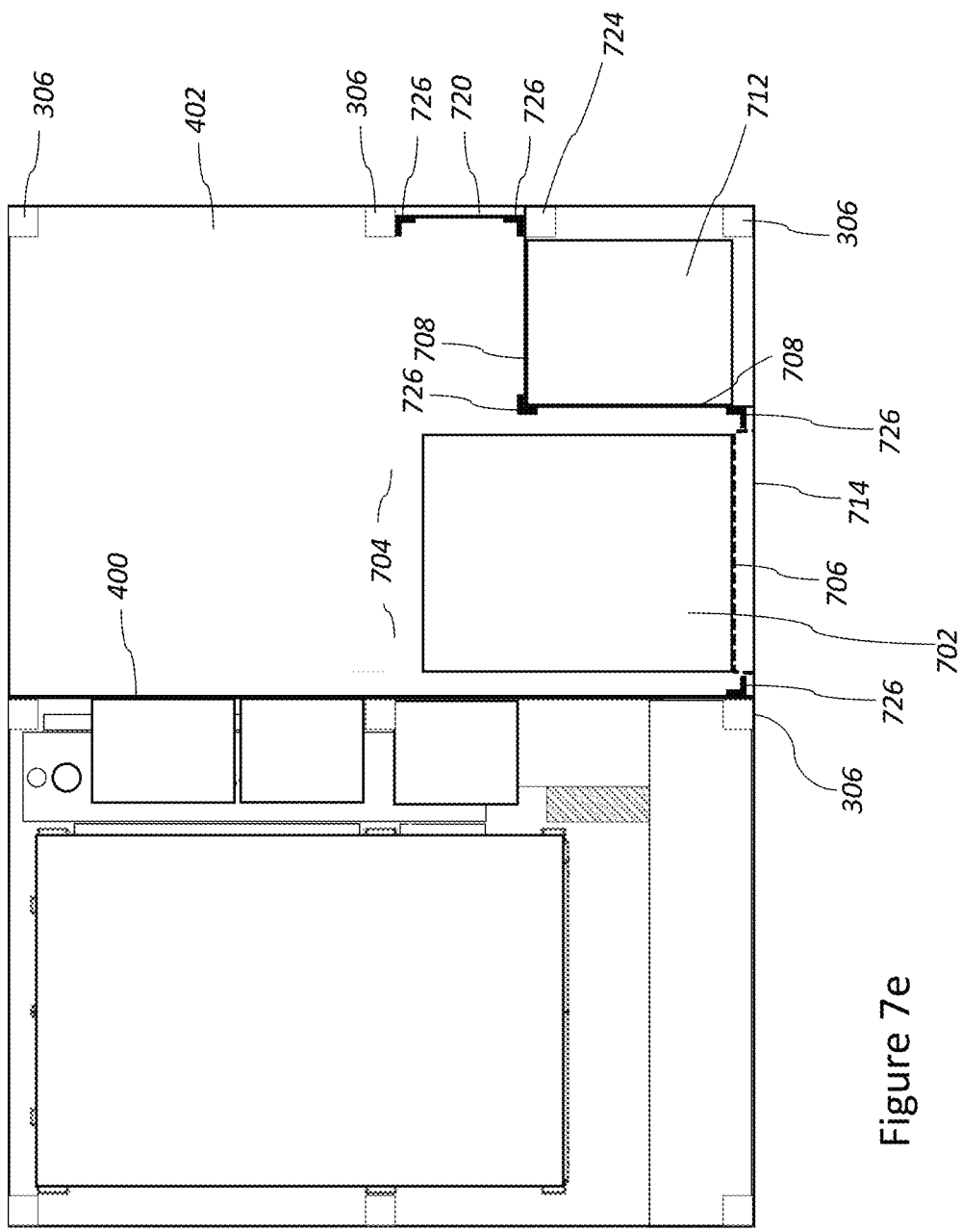
FIG. 7e is an overhead view showing the example nitrogen generator and on-board HVAC unit of FIGS. 7a through 7d.

FIG. 7*e* is an overhead view of testing skid 106 and illustrates a preferred example of mounting hardware for the nitrogen generator compartment and HVAC unit 712. L-shaped brackets 726 are mounted vertically between bottom deck plate 402 and heated equipment compartment deck 710. L-shaped brackets 726 provide mounting locations for compartment walls 708, environmental compartment access panel 720, and nitrogen generator compartment door frame 706.

Figure 7G:
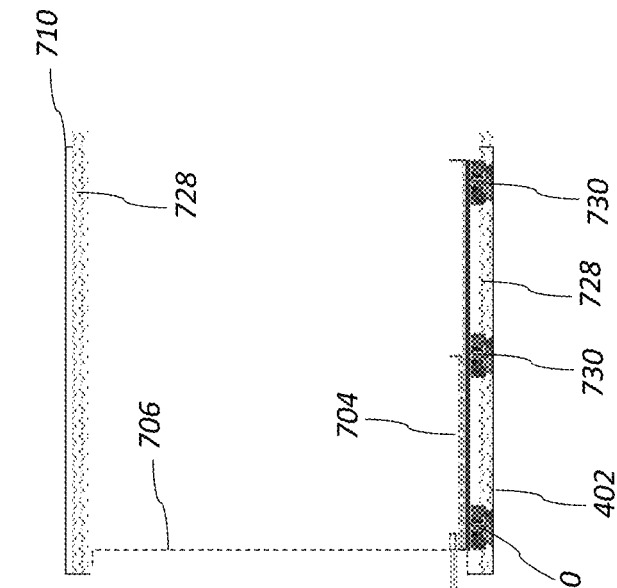
FIG. 7g is a side view of an example nitrogen generator in an extended outboard position.
Figure 7F:
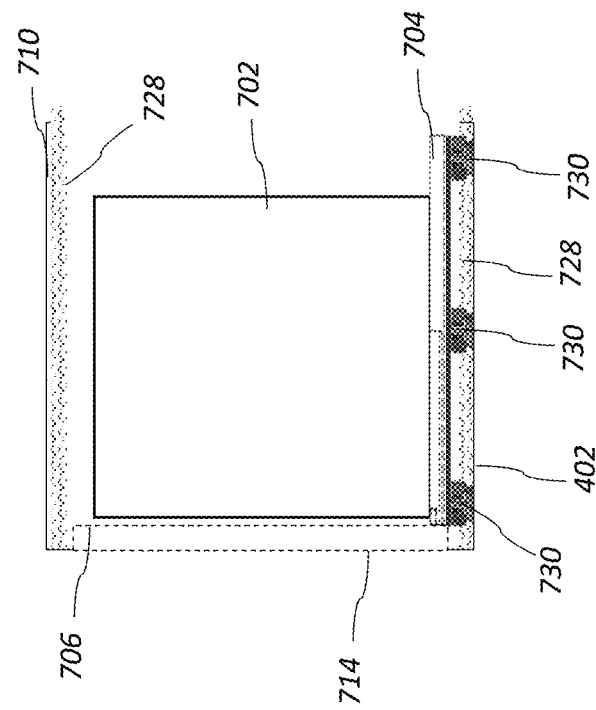
FIG. 7f is a side view of an example nitrogen generator compartment installation.

FIG. 7*f* is a side view of the nitrogen generator compartment and shows compartment insulation 728 installed on the top and bottom of the compartment. Nitrogen generator slide-out 704 is mounted on vibration dampeners 730 providing additional protection to nitrogen generator 702 during onloading, offloading, and transportation. FIG. 7*g* is a side view of the nitrogen generator compartment, showing nitrogen generator 702 extended out of the compartment on slide-out 704.

Figure 7I:
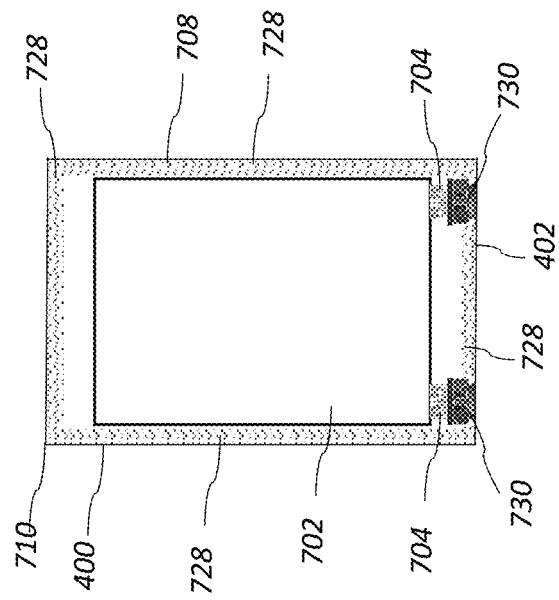
FIG. 7i is a front view of a nitrogen generator installation.
Figure 7H:
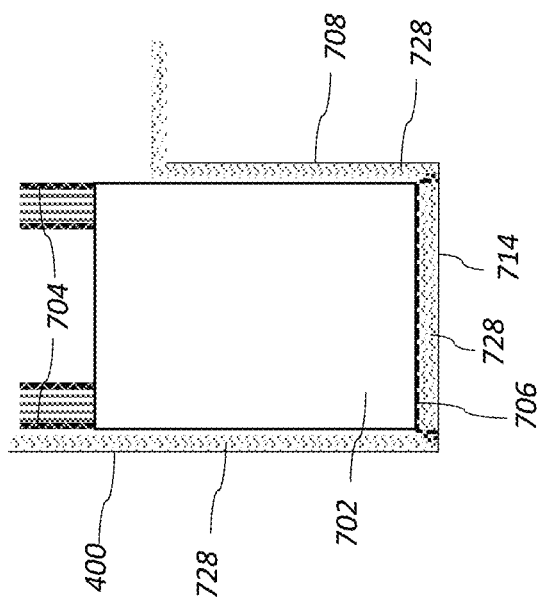
FIG. 7h is an overhead view of a nitrogen generator installation.

FIG. 7*h* is an overhead view of the nitrogen generator compartment that provides additional illustration of compartment insulation 728 on the sides of the compartment and door panel 714. FIG. 7*i* is a frontal view of the nitrogen generator compartment, illustrates compartment insulation 728 on all sides as well as an alternate view of slide-out 704 mounted on vibration dampeners 730.

Figure 7J:
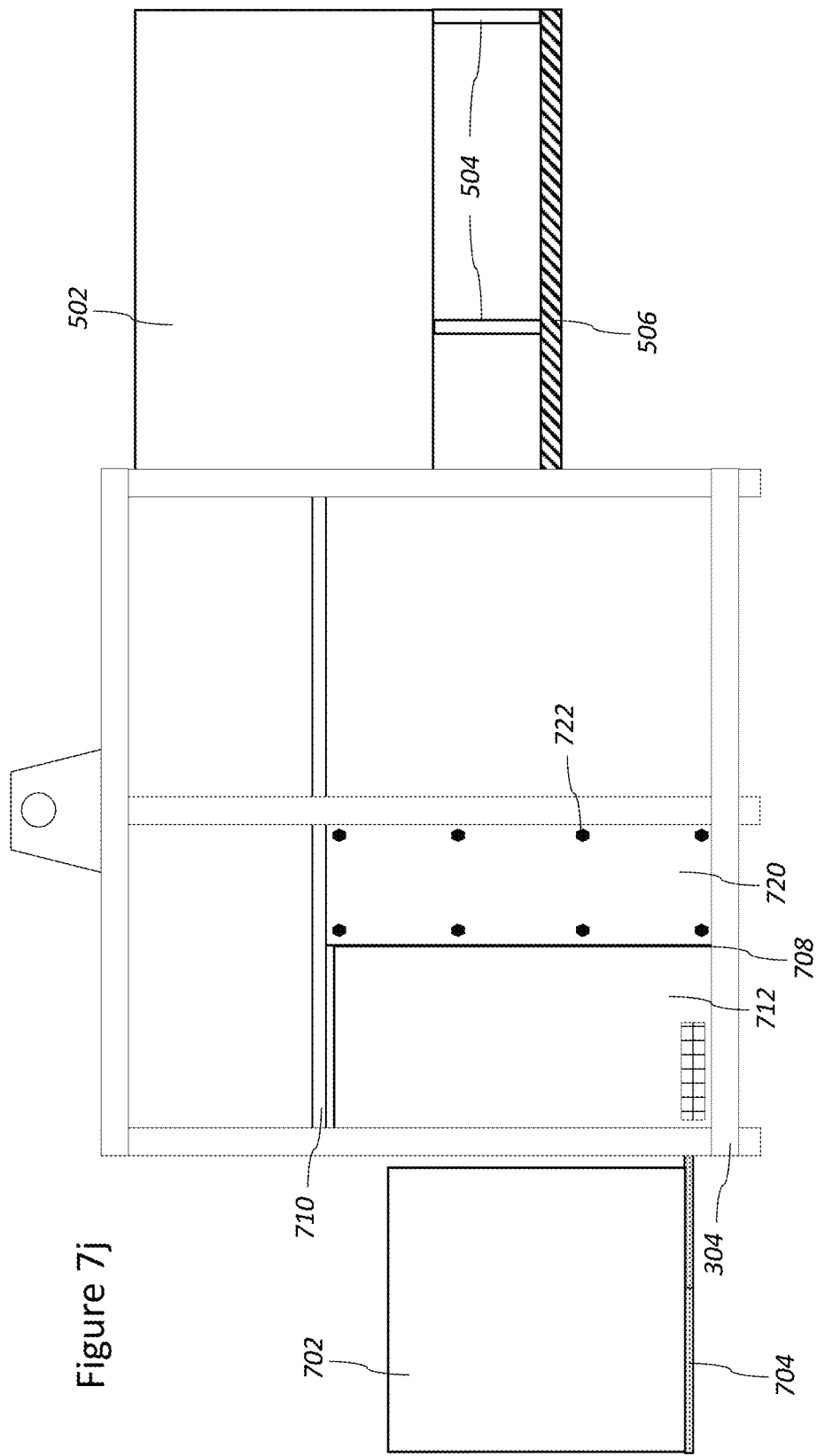
FIG. 7j is a side view of an example testing skid with both a generator and a nitrogen generator in extended outboard positions.

FIG. 7*j* shows both generator 502 and nitrogen generator 702 in their extended maintenance positions, from the same viewpoint as FIG. 7*c*.

FIG. 8*a* is a right-side view of testing skid 106. In this example configuration, analyzer 802, mounted on slide-out 804 is framed in the lower half of compartment door frame 806. Electronics deck 808 is located immediately above and in the same compartment with analyzer 802. Electronics platform 810 is mounted within electronics deck 808 on slide-out 812. The electronics deck 808 (containing temperature-sensitive electronics) and the nitrogen generator compartment (also temperature sensitive) are both preferably located in an environmentally controlled space. Electronic equipment such as Wi-Fi router, cellular hotspot, programmable logic controller (PLC), process automation computer (PAC), and other electronic equipment used to control and operate the equipment mounted in the skid, are preferably located on the electronic platform 810. The arrangement of platform 810 is described in more detail below with reference to FIG. 8*j*.

Figure 8B:
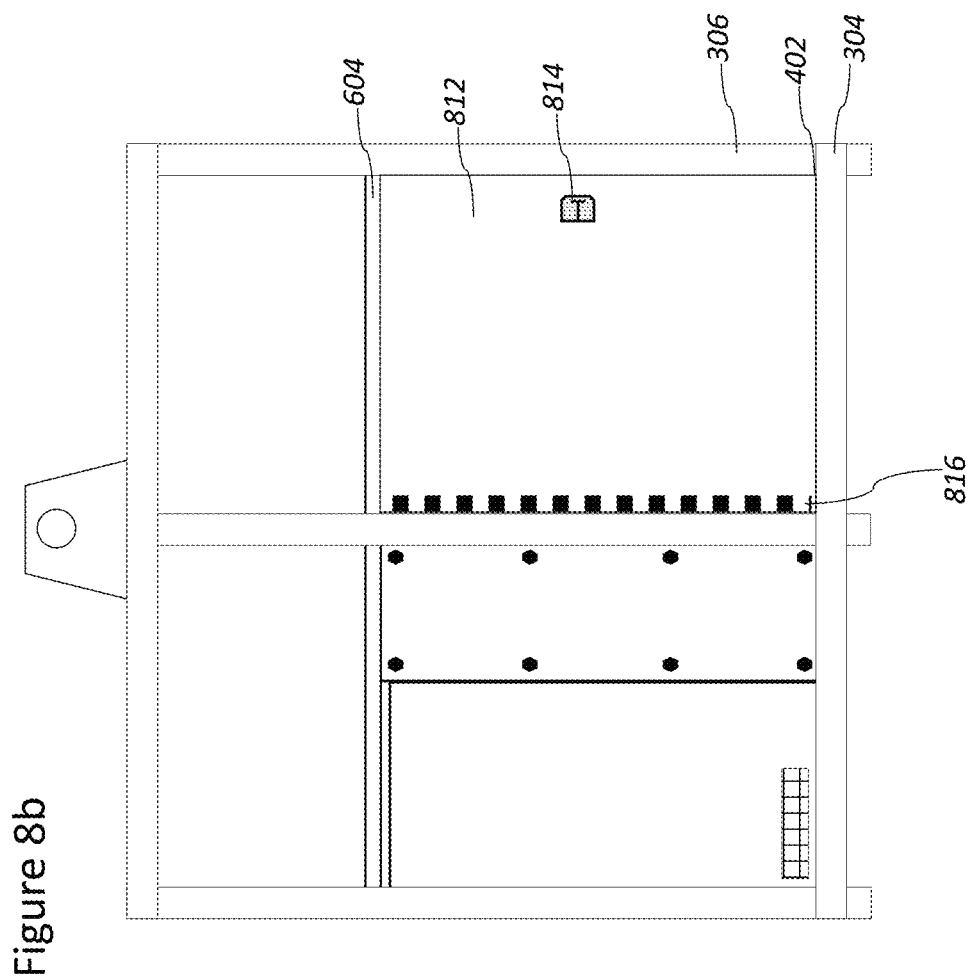
FIG. 8b is a front view of the arrangement of FIG. 8a with the access panel door closed.

FIG. 8*b* illustrates compartment door 812, with compartment door handle 814, attached to analyzer compartment door frame 816 with accordion hinge 818. This provides front access to analyzer 802 as well as top access to the analyzer 802 and electronics platform 810 when slide-outs 804 and 812 respectively are extended. Cabling and gas line plumbing connecting all devices to the other components in the skid are preferably of sufficient length and flexibility to allow the equipment slide-outs to extend fully.

FIG. 8*c* is a rear view of testing skid 106 and provides a side view of the compartment provided for analyzer 802. This view illustrates inlet 820 and outlet 822 ports for HVAC unit 712 which serves the environmentally controlled compartment, and the rear of nitrogen generator 702. Electronics deck 808 support posts 824 are located on each side of analyzer 802.

Referring to FIG. 8*d*, compartment door 826, with compartment door handle 828, is attached to analyzer compartment side access door frame 806 by an accordion hinge 830. This side access to the environmentally controlled compartment eases installation and maintenance as well as access to the process automation computer (PAC).

Figure 8E:
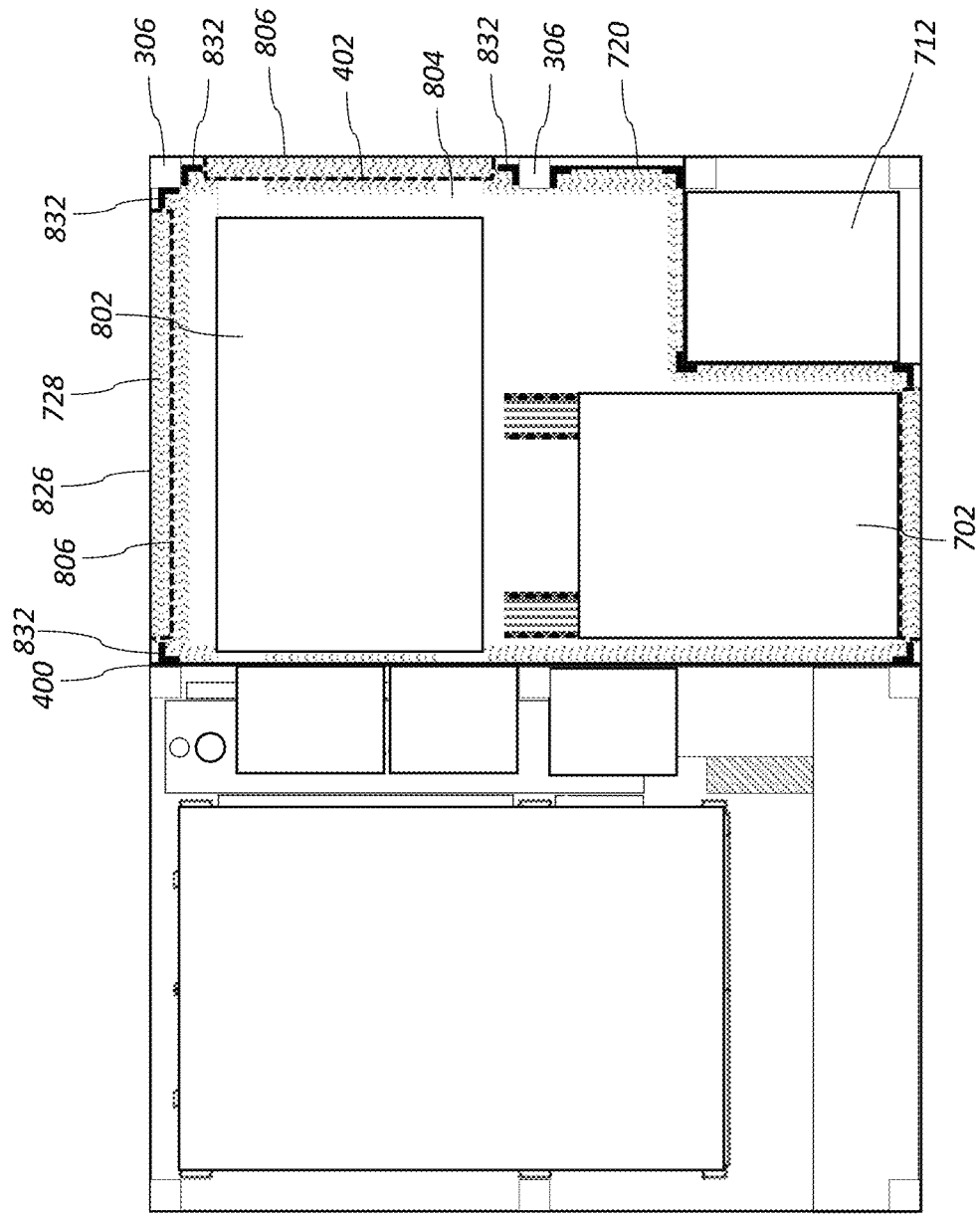
FIG. 8e is an overhead view of an analyzer installation in an environmentally controlled compartment.

FIG. 8*e* is an overhead view of testing skid 106 and shows mounting hardware for analyzer compartment access panels 806 and 824. L-shaped brackets 832 are mounted vertically between bottom deck plate 402 and heated equipment compartment deck 710, providing mounting locations for compartment door frames 806 and 826.

FIG. 8f is a side view of the analyzer compartment. As shown in FIG. 8f, compartment insulation 728 is installed on the top and bottom of the compartment. Analyzer slide-out 804 is mounted on vibration dampeners 834 providing additional protection to analyzer 802 during onloading, offloading, and transportation. FIG. 8g is a similar side view of the analyzer compartment, but with analyzer 802 extended out of the compartment on slide-out 804.

FIG. 8h is an overhead view of the analyzer compartment. FIG. 8i is a front view of the analyzer compartment, showing another view of slide-out 804 mounted on vibration dampeners 834.

Figure 8J:
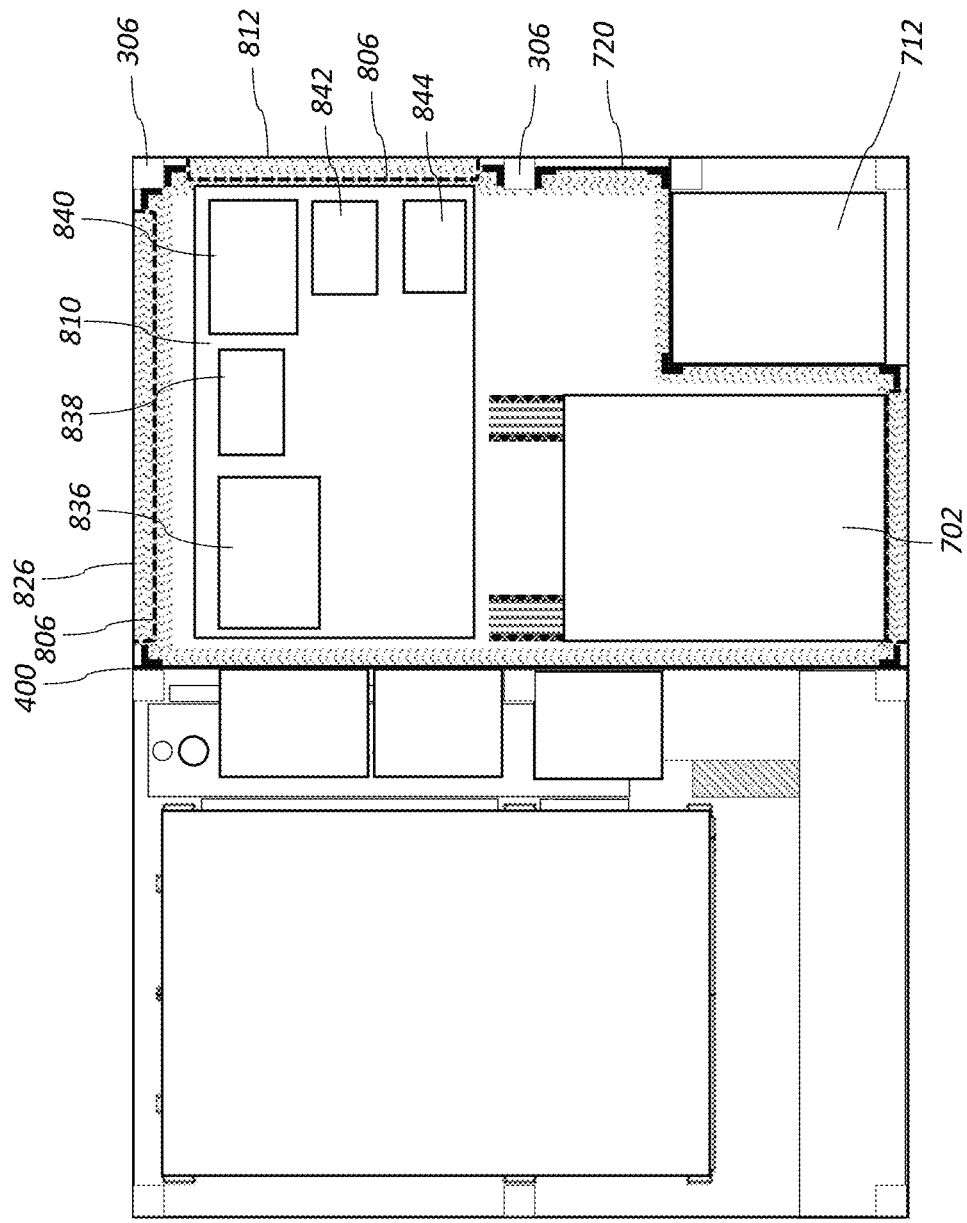
FIG. 8*j* is an overhead view showing an example of electronic equipment installed in the upper area of the skid.

FIG. 8j is an overhead view that shows details of electronics platform 810. Wi-Fi router 836, cellular hotspot 838, network switch 840, programmable logic controller (PLC) 842, and process automation computer (PAC) 844 are all mounted on electronics platform 810. Additional electronic devices can be mounted on platform 810 as needed.

Figure 9A:
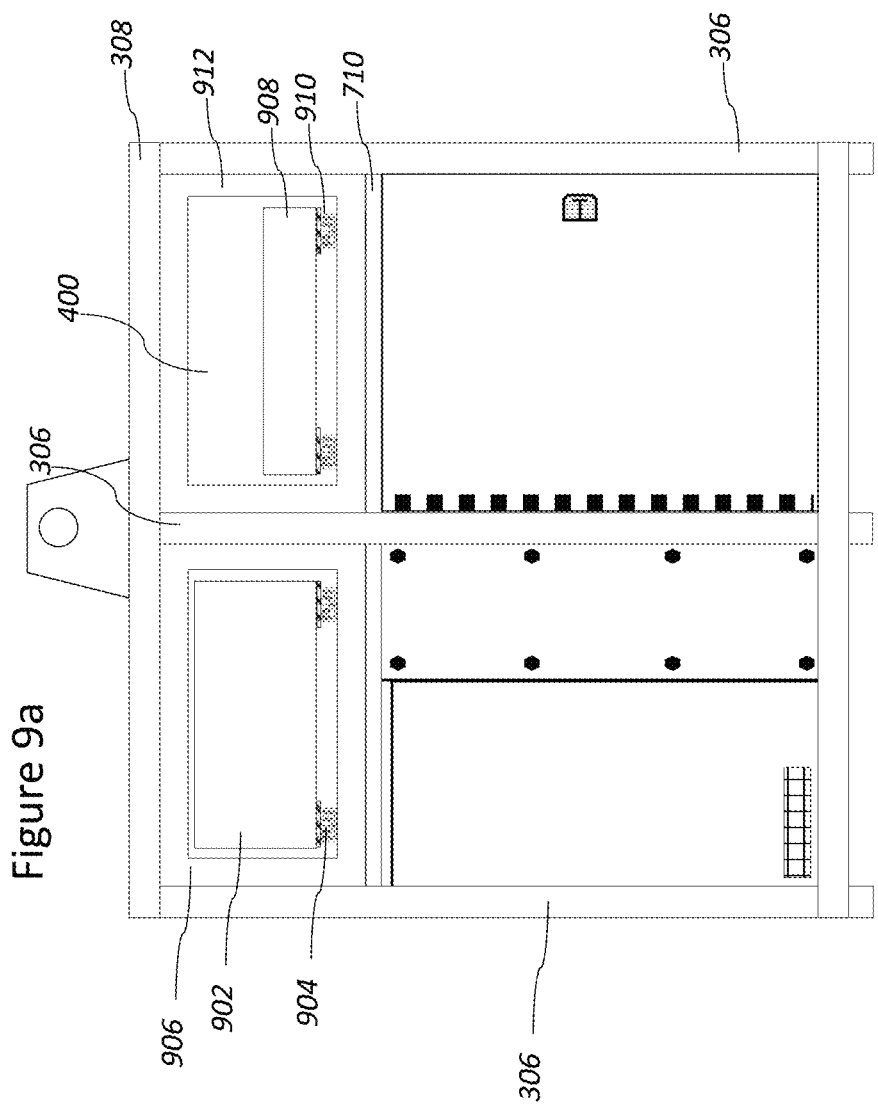
FIG. 9*a* is a front view of an example heated sample pump and a temperature control module installed in a ventilated compartment in the side of the testing skid, with access panel doors open.

FIG. 9a is a right-side view of testing skid 106. In this example configuration, a heated sample pump 902, mounted on an equipment slide-out 904, is centered in the left compartment door frame 906. Centered in the right compartment door frame 912 is a temperature control module 908 mounted on slide-out 910. Temperature control module 908 is used to control temperatures in heated sample lines, probe boxes, and other equipment requiring heat control.

FIG. 9b shows compartment door 914, with compartment door handle 916, attached to heated equipment compartment door frame 906 with accordion hinge 918. This view also illustrates compartment door 920 with compartment door handle 922, attached to heated equipment compartment door frame 912 with accordion hinge 924. Both compartment doors provide access for installation and maintenance.

FIG. 9c shows compartment exhaust fans 926 mounted on the rear of testing skid 106 to ventilation fan mounting plate 928. In the example embodiment the fans 926 are mounted with nine hex head bolts 930. This compartment is ventilated with exhaust fans 802 to maintain ambient temperature around the heated equipment, which has higher operating temperatures than other electronic equipment and therefore does not need to be located in the environmentally controlled compartment.

Figure 9D:
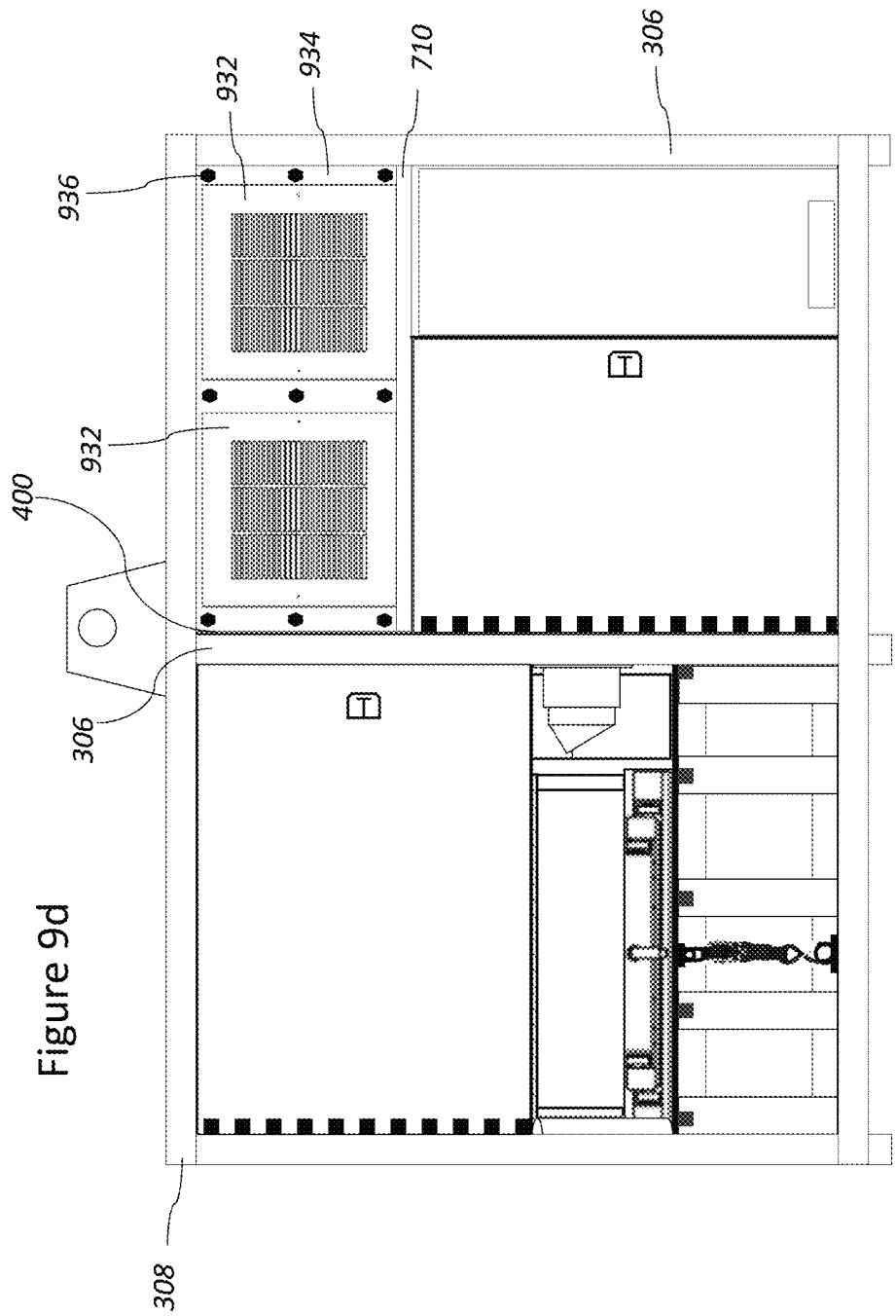
FIG. 9*d* is a side view of an example heated sample pump and temperature control module installation in a ventilated compartment.
Figure 9F:
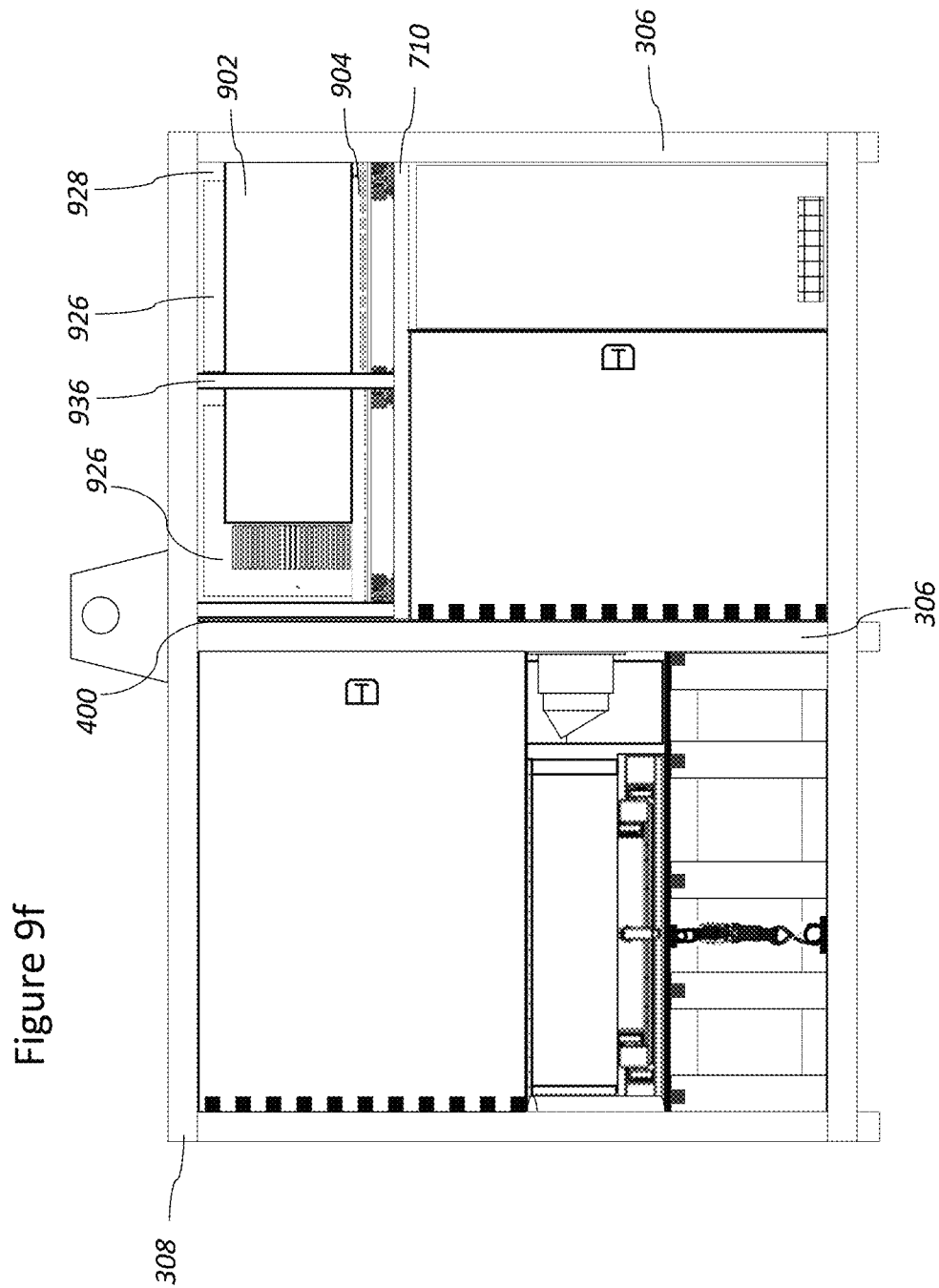
FIG. 9*f* is a side view, opposite to that of FIG. 9*d*, of the example heated sample pump and temperature control module installation in a ventilated compartment.

FIG. 9d is a front view of testing skid 106, opposite of the view in FIG. 9c. Inlet air filter screens 932 are mounted on inlet air filter screen mounting plate 934, using (in this example) nine hex head bolts 936. Inlet filter screens 932 provide filtered ambient air to the heated equipment compartment as the compartment exhaust fans 926 draw heated air from the compartment thereby maintaining near-ambient temperature within the compartment.

FIG. 9e is a view from the same direction as FIG. 9c but with compartment exhaust fans 926 and fan mounting plate 928 removed to more clearly show the location and installation of temperature control module 908, heated sample pump 902, and ventilation inlet filter screens 932 on the far side of the compartment. Ventilation exhaust fan mounting plate support post 934 is centered left to right in the compartment where it provides an additional rigid mounting point.

Figure 9G:
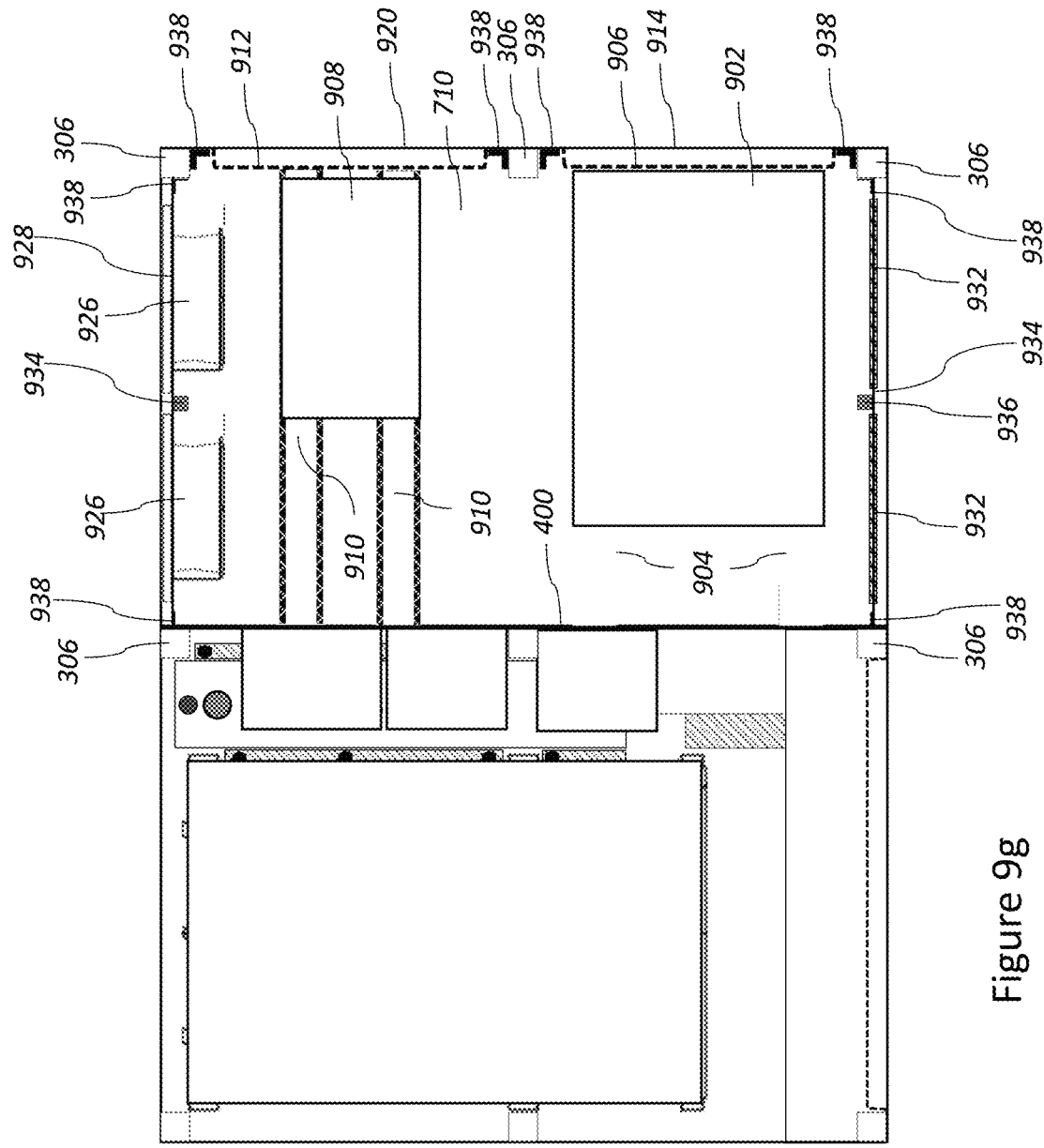
FIG. 9*g* is an overhead view of the example heated sample pump and temperature control module installation in a ventilated compartment.

FIG. 9g shows the same view as FIG. 9d with inlet air filter screens 932 and inlet air filter screen frame 934 removed. This view illustrates the interior of the compartment showing heated sample pump 902 mounted on slide-out 904. For tests requiring that the exhaust sample remain above the acid dew point, a heated sample pump 902 can be used to draw the sample from the exhaust stack through a sample line and maintain the sample above the acid dew point. Inlet air filter screen frame mounting post 936, centered in the front of the compartment provides a rigid mounting point for exhaust fan frame 934. At the back of the compartment, inlet air filter screens 926 are mounted to inlet air filter frame 928 providing filtered ambient air inlets to the compartment.

FIG. 9g is an overhead view of the heated equipment compartment, illustrating mounting hardware for equipment compartment access panels 914 and 920, exhaust fan mounting plate 928, and inlet air filter screen mounting plate 934. L-shaped brackets 938 are mounted vertically between heated equipment compartment deck 710 and internal lifting frame 308.

Figure 9K:
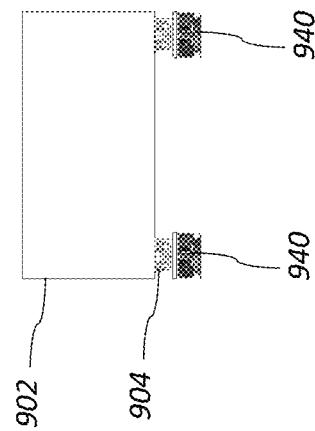
FIG. 9*k* is a front view a heated sample pump installation.
Figure 9J:
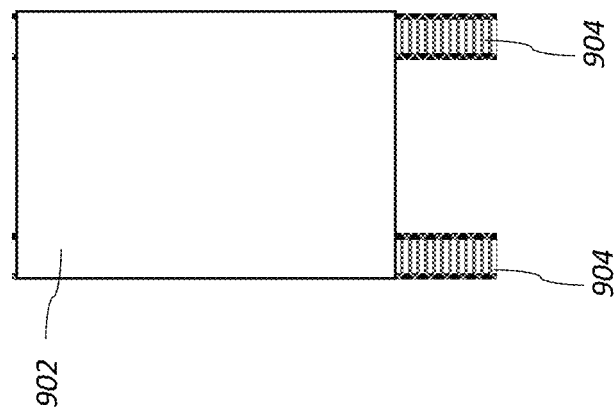
FIG. 9*j* is a top view of a heated sample pump installation.

FIG. 9h shows a side view of a preferred installation of heated sample pump 902, with heated sample pump slide-out 904 mounted on vibration dampeners 940 providing additional protection to heated sample pump 902 during onloading, offloading, and transportation. FIG. 9i shows heated sample pump 902 extended out of the compartment on slide-out 904. FIG. 9j is an overhead view of the heated sampler, and FIG. 9k is a front view of the heated sampler compartment, providing an alternate view of slide-out 904 mounted on vibration dampeners 940.

Figure 10:
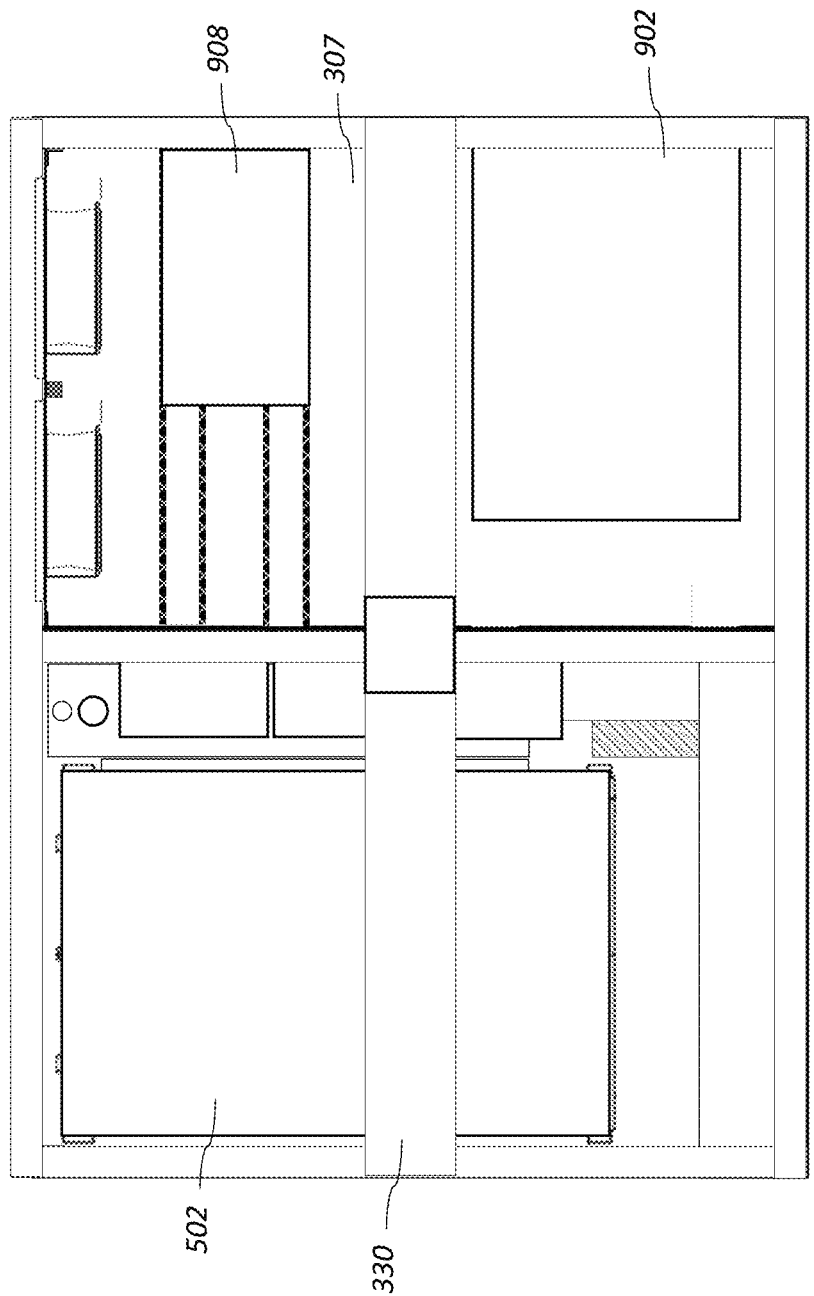
FIG. 10 is an overhead view of an internal H-shaped lifting frame with installed equipment.

FIG. 10 is an overhead view showing heated equipment compartment and generator compartment located below internal lifting frame 308.

Figure 11A:
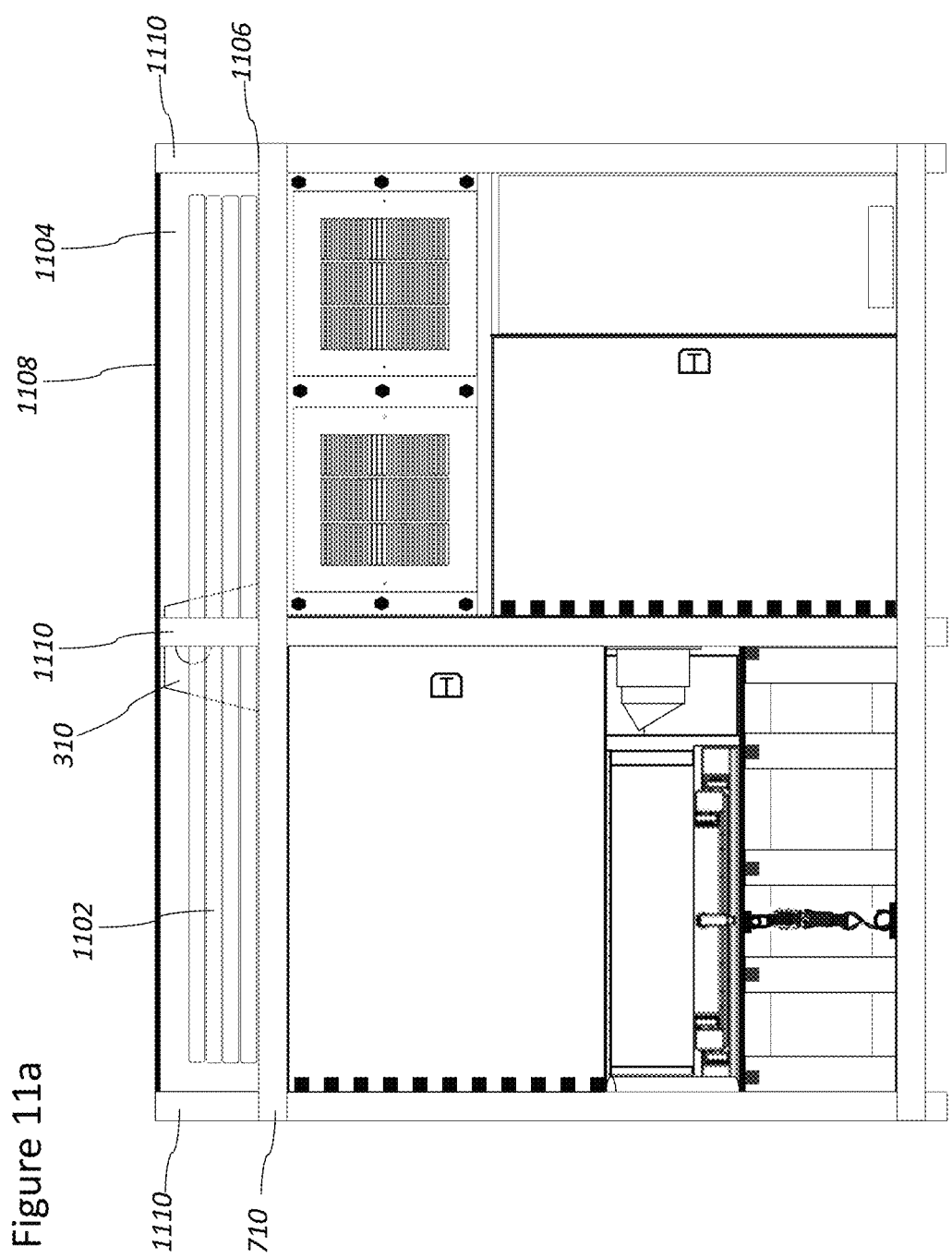
FIG. 11*a* is a front view of an example testing skid with a sample line compartment installation above an internal H-shaped lifting frame.

FIG. 11a is a front view of testing skid 106, illustrating a sample line 1102 storage compartment located at the top of the skid. The sample line compartment in this preferred example has expanded metal sides 1104 allowing sufficient ventilation for a heated sample line. The sample line compartment deck 1106 is preferably sloped from the center outward on all sides to permit water to flow out of the compartment through the expanded metal sides 1104. In the example embodiment, a compartment lid 1108 is supported by six support posts 1110, one on each corner and one centered on the front and rear side in the center. A sample line, preferably of fifty feet or more in length, is coiled around the lifting bale 301 and is connected through sample line compartment deck 1106, using quick connect fittings, to heated sample pump 902 and analyzer 802.

Figure 11B:
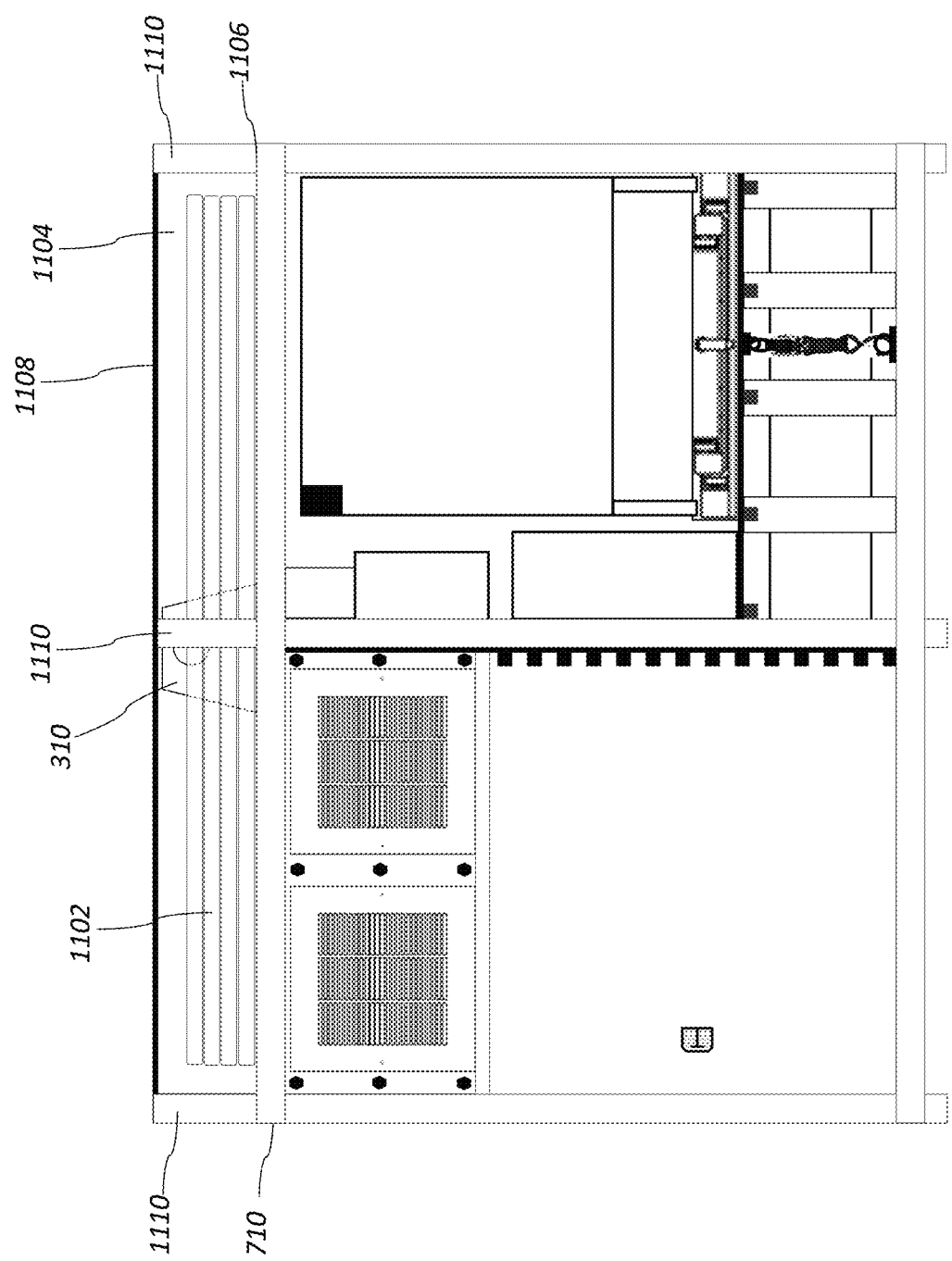
FIG. 11*b* is a rear view of the testing skid of FIG. 11*a*, showing the sample line compartment installation above an internal H-shaped lifting frame.
Figure 11C:
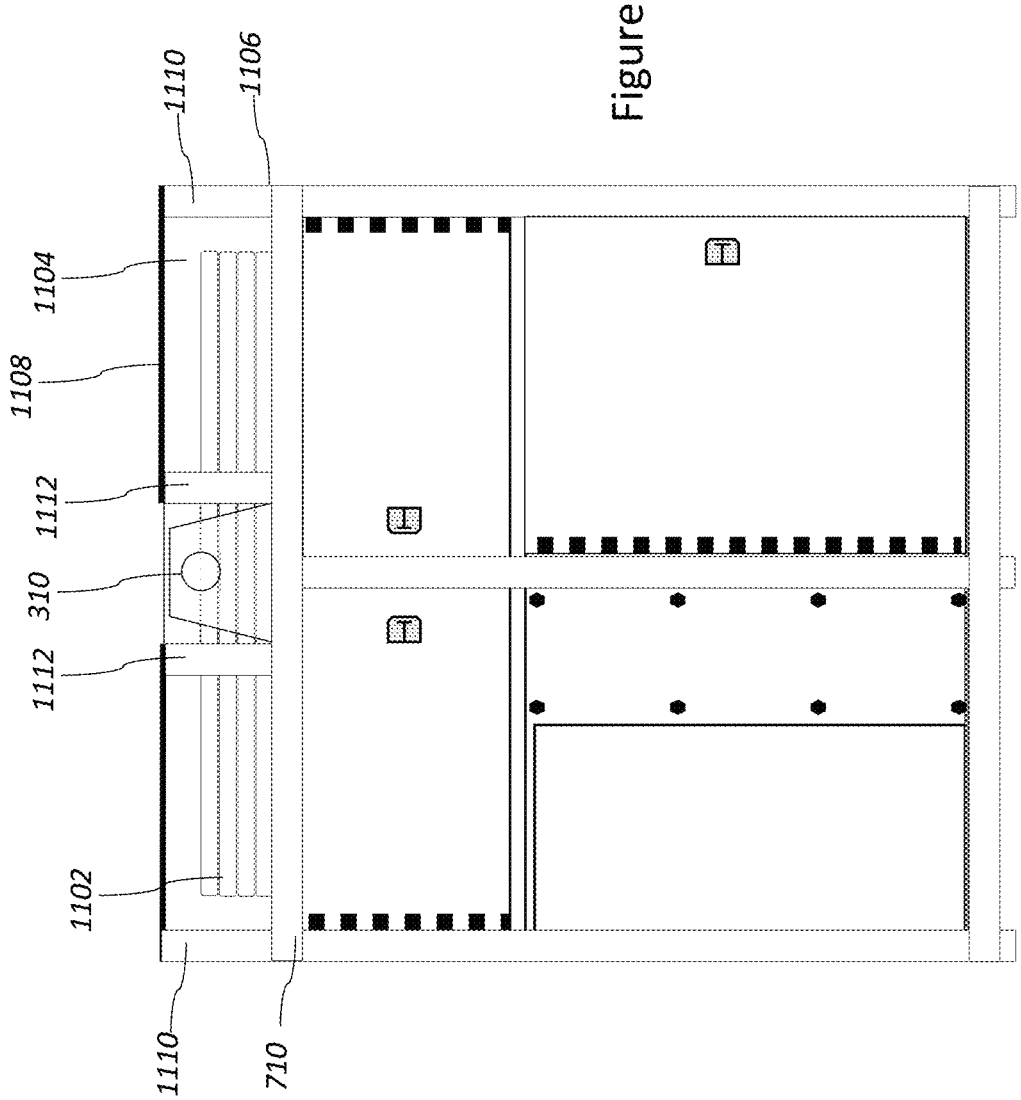
FIG. 11*c* is a side view of an example testing skid with a sample line compartment installation above an internal H-shaped lifting frame.

FIG. 11b is a rear view showing the sample line storage compartment located at the top of the skid. FIG. 11c is a right-side view of testing skid 106. As shown, sample line compartment lid/access panel 1108 is preferably supported on this side by two support posts 1112 leaving the top open for access to lifting bale 310 and allowing loading and unloading without removing the compartment lid/panel 1108. FIG. 11d is a left-side view of the structures shown in FIGS. 11a through 11c.

Figure 11E:
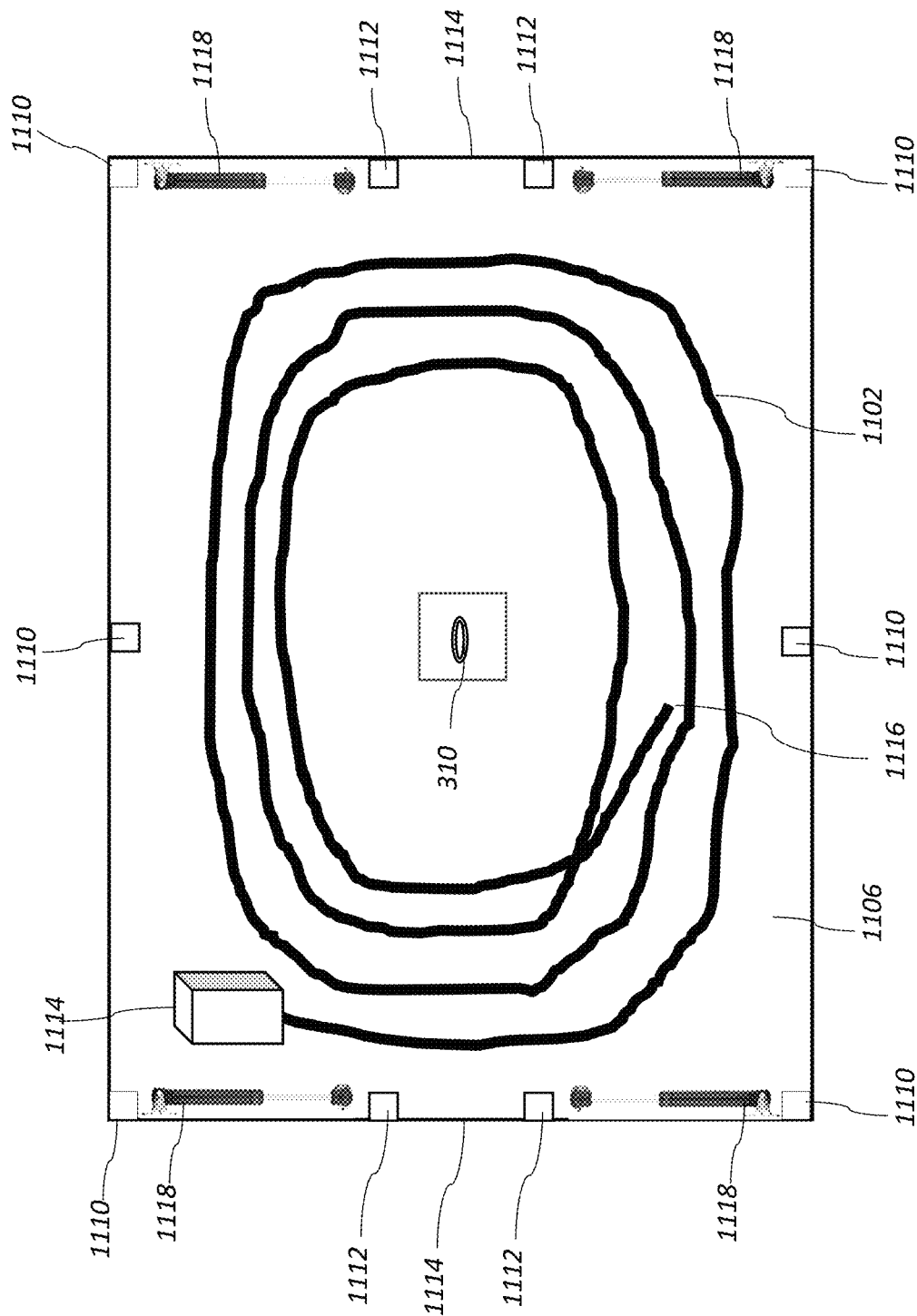
FIG. 11*e* is an overhead view of a sample line in a sample line compartment, shown with access door panels open.
Figure 11F:
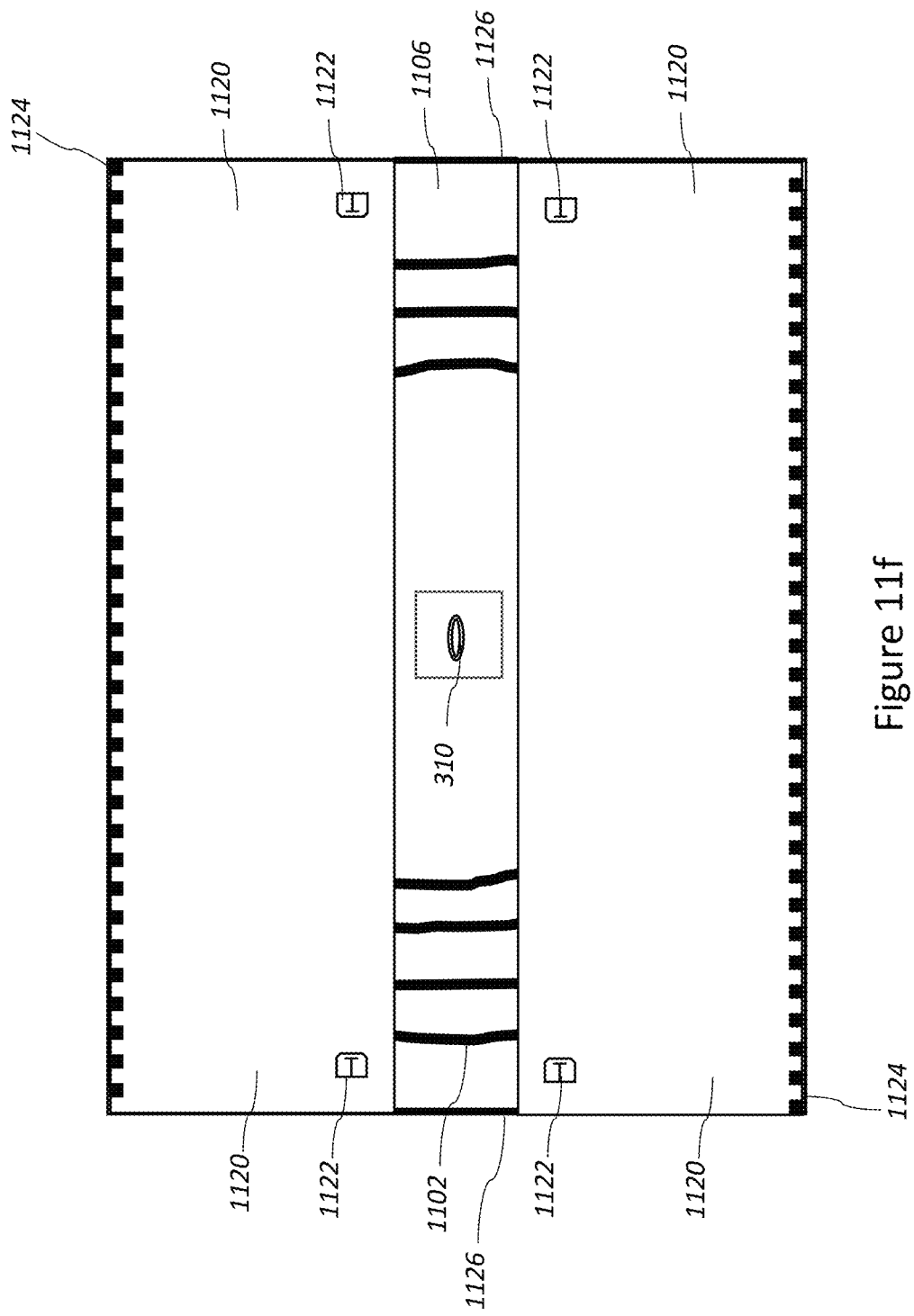
FIG. 11*f* is an overhead view of a sample line installation with access door panels closed.

FIG. 11e is an overhead view of the sample line compartment, showing exemplary positioning of sample line 1102 with a typical sample probe box 1114 attached. In this embodiment, the sample line 1102 connects to heated sample pump 902 and analyzer 802 through a quick connect fitting 1116 plumbed through sample line compartment deck 1106. This view indicates ten compartment lid/access panel support posts 1110 and 1112 as well as four lid/access panel hydraulic hatch lifts 1118 that facilitate opening the top cover as well as keeping it open while the technician is deploying or redeploying the sample line into its compartment. FIG. 1 if shows compartment access panel 1120 and access panel latch 1122 attached using accordion hinges 1124 and closed in position to contain the sample line in its compartment for transport.

Figure 12:
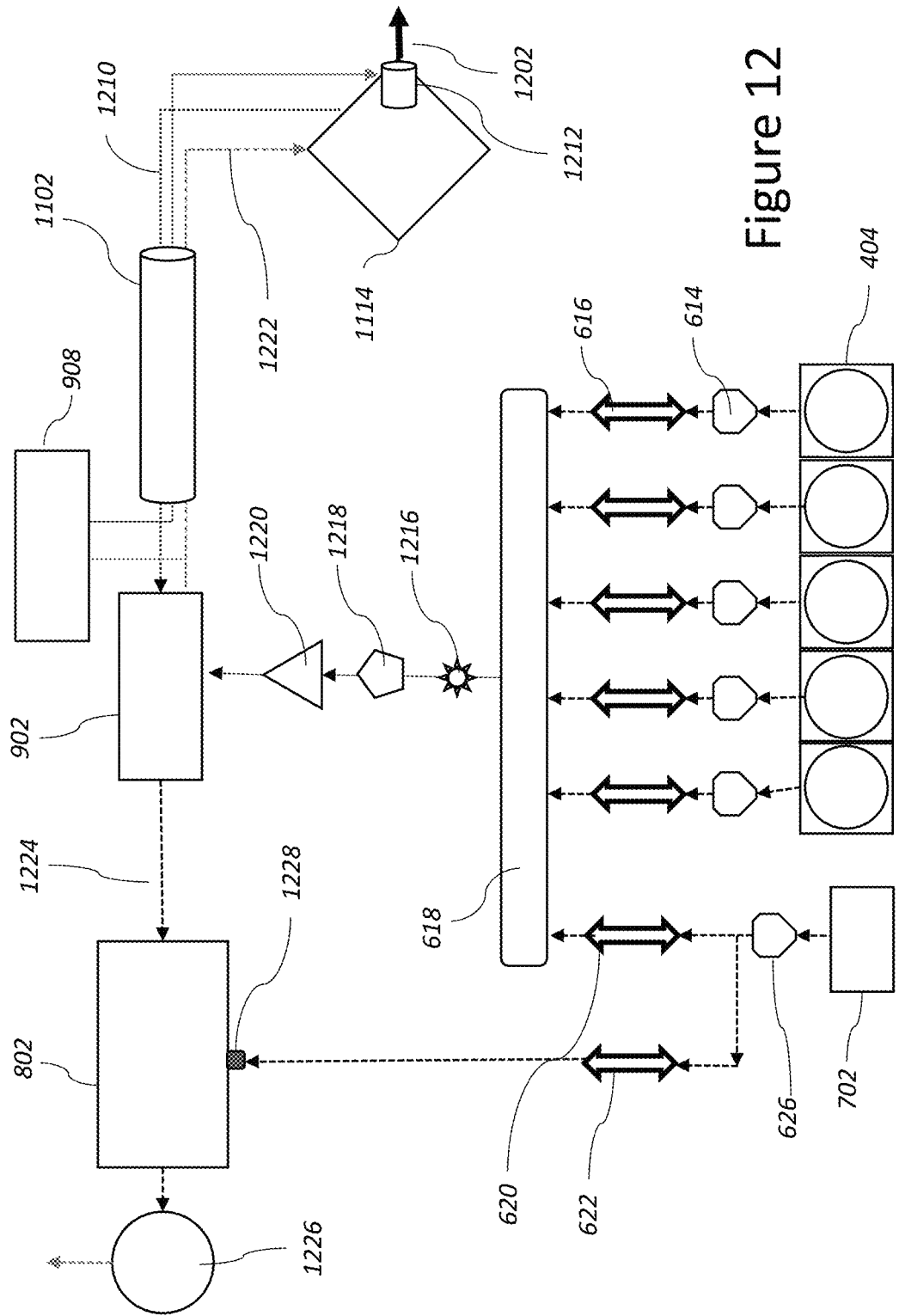
FIG. 12 is a process flow diagram (PFD) for an exemplary testing system as disclosed herein.

FIG. 12 is a process flow diagram showing the flow of specialty gases and exhaust gas through the flow control equipment required to direct these gases to the analyzer. The ultimate objective of this process is to collect a sample of exhaust stack gas. The process begins with a technician inserting a probe 1202, attached to a probe box 1114, into a probe access port near the top of the exhaust stack. Probe box 1114 is connected to heated sample pump 902 by sample line 1102. Heated sample pump 902 provides suction/negative pressure to sample line 1210 thereby drawing sample gas from probe box 1114. To maintain the sample gas above the acid dew point, sample lines 1102 are normally heated as is filter housing 1212 in probe box 1204. Proper temperature is maintained in these devices using temperature controller/heat trace controller 908.

The portable, self-contained testing system disclosed herein can perform a full range of tests performed in the industry on exhaust stack gas. Depending on the type of test to be conducted, exhaust sample gas is sometimes mixed with specific specialty compressed gases. Specialty gases are contained in compressed gas cylinders 404. Nitrogen may be supplied in a compressed gas cylinder or by a nitrogen generator 702. Each gas flows through a manual 2-stage high purity regulator 614. If using a nitrogen generator 702 then single stage high purity regulator 626 is required. These regulators control the maximum pressure allowed into the system to prevent damage from over pressurization. From regulators 614 and 626, each gas then flows to 2-way automated valves 616 that, controlled by process load controller 842, open and close based on gas requirements for the specific test being conducted. From the 2-way automated valves 616, gas flows into a 6-inlet port and 1-outlet port gas manifold 618. Gas flows out of gas manifold 618 into an automated and manual flow gage 1216 that allows a technician to confirm gas flow and pressure in the system. The gas next flows into automated mass flow controller 1218 that regulates the amount of gas needed for each portion of a test. The gas next flows to manual needle valve 1220 then into heated sample pump 902. Needle valve 1220 is a failsafe that ensures final system pressure is maintained. From heated sample pump 902, gas is directed through calibration line 1222 to probe box 1114 where, if required, it is mixed with the sample gas in filter housing 1212 and then pulled back through sample line 1210 by sample pump 802. Heated sample pump 802 then directs the mixed sample gas through a second heated sample line 1224 into analyzer 802. For final oxygen content analysis, sample gas exhausted from the analyzer flows through oxygen sensor 1226 then out of the testing skid.

Unlike the other specialty gases, nitrogen has two separate flow patterns controlled by separate 2-way automated valves 620 and 622. For purging the sample line system 1102, 2-way automated valve 622 remains closed and 620 opens directing nitrogen through sample line 1102 in calibration line 1222, into filter housing 1212, then back down sample line 1210. To purge the analyzer, 2-way automated valve 620 remains closed and 622 opens directing nitrogen to the purge port 1228 on analyzer 802.

Figure 13:
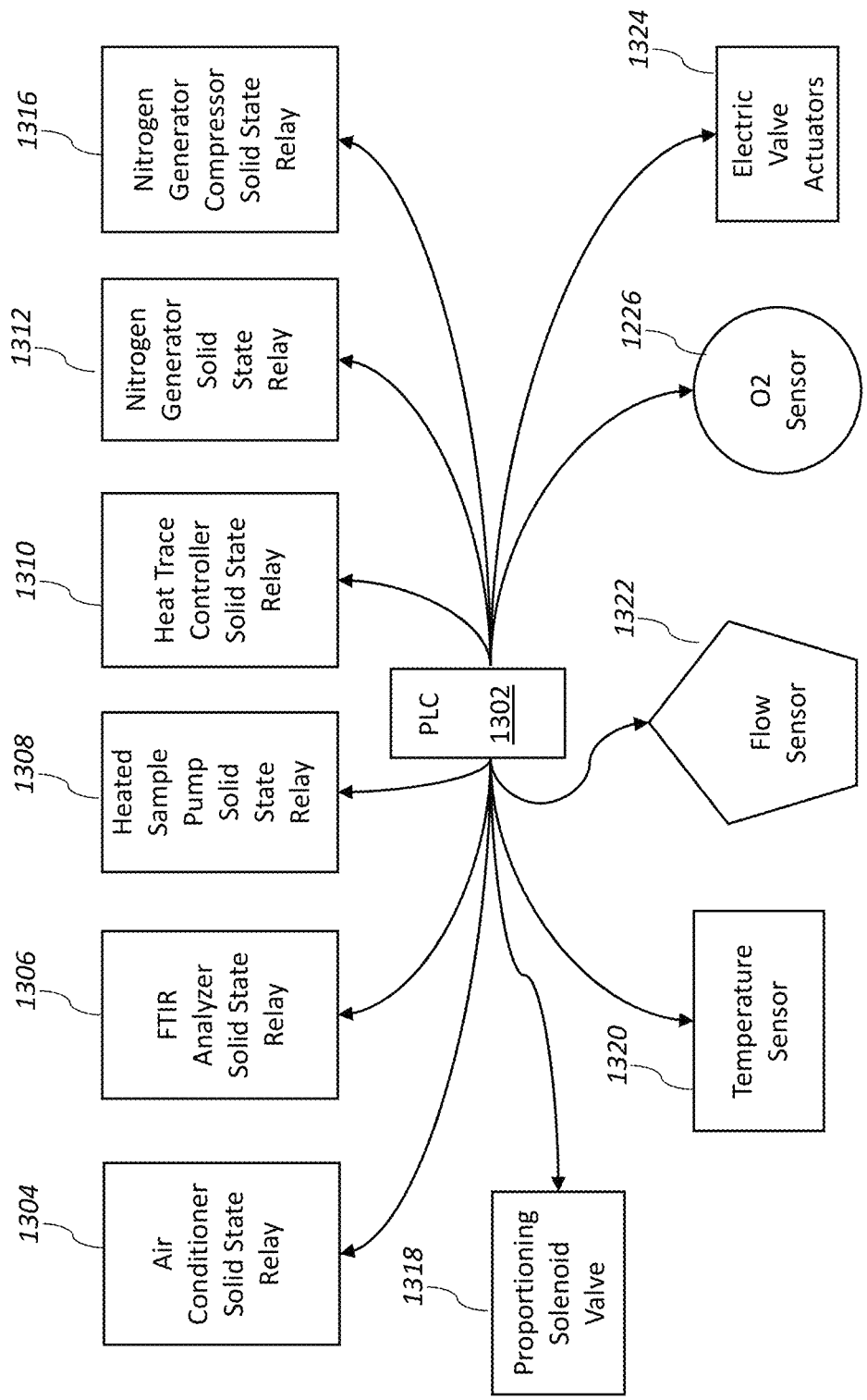
FIG. 13 is a block schematic diagram showing electrical control connections of a programmable logic controller in an example embodiment.

FIG. 13 is a block schematic diagram showing an example embodiment of connections of a PLC or PAC to electrical relays, switches, and devices to enable control of the system disclosed herein.

Figure 14:
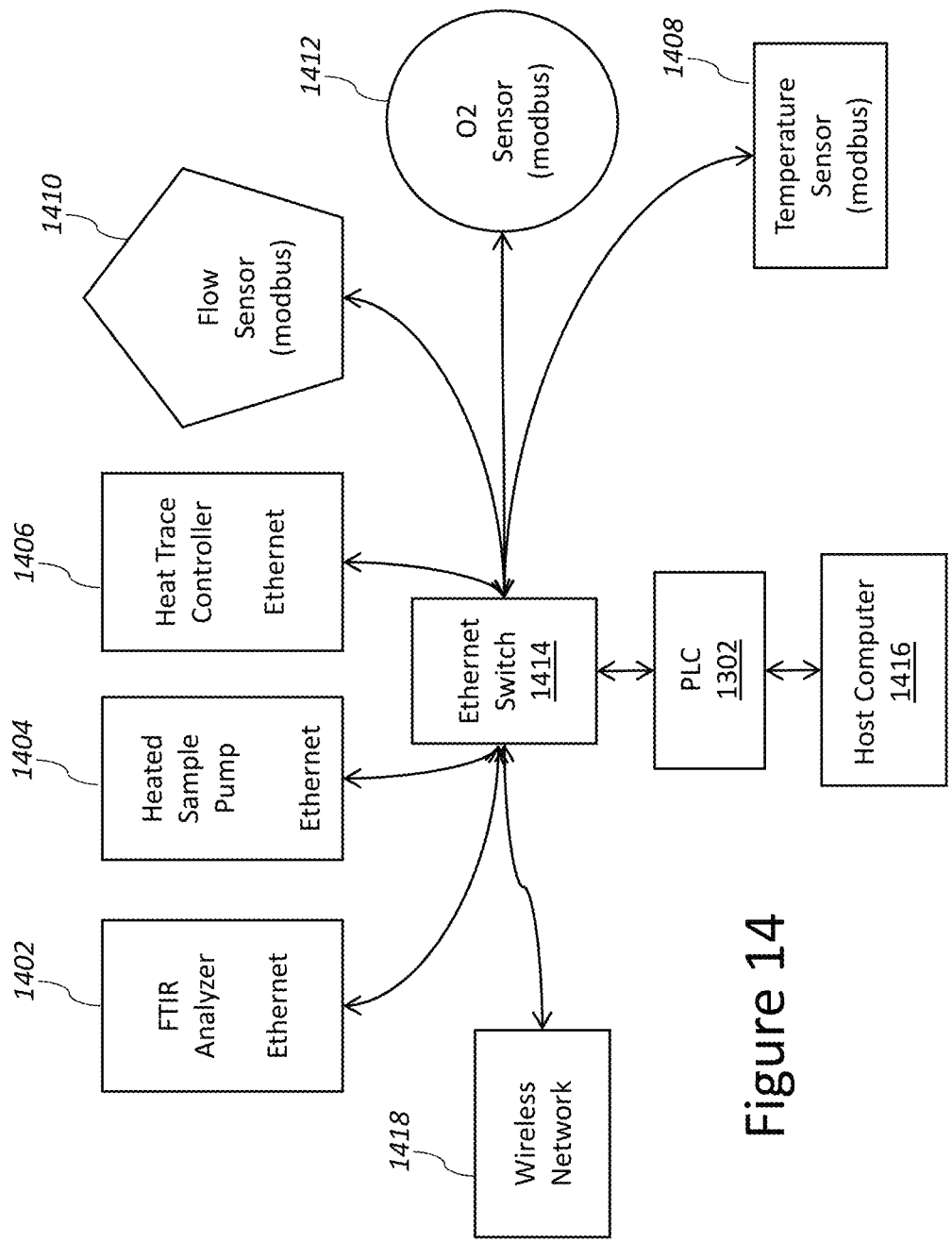
FIG. 14 is a block schematic diagram showing digital data connections in an example embodiment of the present system.

FIG. 14 is a block schematic diagram showing digital data connections in an example embodiment of the present system. An Ethernet switch 1414, preferably an unmanaged switch, is connected by Ethernet cables to PLC 1302, FTIR analyzer 1402, heated sample pump 1404, heat trace controller 1406, flow sensor 1410, oxygen sensor 1412, and temperature sensor 1408. Ethernet switch 1414 is also connected to wireless network 1418. The connection to wireless network 1418 may be in the form of a cellular network 4G or 5G data connection, a local WiFi connection, or any other wireless communications channel. PLC 1302 is connected to host computer 1416.

In a preferred embodiment, two types of software are provided to operate the skid-based testing system. Software in the form of code or a ladder diagram is provided for the PLC which sequences and controls the on/off, open/close, and flow control of the automated equipment described herein to perform one or more programmed, standard tests. In addition, software is provided for data acquisition, processing and reporting. This software operates in host computer 1416 associated with the testing skid, and takes the data from the analyzer, converts it to test data by running it through Environmental Protection Agency-mandated mathematical formulas/calculations, and reports the results using established report formats. Host computer 1416 can be any computing device that can be programmed to perform the necessary calculations and report formatting. As one example, host computer 1416 may be a Raspberry Pi 4.

Figure 15:
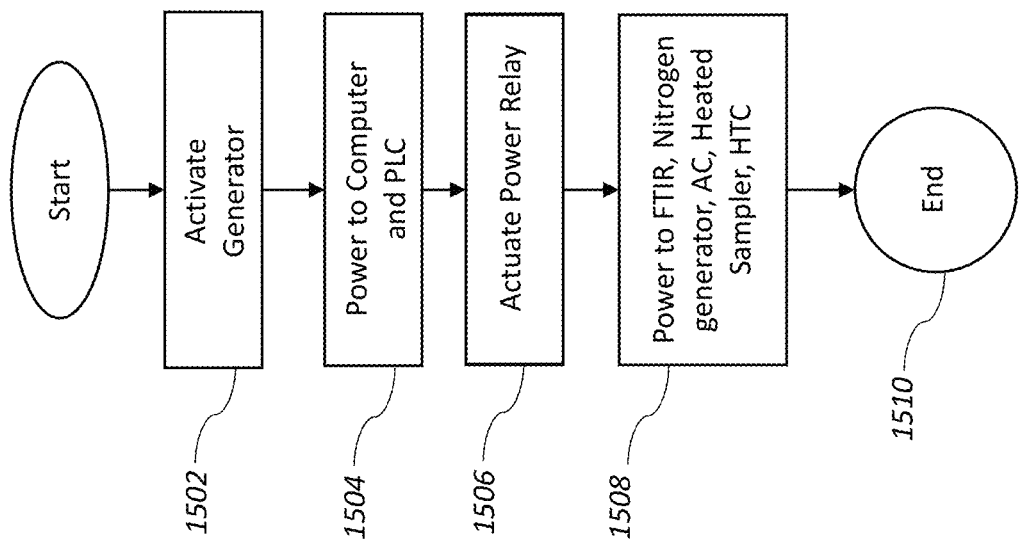
FIG. 15 is a flow chart of an exemplary global process for conducting tests using the systems disclosed herein.

FIG. 15 is a high-level flow chart for an example embodiment of the startup function performed in the system. Starting with step 1502, the operator turns on the generator to provide power to the skid. The generator can be started with a switch or wirelessly via a remote key fob. Next, in step 1504, as the generator starts it provides power to PLC 1302 and host computer 1416, causing them to boot up and begin operating. In step 1506, as part of its own startup process, the PLC actuates a power relay. In step 1508, power flows via the power relay to the FTIR, Nitrogen generator, air conditioner, heated sampler, and Heat Trace Controller (HTC).

FIG. 16 is a flow chart showing an example embodiment of the overall test process implemented in software in the PLC 1302 and host computer 1416. After the PLC 1302 and host computer 1416 have booted up and are ready for operation (see step 1504 in FIG. 16), the test process starts with calibration step 1602. In step 1604, the system collects test data from the attached sensors and performs appropriate analysis of the test data. In step 1606, the host computer provides formatted test results output. In step 1608, if a retest or another test is to be performed, the process returns to step 1604 to begin the next test. If no further tests are to be performed, the system powers down and the process ends at step 1610.

In the calibration process (shown at step 1602 in FIG. 16), preferably all of the connected sensors and devices are tested for operation and calibrated as required. For example, the calibration process may include calibration of the following: background, direct zero, upscale oxygen, mid oxygen/nitrous oxide, CTS, 5-gas spike, 2-gas spike, system zero, system mid oxygen/nitrous oxide with response, system CTS with response, system 5-gas spike with response, system 2-gas spike with response, and system zero with response.

Table 1 is an exemplary list of processing steps for one example embodiment for conducting a 40 CFR Part 60 Subpart JJJJ-type emissions test using the novel arrangements of analyzer and supporting equipment disclosed herein. Table 1 shows processing steps in sequence for starting, calibration, testing, and shutdown processes as indicated by headings in the table. The software functions defined in Table 1 are preferably implemented in and performed by the Programmable Logic Controller. As indicated in the table, some steps are implemented with an if-then-else logical control structure implemented in the PLC software.

Those skilled in the relevant art will appreciate that the equipment and arrangements disclosed herein can be used to perform a variety of tests that can be automated in a similar manner. Other types of tests that can be performed include, but are not limited to, 40 CFR Part 63 Subpart ZZZZ, TCEQ Title 30 106.512, TCEQ Title 30 TAC 117, Non-Rule Standard Permit, and general state compliances tests. An even broader range of tests can be enabled by substituting different equipment for the analyzers and other items shown in the example embodiments.

The systems and methods disclosed in the preferred embodiments described herein offer several unobvious advantages, such as allowing one technician to concurrently test multiple exhaust stacks at distances greater than the current limit of about 200 feet. Using the systems and methods disclosed in the preferred embodiments, a single technician can conduct tests on engines separated by any distance, from 100 feet to miles apart. Remote access and monitoring via local Wi-Fi and/or cellular data implemented in the preferred embodiments further enable the technician to monitor and control tests at a distance.

In preferred embodiments, the system enables automated testing, allowing the technician to monitor and support multiple tests and test sites. This automation increases accuracy and repeatability by removing human error from the tests.

In additional preferred embodiments, the system disclosed can be moved from test site to test site, is powered by an integral power source, and contains requisite analyzers and support equipment required to conduct tests.

Although illustrative embodiments have been described herein in detail, it should be noted and understood that the descriptions and drawings have been provided for purposes of illustration only and that other variations both in form and detail can be added thereto without departing from the spirit and scope of the invention. The terms and expressions in this disclosure have been used as terms of description and not terms of limitation. Thus, the breadth and scope of the present invention should not be limited by any of the above-described exemplary embodiments but should be defined only in accordance with the claims and their equivalents. The terms and expressions herein should not be interpreted to exclude any equivalents of features shown and described, or portions thereof.

TABLE 1

| Step | Step Name | Command Start | If (Condition)/Command | Hardware | Then | Else | Timeout |
|---|---|---|---|---|---|---|---|
| | | | STARTUP | | | | |
| 1 | Generator Power Up | Key Fob | | | | | |
| 2 | Pi4 Boot Up | Complte Prev Step | If: Pi4 is ON | Pi4 | Next Step | Repeat | 1 Restart |
| 2a | PAC Boot Up | Complte Prev Step | If: Pi4 registers PAC is ON | Pi4 | Next Step | Repeat | 1 Restart |
| 3 | Generator Warm-Up | TA_1 Cmd | If: Sub conditions are met | | Next Step | | |
| 3a | Wait | TA_1 Cmd | Command: Wait 5 minutes | | | | |
| 4 | AC Start Up | TA_1 Cmd | If: Sub conditions are met | | Next Step | | 1 Restart |
| 4a | AC - Power On | TA_1 Cmd | Command: PR_1; On | Pwr Relay | | | |
| 4b | AC - Target Temp Set | TA_1 Cmd | Command: Set target temp @75 F. | A/C | | | |
| 7 | Temperature Check | TA_1 Cmd | If: CC_Temp@ 32 F. < 90 F. | A/C | Next Step | Repeat | 30 Minutes |
| 9 | FTIR Power Up | TA_1 Cmd | Command: PR_4; On | FTIR Anlyzr | Next Step | | |
| 10 | FTIR System Check | TA_1 Cmd | If: Sub conditions are met | FTIR Anlyzr | Next Step | Alert App | 2 Minutes |
| 10a | Wait | TA_1 Cmd | Command: Wait 60 seconds | | | | |
| 10b | Cell Temp Check | TA_1 Cmd | If: Cell_Temp Incrs 3 C. over 120 secs | FTIR Anlyzr | | | |
| 10c | IFG Votalge Temp | TA_1 Cmd | If:IF_V >2 | FTIR Anlyzr | | | |
| 10d | IFG Center | TA_1 Cmd | If: IFG_C steady between 2000 < 3000 | FTIR Anlyzr | | | |
| 11 | Nitrogen Generator Power Up | TA_1 Cmd | Command: PR_2; On | N Generator | Next Step | | |
| 12 | Nitrogen Generator System Check | TA_1 Cmd | If: Receive Signal from N Generator | N Generator | Next Step | Alert App | 1 Restart |
| 13 | HTC Power Up | TA_1 Cmd | Command: PR_5 | HTC | Next Step | | |
| 14 | HTC System Check | TA_1 Cmd | If: HSL_T Rises by 2 C. over 120 seconds | HTC | Next Step | Alert App | 2 Minutes |
| 15 | Htd Sampler/Cond. Power Up | TA_1 Cmd | Command: HS; Power On | Htd Sampler | Next Step | | |
| 16 | Htd Sampler/Cond. System Check | TA_1 Cmd | If: 2 Chan. Tmp Rises 2 C. over 120 secs | Htd Sampler | Next Step | Alert App | 2 Minutes |
| 17 | O2 Sensor | TA_1 Cmd | Command: PR_6; On | O2 Sensor | Next Step | | |
| 18 | O2 Sensor System Check | TA_1 Cmd | If: Receive Signal | O2 Sensor | Next Step | Alert All | 1 Restart |
| 19 | System GO/NO GO | TA_1 Cmd | If: Sub conditions are met | | Alert App | | |
| 19a | FTIR GO/NO GO | TA_1 Cmd | If: Cell_Temp >= 175 C. and IFG Volt >2 V | FTIR Analyzer | Snd "GO" Sgnl | | |
| 19b | Htd Sampler/Cond. GO/NO GO | TA_1 Cmd | If: TL_T > 175 C. and HHP > 175 C. | Htd Sampler | Snd "GO" Sgnl | | |
| 19c | HTC GO/NO GO | TA_1 Cmd | If: HSL_T > 175 C. | HTC | Snd "GO" Sgnl | | |
| 19d | Nitrogen Gen. GO/NO GO | TA_1 Cmd | If: Based on MFG specs | N Generator | Snd "GO" Sgnl | | |

TABLE 1-continued

| Step | Step Name | Command Start | If (Condition)/Command | Hardware | Then | Else | Timeout |
|---|---|---|---|---|---|---|---|
| 19e | O2 Sensor GO/ NO GO | TA_1 Cmd | If: Based on MFG specs | O2 Sensor | Snd "GO" Sgnl | | |
| | | | CALIBRATION | | | | |
| 20 | Start Calibrations | TA_1 Cmd | If: Sub conditions are met | | Next Step | | |
| 20a | Delay | TA_1 Cmd | Wait 5 Minutes | | | | |
| 20b | Override | | Command to stop automation here | | | | |
| 21 | FTIR Pre Zero | TA_1 Cmd | If: Sub conditions are met | | Next Step | | |
| 21a | AV_6 Command | | Command: AV_6 to OPEN | Electric Valve | | | |
| 21b | MFC_1 Command | | Command: MFC_1 to 3 lpm | Mass Flw Ctrlr | | | |
| 21c | HS_AV_1 Command | | Command: HS_AV_1 to Direct | Htd Sampler | | | |
| 21d | Timer | | Timer: 600 seconds | | | | |
| 22 | Background | | | | | | |
| 22a | AV_6 Command | | Command: AV_6 to OPEN | | | | |
| 22b | MFC_1 Command | | Command: MFC_1 to 3 lpm | Mass Flw Ctrlr | | | |
| 22c | HS_AV_1 Command | | Command: HS_AV_1 to Direct | Electric Valve | | | |
| 22d | BKG_1 Command | | Command: FTIR to initiate background | FTIR Anlyzr | | | |
| 22e | Timer | | Timer: 180 seconds | | | | |
| 22f | BKG_1_Wave | | Cmd: Cpy wvnmbrs frm bkgrnd as BKG_1_Wave | FTIR Anlyzr | | | |
| 22g | BKG_1_Wave Confirm | | Cmd: Confirm linearity passes | FTIR Anlyzr | | | |
| 22h | BKG_1_SH | | Cmd: Scrnshot bckgrnd and save as BKG_1_SH | FTIR Anlyzr | | | |
| 22i | BKG_1_H | | Cmd: Save background height as BKG_1_H | FTIR Anlyzr | | | |
| 22j | Background GO/ NO GO | | If: BKG_1_H >35,000 | FTIR Anlyzr | Continue | Repeat step 22 | 1 Restart |
| 23 | Direct Zero | | | | | | |
| 23a | AV_6 Command | | Command: AV_6 to OPEN | Electric Valve | | | |
| 23b | MFC_1 Command | | Command: MFC_1 to 3 lpm | Mass Flw Ctrlr | | | |
| 23c | HS_AV_1 Command | | Command: HS_AV_1 to Direct | Htd Sampler | | | |
| 23d | PF_Check | | If: H2O_A < 0.50 | | Continue | Repeat step 23d | 5 minutes |
| | | | If: O2_A < 0.50 If: All other analytes less than 5 ppm | | | | |
| 23e | Record_Data | | Command: Record 3 samples | | | | |
| 23f | PF_Check | | If: Recorded Average for H2O_A from 23e values less than 0.50 | | Continue | Repeat step 23d | 2 minutes |
| | | | If: Recorded Average for O2_A from 23e values less than 0.50 | | | | |
| | | | If: Recorded Average all other analytes from 23e less than 5 ppm | | | | |
| 23g | AV_6 Command | | Command: AV_6 to CLOSE | Electric Valve | | | |
| 24 | Upscale O2 | | | | | | |
| 24b | AV_4 Command | | Command: AV_4 to OPEN | Electric Valve | | | |
| 24c | MFC_1 Command | | Command: MFC_1 to 3 lpm | Mass Flw Ctrlr | | | |
| 24d | HS_AV_1 Command | | Command: HS_AV_1 to Direct | Htd Sampler | | | |
| 24e | PF_Check | | If: O2 is within 2% of 21%_O2_BV | O2 Sensor | Continue | Repeat step 24e | 5 minutes |
| 24f | Record_Data | | Command: Record data for 60 seconds | | | | |
| 24g | PF_Check | | If: Avg O2 from 24f within 2% of 21%_O2_BV | | Continue | Repeat step 24e | 2 minutes |
| 24h | AV_4 Command | | Command: AV_4 to CLOSE | Electric Valve | | | |
| 25 | Mid O2/NO2 | | | | | | |
| 25a | AV_3 Command | | Command: AV_3 to OPEN | Electric Valve | | | |
| 25b | MFC_1 Command | | Command: MFC_1 to 3 lpm | Mass Flw Ctrlr | | | |
| 25c | HS_AV_1 Command | | Command: HS_AV_1 to Direct | Htd Sampler | | | |
| 25d | PF_Check | | If: O2 is within 2% of 9%_O2_BV | O2 Sensor & FTIR Analyzer | Continue | Repeat step 25d | 5 minutes |
| | | | If: NO2 is within 2% of NO2_BV | | | | |
| 25e | Record_Data | | Command: Record data for 60 seconds | | | | |

TABLE 1-continued

| Step | Step Name | Command Start | If (Condition)/Command | Hardware | Then | Else | Timeout |
|---|---|---|---|---|---|---|---|
| 25f | PF_Check | | If: Average O2 from 25e is within 2% of 9%_O2_BV<br>If: Average NO2 from 25e is within 2% of NO2_BV | O2 Sensor & FTIR Analyzer | Continue | Repeat step 25d | 2 minutes |
| 25g | AV_3 Command | | Command: AV_3 to CLOSE | Electric Valve | | | |
| 26 | CTS | | | | | | |
| 26a | AV_2 Command | | Command: AV_2 to OPEN | Electric Valve | | | |
| 26b | MFC_1 Command | | Command: MFC_1 to 3 lpm | Mass Flw Ctrlr | | | |
| 26c | HS_AV_1 Command | | Command: HS_AV_1 to Direct | Htd Sampler | | | |
| 26d | PF_Check | | If: Ethylene is within 2% of CTS_BV | FTIR Analyzer | Continue | Repeat step 26d | 5 minutes |
| 26e | Record_Data | | Command: Record data for 60 seconds | | | | |
| 26f | PF_Check | | If: Avg Ethylene from 26e within 2% of CTS_BV | | Continue | Repeat step 26d | 2 minutes |
| 26g | AV_2 Command | | Command: AV_2 to CLOSE | Electric Valve | | | |
| 27 | 5 Gas Spike Spike | | | | | | |
| 27a | AV_1 Command | | Command: AV_1 to OPEN | | | | |
| 27b | MFC_1 Command | | Command: MFC_1 to 3 lpm | | | | |
| 27c | HS_AV_1 Command | | Command: HS_AV_1 to Direct | | | | |
| 27d | PF_Check | | If: Propane is within 2% of PROPANE_BV<br>If: CO is within 2% of CO_BV<br>If: NO is within 2% of NO_BV<br>If: SF6 is within 2% of SF6_BV | | Continue | Repeat step 27d | 5 minutes |
| 27e | Record_Data | | Command: Record data for 60 seconds | | | | |
| 27f | PF_Check | | If: Average Propane from step 27e is within 2% of PROPANE_BV<br>If: Average CO from step 27e is within 2% of CO_BV<br>If: Average NO from step 27e is within 2% of NO_BV<br>If: Average SF6 from step 27e is within 2% of SF6_BV | | Continue | Repeat step 27d | 2 minutes |
| 27g | AV_1 Command | | Command: AV_1 to CLOSE | | | | |
| 28 | 2 Gas Spike | | | | | | |
| 28a | GO/NO-GO | | If: CH2O Permit Present | | Continue | Skip to 29 | |
| 28b | AV_5 Command | | Command: AV_5 to OPEN | | | | |
| 28c | MFC_1 Command | | Command: MFC_1 to 3 lpm | | | | |
| 28d | HS_AV_1 Command | | Command: HS_AV_1 to Direct | | | | |
| 28e | PF_Check | | If: Acetaldehyde is within 2% of Aceta_BV<br>If: SF6 is within 2% of SF6_2G_BV | | Continue | Repeat step 28e | 5 minutes |
| 28f | Record_Data | | Command: Record data for 60 seconds | | | | |
| 28g | PF_Check | | If: Average Acetaldehyde from step 28f is within 2% of Aceta_BV<br>If: Average SF6 from 28f is within 2% of SF6_2G_BV | | Continue | Repeat step 28e | 2 minutes |
| 28h | AV_5 Command | | Command: AV_5 to CLOSE | | | | |
| 29 | System Zero | | | | | | |
| 29a | Sample Pump | | Command: Sample Pump to ON | | | | |
| 29b | AV_6 Command | | Command: AV_6 to OPEN | | | | |
| 29c | MFC_1 Command | | Command: MFC_1 to OPEN | | | | |
| 29d | HS_AV_1 Command | | Command: HS_AV_1 to SYSTEM | | | | |
| 29e | PF_Check | | If: H2O & O2 values less than 0.50%<br>If: All other analytes less than 5 ppm | | Continue | Repeat step 29d | 5 minutes |
| 29f | Record_Data | | Command: Record data for 60 seconds | | | | |

TABLE 1-continued

| Step | Step Name | Command Start | If (Condition)/Command | Hardware | Then | Else | Timeout |
|---|---|---|---|---|---|---|---|
| 29g | PF_Check | | If: Recorded Average H2O & O2 from 29f values less than 0.50%<br>If: Recorded Average all other analytes from 29f less than 5 ppm | | Continue | Repeat step 29d | 2 minutes |
| 29h | AV_6 Command | | Command: AV_6 to CLOSE | | | | |
| 30 | CTS w/Response Time | | | | | | |
| 30a | AV_1 Command | | Command: AV_1 to OPEN | | | | |
| 30b | MFC_1 Command | | Command: MFC_1 to OPEN | | | | |
| 30c | HS_AV_1 Command | | Command: HS_AV_1 to SYSTEM | | | | |
| 30d | Timer | | Command: Start timer | | | | |
| 30e | Record_Data | | Command: Record data for 60 seconds & stop/save timer when:<br>If: Ethylene is within 5% of CTS_BV | | | | |
| 30f | PF_Check | | If: Avg Ethylene from 30e is within 5% of CTS | | Continue | Repeat step 30d | 2 minutes |
| 30g | AV_1 Command | | Command: AV_1 to CLOSE | | | | |
| 31 | 5 Gas Spike Spike w/Response Time | | | | | | |
| 31a | AV_1 Command | | Command: AV_1 to OPEN | | | | |
| 31b | MFC_1 Command | | Command: MFC_1 to OPEN | | | | |
| 31c | HS_AV_1 Command | | Command: HS_AV_1 to SYSTEM | | | | |
| 31d | Timer | | Command Start Timer | | | | |
| 31e | Record_Data | | Command: Record data for 60 seconds and stop/save timer when:<br>If: Propane is within 5% of PROPANE_BV<br>If: CO is within 5% of CO_BV<br>If: NO is within 5% of NO_BV<br>If: SF6 is within 5% of SF6_BV | | Continue | Repeat step 31d | |
| 31f | F_Check | | If: Average Propane from step 31e is within 5% of PROPANE_BV<br>If: Average CO from step 31e is within 5% of CO_BV<br>If: Average NO from step 31e is within 5% of NO_BV<br>If: Average SF6 from step 31e is within 5% of SF6_BV | | Continue | Repeat step 31d | |
| 31h | AV_1 Command | | Command: AV_1 to CLOSE | | | | |
| 32 | Mid O2/NO2 w/ Response Time | | | | | | |
| 32a | AV_3 Command | | Command: AV_3 to OPEN | | | | |
| 32b | MFC_1 Command | | Command: MFC_1 to OPEN | | | | |
| 32c | HS_AV_1 Command | | Command: HS_AV_1 to SYSTEM | | | | |
| 32d | Timer | | Command: Start Timer | | | | |
| 32d | Record_Data | | Command: Record data for 60 seconds and stop/save timer when:<br>If: O2 is within 5% of 9%_O2_BV<br>If: NO2 is within 5% of NO2_BV | | | | |
| 32f | Record_Data | | Command: Record data for 60 seconds | | | | |
| 32g | PF_Check | | If: Average O2 from 32f is within 5% of 9%_O2_BV<br>If: Average NO2 from 32f is within 5% of NO2_BV | | | | |
| 32h | AV_3 Command | | Command: AV_3 to CLOSE | | | | |
| 33 | 2 Gas Spike (When Required) w/Resp | Complte Prev Step | | | | | |
| 33a | 3O/NO-GO | | If: CH2O Permit Present | | Continue | Skip to 34 | |
| 33b | AV_5 Command | | Command: AV_5 to OPEN | | | | |
| 33c | MFC_1 Command | | Command: MFC_1 to OPEN | | | | |
| 33d | HS_AV_1 Command | | Command: HS_AV_1 to SYSTEM | | | | |

TABLE 1-continued

| Step | Step Name | Command Start | If (Condition)/Command | Hardware | Then | Else | Timeout |
|---|---|---|---|---|---|---|---|
| 33e | Timer | | Command: Start Timer | | | | |
| 33f | Record_Data | | Command: Record data for 60 seconds and stop/save timer when:<br>If: Acetaldehyde is within 5% of Aceta_BV<br>If: NO2 is within 5% of SF6_2G_BV | | | | |
| 33g | PF_Check | | If: Average Acetaldehyde from step 33f is within 5% of Aceta_BV<br>If: Average SF6 from step 33f is within 5% of SF6_2G_BV | | Continue | Repeat step 33e | 2 minutes |
| 33h | AV_5 Command | | Command: AV_5 to CLOSE | | | | |
| 34 | System Zero w/ Response Time | Complte Prev Step | | | | | |
| 34a | AV_6 Command | | Command: AV_6 to OPEN | | | | |
| 34b | MFC_1 Command | | Command: MFC_1 to OPEN | | | | |
| 34c | HS_AV_1 Command | | Command: HS_AV_1 to SYSTEM | | | | |
| 34d | Timer | | Command: Start Timer | | | | |
| 34e | Record_Data | | Command: Record data for 60 seconds and stop/save timer when:<br>If: Propane is less than 95% of PROPANE_BV<br>If: CO is less than 95% of CO_BV<br>If: NO is less than 95% of NO_BV<br>If: Acetaldehyde is less than 95% of Aceta_BV | | | | |
| 34f | PF_Check | | If: Recorded Average H2O & O2 values from 34e less than 0.50%<br>If: Recorded Average all other analytes from 34e less than 95% of xx_BV | | | | |
| 34g | AV_6 Command | | Command: AV_6 to CLOSE TEST | | | | |
| 35 | Pump Start | App Command | Command: Human Input Command | | | | |
| 36 | Diagnostic Sampling | | If: Sub conditions are met | | Continue | Rpt Step. Alert App | 30 Mins-Alert Apr |
| 36a | GO/NO-GO | TA_1 Cmd | Command: TRUE/FALSE | | | | |
| 37 | Source Step 1A | Complte Prev Step | If: Sub conditions are met | | | | |
| 37a | TA_1 Decision | TA_1 Cmd | If: PASSING | | | | |
| 37b | MFC_1 Command | | Command: MFC_1 to CLOSE | | | | |
| 37c | AV3_1 Command | | Command: AV3_1 to CLOSE | | | | |
| 37d | AV_1 Command | | Command: AV_1 to CLOSE | | | | |
| 37e | AV_2 Command | | Command: AV_2 to CLOSE | | | | |
| 37f | AV_3 Command | | Command: AV_3 to CLOSE | | | | |
| 37g | AV_4 Command | | Command: AV_4 to CLOSE | | | | |
| 37h | AV_5 Command | | Command: AV_5 to CLOSE | | | | |
| 37i | DC_1 Command | TA_1 Cmd | Command: Start Recording | | | | |
| 37j | TA_1 Decision | TA_1 Cmd | Recurring: Confirm Passing Values | | | Alert App, Stop | |
| 38 | Spike 1 | | | | | | |
| 38a | DC_1 Command | TA_1 Cmd | Command: Stop Recording | | | | |
| 38b | TA_1 Decision | TA_1 Cmd | Command: Confirm pass state | | | | Alert App |
| 38c | RS_1 Command | | Command: Save DC_1 data | | | | |
| 38d | RS_1 Command | TA_1 Cmd | Command: Confirm DC_1 Save Data | | | | |
| 38e | TA_1 Decision | TA_1 Cmd | Command: Initiate Spike 1 Step | | | | |
| 38f | AV_1 or AV_5 Command | TA_1 Cmd | Command: AV_1 or AV_5 to OPEN | | | | |
| 38g | MFC_1 Command | TA_1 Cmd | Command: MFC_1 to SET POINT OPEN | | | | |
| 38h | TA_1 Decision | TA_1 Cmd | Command: Confirm Spike Pass State | | | | |

TABLE 1-continued

| Step | Step Name | Command Start | If (Condition)/Command | Hardware | Then | Else | Timeout |
|---|---|---|---|---|---|---|---|
| 38i | DC_1 Command | TA_1 Cmd | Command: Start Recording | | | | |
| 38j | DC_1 Command | TA_1 Cmd | Command: Stop Recording | | | | |
| 38k | TA_1 Decision | TA_1 Cmd | Command: Confirm pass state | | | | |
| 38l | AV_1 or AV_5 Command | | Command: AV_1 or AV_5 to CLOSE | | | | |
| 38M | MFC_1 Command | | Command: MFC_1 to CLOSE | | | | |
| 39 | Source Step 1B | Complete Prev Step | If: Sub conditions are met | | | | |
| 39a | TA_1 Decision | TA_1 Cmd | If: PASSING | | | | |
| 39b | MFC_1 Command | | Command: MFC_1 to CLOSE | | | | |
| 39c | AV3_1 Command | | Command: AV3_1 to CLOSE | | | | |
| 39d | AV_1 Command | | Command: AV_1 to CLOSE | | | | |
| 39e | AV_2 Command | | Command: AV_2 to CLOSE | | | | |
| 39f | AV_3 Command | | Command: AV_3 to CLOSE | | | | |
| 39g | AV_4 Command | | Command: AV_4 to CLOSE | | | | |
| 39h | AV_5 Command | | Command: AV_5 to CLOSE | | | | |
| 39i | DC_1 Command | TA_1 Cmd | Command: Start Recording | | | | |
| 39j | TA_1 Decision | TA_1 Cmd | Recurring: Confirm Passing Values | | | Alert App, Stop | |
| 40 | Baseline 1 | Complete Prev Step | | | | | |
| 40a | DC_1 Command | TA_1 Cmd | Command: Stop Recording | | | | |
| 40b | TA_1 Decision | TA_1 Cmd | Command: Confirm pass state | | | | Alert App |
| 40c | RS_1 Command | | Command: Save DC_1 data | | | | |
| 40d | RS_1 Command | TA_1 Cmd | Command: Confirm DC_1 Save Data | | | | |
| 40e | TA_1 Decision | TA_1 Cmd | Command: Initiate Baseline 1 Step | | | | |
| 40f | AV3_1 Command | TA_1 Cmd | Command: AV3_1 to OPEN | | | | |
| 40g | MFC_1 Command | TA_1 Cmd | Command: MFC_1 to OPEN | | | | |
| 40h | TA_1 Decision | TA_1 Cmd | Command: Confirm pass state | | | | |
| 40i | DC_1 Command | TA_1 Cmd | Command: Start Recording | | | | |
| 40j | DC_1 Command | TA_1 Cmd | Command: Stop Recording | | | | |
| 40k | TA_1 Decision | TA_1 Cmd | Command: Confirm pass state | | | | |
| 40l | RS_1 Command | TA_1 Cmd | Command: Save DC_1 data | | | | |
| 41 | Response Time Check | Complete Prev Step | All the time | | | | |
| 42 | Source Step 1B | Complete Prev Step | All the time | | | | |
| 43 | Response Time Check | Complete Prev Step | All the time | | | | |
| 44 | Baseline 1 | Complete Prev Step | All the time | | | | |
| 45 | Response Time Check | Complete Prev Step | All the time | | | | |
| 46 | Source Step 2A | Complete Prev Step | All the time | | | | |
| 47 | Response Time Check | Complete Prev Step | All the time | | | | |
| 48 | Spike 2 | Complete Prev Step | All the time | | | | |
| 49 | Response Time Check | Complete Prev Step | All the time | | | | |
| 50 | Source Step 2B | Complete Prev Step | All the time | | | | |
| 51 | Response Time Check | Complete Prev Step | All the time | | | | |
| 52 | Baseline 2 | Complete Prev Step | All the time | | | | |
| 53 | Response Time Check | Complete Prev Step | All the time | | | | |
| 54 | Source 3A | Complete Prev Step | All the time | | | | |
| 55 | Response Time Check | Complete Prev Step | All the time | | | | |
| 56 | Spike 3 | Complete Prev Step | All the time | | | | |
| 57 | Response Time Check | Complete Prev Step | All the time | | | | |
| 58 | Source 3B | Complete Prev Step | All the time | | | | |

TABLE 1-continued

| Step | Step Name | Command Start | If (Condition)/Command | Hardware | Then | Else | Timeout |
|---|---|---|---|---|---|---|---|
| 59 | Response Time Check | Complete Prev Step | All the time | | | | |
| 60 | Baseline 3 | Complete Prev Step | All the time | | | | |
| 61 | Post CTS | Complete Prev Step | All the time | | | | |
| 62 | Post Spike | Complete Prev Step | All the time | | | | |
| 63 | Post O2/NO2 | Complete Prev Step | All the time | | | | |
| 64 | Post 2 Gas Spike | Complete Prev Step | All the time | | | | |
| 65 | Determine Follow On Operation | | Another test (is it for CH2O) or done testing | | | | |
| 66 | Second Test w/CH2O? | | Does the 2nd test require 2 gas spike? | | | | |
| 67 | 2 Gas Spike | | Testing for CH2O | | | | |
| 68 | 2 Gas Spike w/ Response Time | | Testing for CH2O | | | | |
| | | | STARTUP/SHUTDOWN | | | | |
| 69 | Testing Completed (System Cleaning) | | All the time | | | | |
| 70 | Testing Completed (FTIR Cleaning) | | All the time | | | | |
| 71 | Power Down Systems | | All the time | | | | |
| 72 | | App Command | Command: Start AC > Set to 80 F. | | | | |
| 73 | | App Command | Command: Start AC > Set to 80 F. | | | | |

I claim:

1. A portable self-contained test system for measuring emissions of an engine, comprising:
   a structural assembly forming a plurality of component mounting positions;
   a heated sampler mounted in said structural assembly and having an input connector adapted to receive a line carrying exhaust from the engine to the heated sampler for testing;
   a Fourier-transform infrared spectrometer mounted in said structural assembly and connected to a gas output of the heated sampler;
   a plurality of testing gas sources mounted in said structural assembly and connected to the heated sampler via electrically actuated valves to selectively provide testing gases to the heated sampler;
   a programmable control device connected to said valves, comprising a program that automatically electrically controls said valves in a predetermined sequence to perform a series of emissions measurements;
   a computing device connected to said spectrometer and containing software that receives test data and analyzes said data to produce a standardized emissions test report as an output; and
   a portable electrical power source mounted in said structural assembly and connected to provide power to said spectrometer, said valves, said programmable control device, and said computing device, said source providing sufficient power to maintain operation of the connected devices for the duration of a complete standardized emissions test;
   wherein the structural assembly is arranged and sized so that the system contained therein can be delivered to a test site on a truck, removed from the truck and placed in position proximate to the engine requiring emissions testing, and left there for the duration of the emissions test.

2. The system of claim 1 wherein the structural assembly further includes a lift point configured to engage with a lifting device attached to the truck, whereby the self-contained test system can be placed in position proximate to the engine, using the lifting device.

3. The system of claim 1 wherein the structural assembly further includes protective panels enclosing components mounted in the structural assembly.

4. The system of claim 3 further including a temperature control mechanism mounted in the structural assembly and connected to maintain the temperature of at least one enclosed region of the structural assembly within a predetermined range.

5. The system of claim 4 wherein the temperature control mechanism comprises an air conditioner.

6. The system of claim 4 wherein the temperature control mechanism maintains the temperature of a compartment in the structural assembly wherein at least the spectrometer and the computing device are mounted.

7. The system of claim 1 wherein the structural assembly further includes at least one component mounting platform, said mounting platform movable between a position internal to the structural assembly during transportation and operation, and a position extending out of the structural assembly to enhance access to the supported component.

8. The system of claim 1 wherein the electrical power source is an internal combustion generator and said generator and a fuel tank connected to supply the generator with fuel are mounted in said structural assembly.

9. The system of claim 1 wherein said testing gas sources include a nitrogen generator installed in the structural assembly and connected to receive power from the electrical power source.

10. The system of claim 1 further comprising a storage area for a sampler line.

11. A method for performing an emissions test for an engine operating at a fixed location, comprising the steps of:

providing a portable, self-contained emissions test system comprising a structural assembly having mounted therein a heated sampler with an input connector, a Fourier-transform infrared spectrometer connected to a gas output of the heated sampler, a plurality of testing gas sources connected to the heated sampler via electrically actuated valves, one or more computing devices with programs that automatically electrically control the valves and spectrometer to perform at least one standardized emissions test and provide a test report as an output, and a standalone electrical power source connected to provide power to components of the system for the duration of said emissions test;

delivering said test system to a testing site on a truck;

removing the test system from the truck and placing the test system in a position proximate to the engine to enable monitoring engine emissions;

connecting the input connector of the sampler to the engine exhaust using a heated sample line;

while the self-contained test system is in position, initiating one or more automated standardized emissions tests using the test system; and upon completion of the test, removing the test system from its position and loading the test system onto the truck for transportation to another site.

12. The method of claim 11 wherein the test system further includes a wireless communication device connected to at least one of the computing devices, and the system wirelessly transmits a status message to an operator upon failure of a test or test function.

13. The method of claim 11 wherein the truck is equipped with a lift that loads and unloads the test system from the truck.

14. The method of claim 13 wherein the truck carries a plurality of test systems, each of which is unloaded at a different test site using the lift.

15. The method of claim 13 wherein the structural assembly further includes a lift point configured to engage with a lifting device attached to the truck.

16. The method of claim 1 wherein the structural assembly further includes protective panels enclosing components mounted in the structural assembly.

17. The method of claim 16 wherein the structural assembly further includes at least one component mounting platform, said mounting platform movable between a position internal to the structural assembly during transportation and operation, and a position extending out of the structural assembly to enhance access to the supported component.

18. The method of claim 11 wherein the test system further includes a temperature control mechanism mounted in the structural assembly and connected to maintain the temperature of at least one enclosed region of the structural assembly within a predetermined range.

19. The method of claim 17 wherein the temperature control mechanism comprises an air conditioner.

20. The method of claim 17 wherein the temperature control mechanism maintains the temperature of a compartment in the structural assembly wherein at least the spectrometer and one or more computing devices are mounted.

* * * * *